US010433320B2

(12) United States Patent
Mizusawa

(10) Patent No.: US 10,433,320 B2
(45) Date of Patent: Oct. 1, 2019

(54) SWITCHING AND SYNCHRONIZATION DEVICE

(71) Applicant: SONY CORPORATION, Tokyo (JP)

(72) Inventor: Nishiki Mizusawa, Kanagawa (JP)

(73) Assignee: SONY CORPORATION, Tokyo (JP)

(*) Notice: Subject to any disclaimer, the term of this patent is extended or adjusted under 35 U.S.C. 154(b) by 110 days.

(21) Appl. No.: 15/531,222

(22) PCT Filed: Oct. 21, 2015

(86) PCT No.: PCT/JP2015/079746
§ 371 (c)(1),
(2) Date: May 26, 2017

(87) PCT Pub. No.: WO2016/092959
PCT Pub. Date: Jun. 16, 2016

(65) Prior Publication Data
US 2017/0325248 A1 Nov. 9, 2017

(30) Foreign Application Priority Data

Dec. 12, 2014 (JP) .................. 2014-251662

(51) Int. Cl.
H04W 72/12 (2009.01)
H04W 28/06 (2009.01)
(Continued)

(52) U.S. Cl.
CPC .............. H04W 72/12 (2013.01); H04L 5/14 (2013.01); H04W 28/06 (2013.01); H04W 56/00 (2013.01); H04W 72/04 (2013.01)

(58) Field of Classification Search
CPC ........ H04L 5/14; H04L 5/0055; H04W 72/12; H04W 72/0446; H04W 72/042; H04W 72/0453
See application file for complete search history.

(56) References Cited

U.S. PATENT DOCUMENTS

2002/0173277 A1* 11/2002 Takao ................... H04W 16/04
455/77
2012/0300752 A1 11/2012 Kwon et al.

FOREIGN PATENT DOCUMENTS

EP          1259092 A2   11/2002
JP      2002-345014 A    11/2002
(Continued)

OTHER PUBLICATIONS

"Discussion on Regulatory Aspects Related to Si of Flexible Duplex for E-UTRAN", RP-141956, 3GPP TSG RAN Meeting #66, Maui US, Dec. 11, 2014, 10 pages.
(Continued)

Primary Examiner — Jamal Javaid
(74) Attorney, Agent, or Firm — Chip Law Group

(57) ABSTRACT

To enable radio communication to be performed more favorably in a UL band of FDD when the UL band is used for both DL and UL in a time division manner. There is provided a device that includes a switching unit that switches an operation mode of an uplink band of FDD between a first mode in which the uplink band is used for uplink and a second mode in which the uplink band is used for both downlink and uplink in a time division manner and a control unit that gives an instruction on a first timing advance on the basis of a downlink reception timing in a downlink band of FDD corresponding to the uplink band and an instruction on a second timing advance on the basis of a downlink reception timing in the uplink band.

12 Claims, 29 Drawing Sheets

(51) Int. Cl.
*H04W 56/00* (2009.01)
*H04W 72/04* (2009.01)
*H04L 5/14* (2006.01)

(56) References Cited

FOREIGN PATENT DOCUMENTS

| | | |
|---|---|---|
| JP | 2006-518562 A | 8/2006 |
| JP | 2015-516695 A | 6/2015 |
| WO | 2012/165821 A1 | 12/2012 |

OTHER PUBLICATIONS

Wan, et al., "Evolving LTE with Flexible Duplex", Globecom Workshops (GC Wkshps) IEEE, Dec. 9 -13, 2013, pp. 49-54.
Wan, et al.,"Evolving LTE with Flexible Duplex [online], Globe com Workshops (GC Wkshps), 2013 IEEE".
Discussion on Regulatory Aspects Related to Si of Flexible Duplex for E-UTRAN, 3GPP TSG RAN Meeting #66, RP-141956.
International Search Report and Written Opinion of PCT Application No. PCT/JP2015/079746, dated Dec. 28, 2015, 02 pages of English Translation and 07 pages of ISRWO.
Wan, et al., "Evolving LTE with Flexible Duplex", Globecom Workshop—Emerging Technologies for LTE-Advanced and Beyond-4G, IEEE, Dec. 9-13, pp. 49-54.
"Discussion on Regulatory Aspects Related to Si of Flexible Duplex for E-UTRAN", RP-141956, 3GPP TSG RAN Meeting #66, Maui, US, Dec. 8-11, 2014, 10 pages.

* cited by examiner

FIG. 4

| Configuration 0 DL:UL 4:6 | #0 D | #1 S | #2 U | #3 U | #4 U | #5 D | #6 S | #7 U | #8 U | #9 U |
|---|---|---|---|---|---|---|---|---|---|---|
| Configuration 1 DL:UL 6:4 | #0 D | #1 S | #2 U | #3 U | #4 D | #5 D | #6 S | #7 U | #8 U | #9 D |
| Configuration 2 DL:UL 8:2 | #0 D | #1 S | #2 U | #3 D | #4 D | #5 D | #6 S | #7 U | #8 D | #9 D |
| Configuration 3 DL:UL 7:3 | #0 D | #1 S | #2 U | #3 U | #4 U | #5 D | #6 D | #7 D | #8 D | #9 D |
| Configuration 4 DL:UL 8:2 | #0 D | #1 S | #2 U | #3 U | #4 D | #5 D | #6 D | #7 D | #8 D | #9 D |
| Configuration 5 DL:UL 9:1 | #0 D | #1 S | #2 U | #3 D | #4 D | #5 D | #6 D | #7 D | #8 D | #9 D |
| Configuration 6 DL:UL 5:5 | #0 D | #1 S | #2 U | #3 U | #4 U | #5 D | #6 S | #7 U | #8 U | #9 D |

FIG. 20

| DL-REFERENCE UL/DL CONFIGURATION | SUBFRAME N | | | | | | | | | |
|---|---|---|---|---|---|---|---|---|---|---|
| | 0 | 1 | 2 | 3 | 4 | 5 | 6 | 7 | 8 | 9 |
| 0 | - | - | 6,5 | 5,4 | 4 | - | - | 6,5 | 5,4 | 4 |
| 1 | - | - | 7,6 | 6,5,4 | - | - | - | 7,6 | 6,5,4 | - |
| 2 | - | - | 8,7,6,5,4 | - | - | - | - | 8,7,6,5,4 | - | - |
| 3 | - | - | 11,10,9,8,7,6 | 6,5 | 5,4 | - | - | - | - | - |
| 4 | - | - | 12,11,10,9,8,7 | 7,6,5,4 | - | - | - | - | - | - |
| 5 | - | - | 13,12,11,10,9,8,7,6,5,4 | - | - | - | - | - | - | - |
| 6 | - | - | 8,7 | 7,6 | 6,5 | - | - | 7 | 7,6,5 | - |

FIG. 23

| UL-REFERENCE UL/DL CONFIGURATION | SUBFRAME INDEX N | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

SWITCHING AND SYNCHRONIZATION DEVICE

CROSS REFERENCE TO RELATED APPLICATIONS

This application is a U.S. National Phase of International Patent Application No. PCT/JP2015/079746 filed on Oct. 21, 2015, which claims priority benefit of Japanese Patent Application No. JP 2014-251662 filed in the Japan Patent Office on Dec. 12, 2014. Each of the above-referenced applications is hereby incorporated herein by reference in its entirety.

TECHNICAL FIELD

The present disclosure relates to device.

BACKGROUND ART

Amounts of traffic on mobile communication networks have sharply increased in recent years due to the proliferation of smartphones. Ratios of downlink (DL) traffic and uplink (UP) traffic fluctuate depending on places and/or time slots. For this reason, it is desirable to efficiently use radio resources by flexibly adjusting an amount of radio resources for DL and an amount of radio resources for UL according to an amount of traffic.

Long Term Evolution (LTE) supports Frequency Division Duplex (FDD) and Time Division Duplex (TDD) as duplex communication systems. In TDD, a ratio of UL subframes and DL subframes in a radio frame can be changed by dynamically changing UL/DL configurations according to an amount of traffic. In other words, in TDD, an amount of radio resources for DL and an amount of radio resources for UL can be flexibly adjusted. On the other hand, since a DL band and a UL band are pre-determined in FDD, it is not possible to flexibly adjust an amount of radio resources for DL and an amount of radio resource for UL. Although it is also possible in FDD to use more DL bands and fewer UL bands through carrier aggregation, as a result, a use rate of radio resources of UL bands decreases, and thus it is hard to say that radio resources are efficiently used.

Thus, a technique of using a UL band of FDD for both DL and UL in a time division manner has been discussed. The technique can be called flexible duplex. Patent Literature 1, for example, discloses a technology of using UL bands of FDD in a TDD mode.

CITATION LIST

Patent Literature

Patent Literature 1: JP 2006-518562T

DISCLOSURE OF INVENTION

Technical Problem

When a UL band of FDD is used for both DL and UL in a time division manner, however, there is a possibility of radio communication not being favorably performed in the UL band.

Therefore, it is desirable to provide a mechanism which enables radio communication to be performed more favorably in a UL band of FDD when the UL band is used for both DL and UL in a time division manner.

Solution to Problem

According to the present disclosure, there is provided a device including: a switching unit configured to switch an operation mode of an uplink band of FDD between a first mode in which the uplink band is used for uplink and a second mode in which the uplink band is used for both downlink and uplink in a time division manner; and a control unit configured to give an instruction on a first timing advance on the basis of a downlink reception timing in a downlink band of FDD corresponding to the uplink band and an instruction on a second timing advance on the basis of a downlink reception timing in the uplink band.

Further, according to the present disclosure, there is provided a device including: a switching unit configured to switch an operation mode of an uplink band of FDD between a first mode in which the uplink band is used for uplink and a second mode in which the uplink band is used for both downlink and uplink in a time division manner; and a control unit configured to synchronize a downlink transmission timing in a downlink band of FDD corresponding to the uplink band with a downlink transmission timing in the uplink band when the operation mode is the second mode.

Further, according to the present disclosure, there is provided a device including: an acquisition unit configured to acquire information indicating a switch of an operation mode of an uplink band of FDD between a first mode in which the uplink band is used for uplink and a second mode in which the uplink band is used for both downlink and uplink in a time division manner; and a control unit configured to perform a process for uplink transmission in the uplink band when the operation mode is the first mode, and perform a process for downlink reception and uplink transmission in the uplink band when the operation mode is the second mode. The control unit adjusts an uplink transmission timing in the uplink band on the basis of a downlink reception timing in a downlink band of FDD corresponding to the uplink band regardless of whether the operation mode is the first mode or the second mode.

Advantageous Effects of Invention

According to the present disclosure described above, it is possible to perform radio communication more favorably in a UL band of FDD when the UL band is used for both DL and UL in a time division manner. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is an explanatory diagram for describing examples of UL/DL configurations of TDD.

FIG. 20 is an explanatory diagram for describing examples of subframes defined for DL reference UL/DL configurations.

FIG. 23 is an explanatory diagram for describing an example of subframes defined for UL reference UL/DL configurations.

MODE(S) FOR CARRYING OUT THE INVENTION

Figure 1:
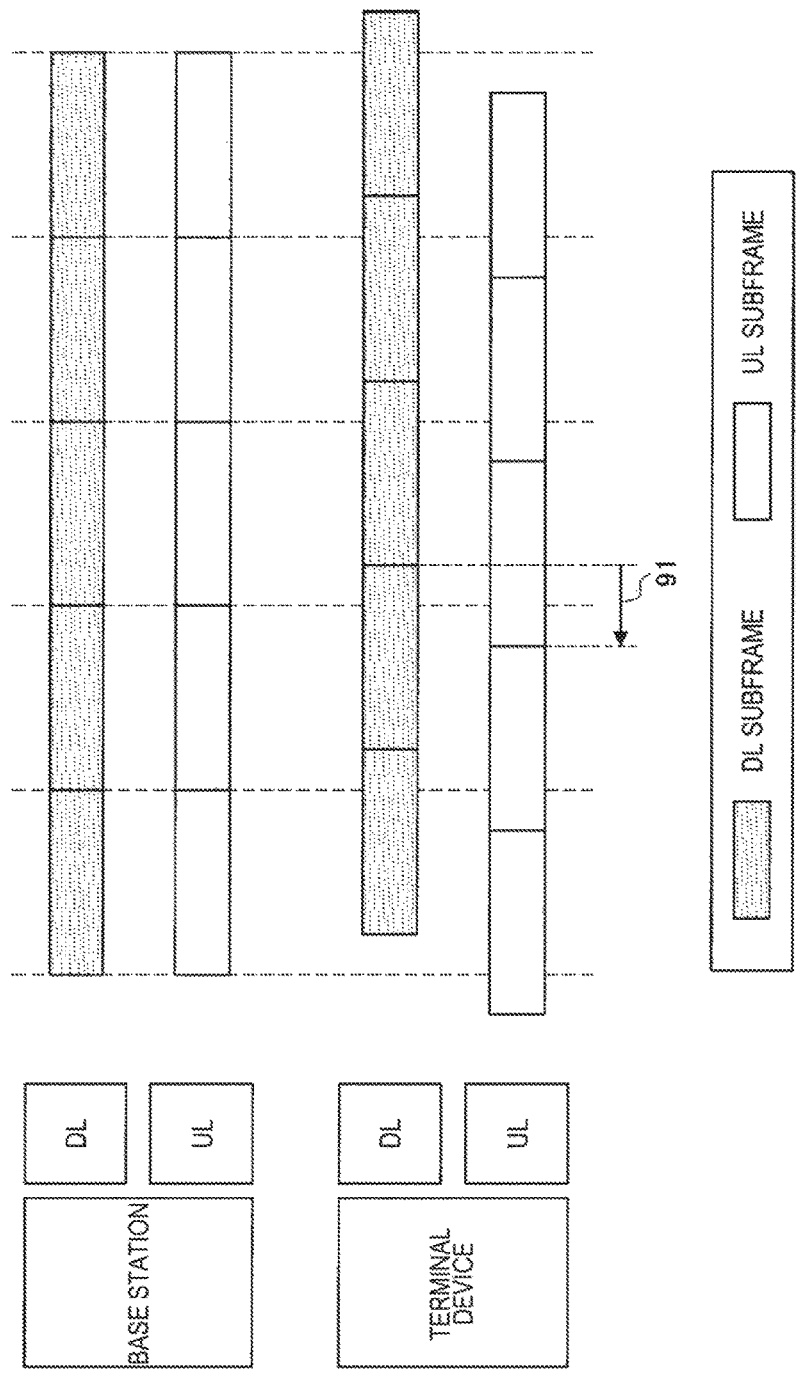
FIG. 1 is an explanatory diagram for describing an example of TA in a case of FDD.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be described in the following order.

1. Introduction
2. Schematic configuration of system
3. Configurations of each device
3.1. Configuration of base station
3.3. Configuration of terminal device
4. First embodiment
4.1. Technical problem
4.2. Technical features
4.3. Process flow
5. Second embodiment
5.1. Technical problem
5.2. Technical features
5.3. Process flow
6. Third embodiment
6.1. Technical problem
6.2. Technical features
6.3. Process flow
7. Fourth embodiment
7.1. Technical problem
7.2. Technical features
7.3. Process flow
8. Fifth embodiment
8.1. Technical problem
8.2. Technical features
8.3. Process flow
9. Application example
9.1. Application example with regard to base station
9.2. Application example with regard to terminal device
10. Conclusion 1. Introduction First, adjustment of UL transmission timings and transmission timings of an acknowledgment (ACK)/a negative acknowledgment (NACK) will be described with reference to FIGS. 1 to 4.

(1) Adjustment of UL Transmission Timings (a) Timing Advance (TA)

Distances and propagation delays between a base station (e.g., an evolved Node B (eNB)) and a terminal device (e.g., user equipment (UE)) vary depending on terminal devices. Thus, a UL transmission timing of each of the plurality of terminal devices is adjusted to be synchronized with a reception timing of a base station for UL signals from the plurality of terminal devices. More specifically, for example, the base station reports a timing advance (TA) command to the terminal devices, and the terminal devices adjust UL transmission timings on the basis of the TA command.

(a-1) Initial Value of TA

When a terminal device transmits a random access preamble, for example, a base station transmits a random access response including a TA command indicating a TA (e.g., $T_A=0$ to 1282) to the terminal device. Then, the terminal device computes $N_{TA}$ ($N_{TA}=T_A*16$) from the $T_A$. Then, the terminal device adjusts a UL transmission timing on the basis of a DL reception timing and $N_{TA}$.

In a case of FDD, a TA (i.e., the difference between a UL transmission timing and a DL reception timing) is $N_{TA}*T_S$. $T_S$ is 1/30.72 microseconds (us).

On the other hand, in a case of TDD, a TA is $(N_{TA}+624)$ *$T_S$. An offset of $624*T_S$ is for allowing a switch from UL reception to DL transmission in a base station.

Since one TA is elicited from $N_{TA}$ as described above, $N_{TA}$ can be said to be information indicating a TA.

(a-2) Updating of TA

After a random access process, a base station reports a TA command indicating a $T_A$ (e.g., $T_A$=0 to 63) to a terminal device for updating the TA. Then, the terminal device computes $N_{TA,\ New}$($N_{TA,\ New}$=$N_{TA,\ old}$+($T_A$−31)*16) from $N_{TA}$, old and the $T_A$. Then, the terminal device adjusts a UL transmission timing on the basis of a DL reception timing and $N_{TA,\ New}$.

(a-3) Example of TA

FIG. 1 is an explanatory diagram for describing an example of a TA in a case of FDD. Referring to FIG. 1, transmission and reception timings of a base station and a terminal device in a case of FDD are shown. For the base station, for example, a DL transmission timing and a UL reception timing are synchronized. In other words, for the base station, a DL frame timing and a UL frame timing are synchronized. On the other hand, a DL reception timing of the terminal device is later than a DL transmission timing of the base station, and a UL transmission timing of the terminal device is earlier than the UL reception timing of the base station due to propagation delays. The UL transmission timing of the terminal device is earlier than the DL reception timing of the terminal device by a TA 91.

Figure 2:
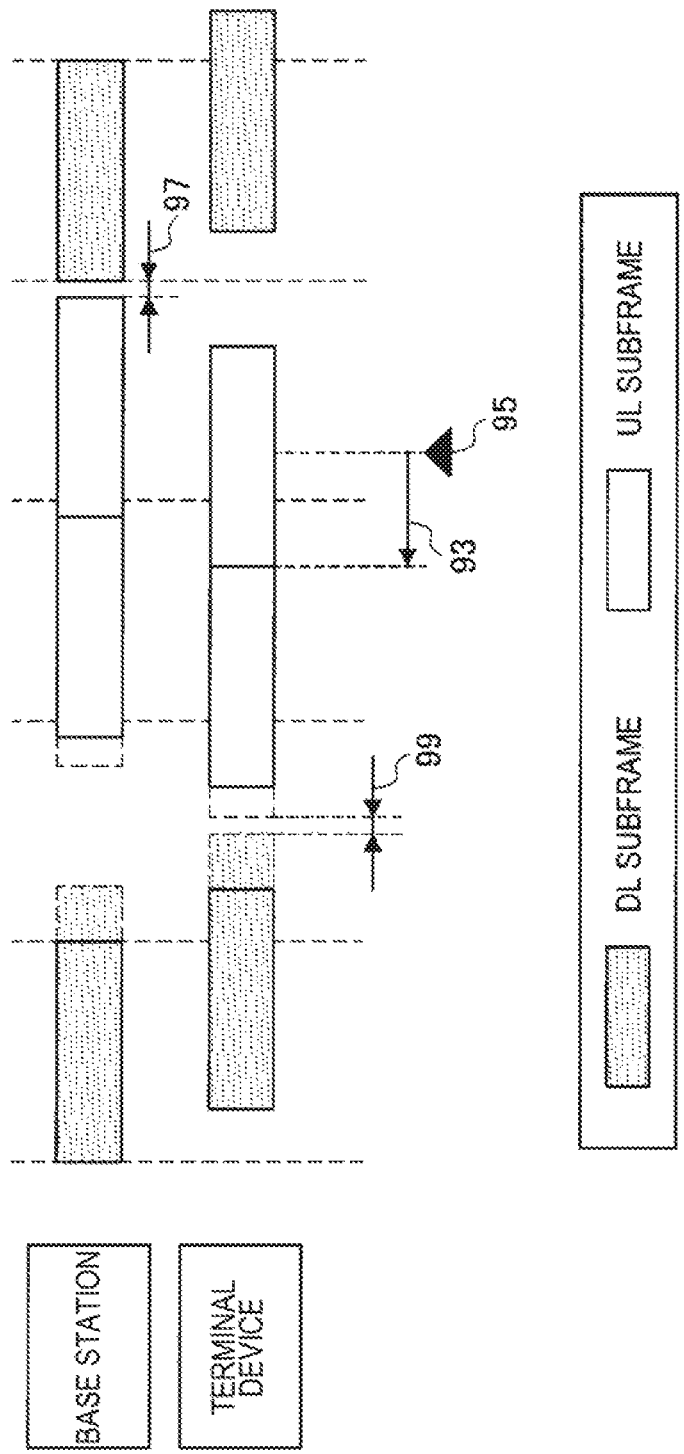
FIG. 2 is an explanatory diagram for describing examples of TAs in a case of TDD.

FIG. 2 is an explanatory diagram for describing examples of TAs in a case of TDD. Referring to FIG. 2, transmission and reception timings of a base station and a terminal device in a case of TDD are shown. Also in the case of TDD, a DL reception timing of the terminal device is later than a DL transmission timing of the base station, and a UL transmission timing of the terminal device is earlier than a UL reception timing of the base station due to propagation delays. The UL transmission timing of the terminal device is earlier than a DL reception timing 95 of the terminal device by a TA 93. Note that a time 97 is necessary for the base station to switch from UL reception to DL transmission. Likewise, a time 99 is necessary for the terminal device to switch from DL reception to UL transmission.

(b) Timing Advance Group (TAG)

A terminal device can simultaneously use 5 component carriers (CCs) at maximum through carrier aggregation. The terminal device adjusts a UL transmission timing for a physical uplink control channel (PUCCH)/physical uplink shared channel (PUSCH)/sounding reference signal (SRS) of a primary cell on the basis of a DL reception timing and information indicating a TA. Further, the terminal device adjusts a UL transmission timing for PUSCH/SRS of a secondary cell on the basis of a DL reception timing and information indicating a TA.

When the same base station uses a plurality of synchronized CCs, for example, a TA shared between the plurality of CCs is used. In this case, the plurality of CCs belong to the same timing advance group (TAG), and the TA is a TA of this TAG The terminal device manages TAs of a plurality of TAGs. The terminal device adjusts a UL transmission timing for a CC that belongs to a certain TAG on the basis of a TA of the certain TAG A TA command medium access control (MAC) control element includes a 2-bit TAG ID and a 6-bit TA command.

(2) Transmission of ACK/NACK (a) FDD

In FDD-LTE, an ACK/NACK of DL data is transmitted in a subframe that is positioned 4 subframes after the subframe in which the DL data is transmitted. A specific example of this subject will be described below with reference to FIG. 3.

Figure 3:
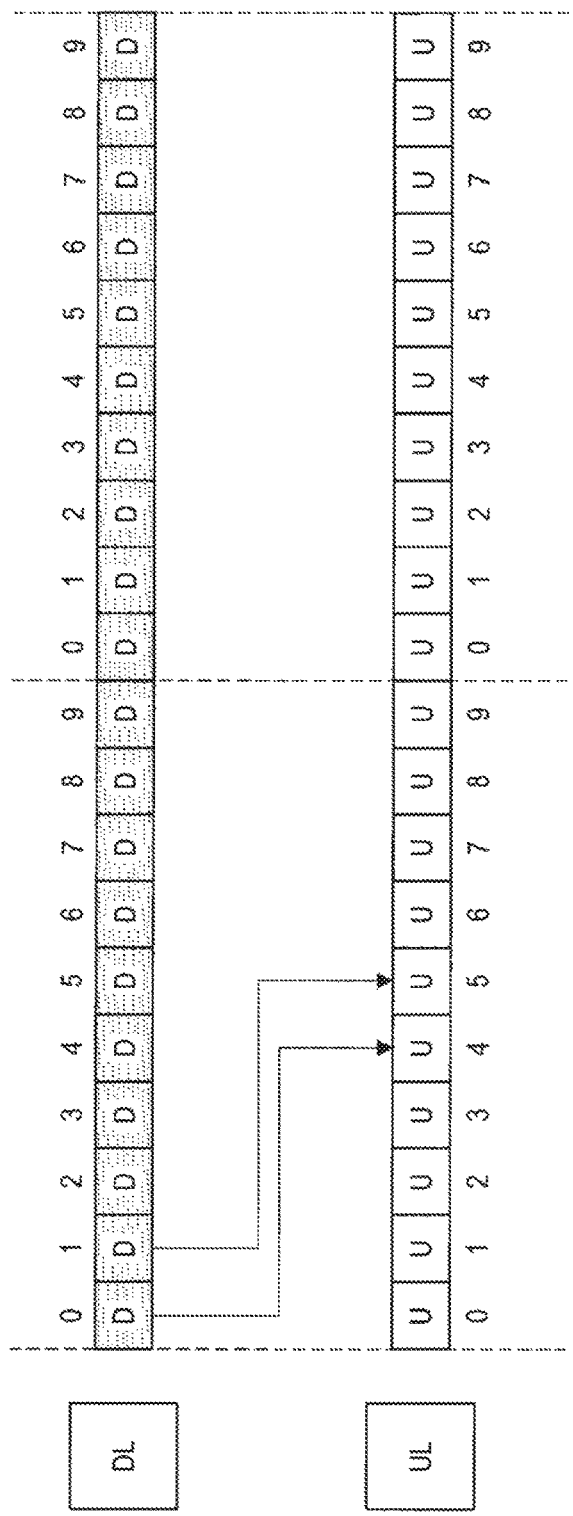
FIG. 3 is an explanatory diagram for describing an example of transmission of an ACK/NACK in FDD-LTE.

FIG. 3 is an explanatory diagram for describing an example of transmission of the ACK/NACK in FDD-LTE. Referring to FIG. 3, subframes in a UL band of FDD and subframes of a DL band of FDD are shown. When, for example, DL data is transmitted using the subframe whose subframe number is 0, the ACK/NACK of the DL data is transmitted using the subframe whose frame number is 4. Likewise, when DL data is transmitted using the subframe whose subframe number is 1, the ACK/NACK of the DL data is transmitted using the subframe whose frame number is 5.

(b) TDD

In a case of TDD, a subframe that is positioned 4 subframes after the subframe in which DL data is transmitted is not necessarily a UL subframe. Thus, a correspondence between DL subframes in which DL data is transmitted and UL subframes in which an ACK/NACK of the DL data is transmitted is stipulated for each of UL/DL configurations of TDD in Table 10.1.3.1-1 in the $3^{rd}$ Generation Partnership Project (3GPP) TS 36.213. Examples of UL/DL configurations of TDD will be described below with reference to FIG. 4.

FIG. 4 is an explanatory diagram for describing examples of UL/DL configurations of TDD. Referring to FIG. 4, Configurations 0 to 6 are shown as a UL/DL configuration of TDD. As such, the numbers and deployment of UL subframes and DL subframes vary depending on the configuration in TDD. Note that Configurations 0 to 6 are the same as those shown in Table 4.2-2 included in the 3GPP TS 36.211.

2. Schematic Configuration of System

Figure 5:
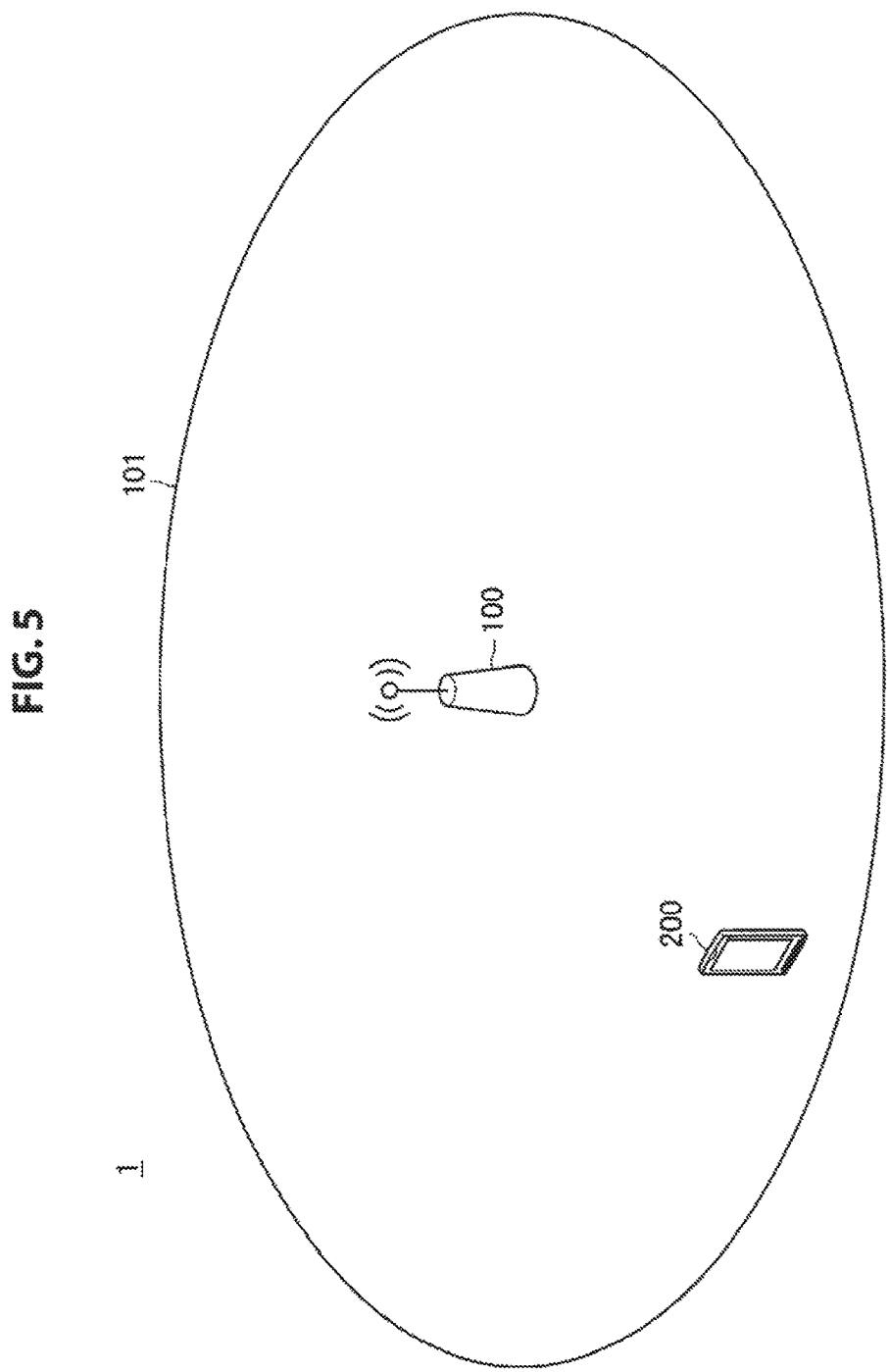
FIG. 5 is an explanatory diagram illustrating an example of the schematic configuration of a system according to an embodiment of the present disclosure.

Successively, a schematic configuration of a system 1 according to an embodiment of the present disclosure will be described with reference to FIGS. 5 to 7. FIG. 5 is an explanatory diagram illustrating an example of a schematic configuration of the system 1 according to the present embodiment. Referring to FIG. 5, the system 1 includes a base station 100 and a terminal device 200.

(1) Base Station 100

The base station 100 is a base station of a mobile communication system (or a cellular system). As an example, the mobile communication system is a system on the basis of LTE, LTE-Advanced, or a communication standard equivalent thereto. The base station 100 supports FDD and performs radio communication with terminal devices (that are positioned within a cell 101) using a DL band and a UL band of FDD. The UL band is, for example, a component carrier (CC) of UL, and the DL band is a CC of DL.

The base station 100 in particular switches an operation mode of the UL bands between a first mode in which the UL band is used for UL and a second mode in which the UL band is used for both DL and UL in a time division manner.

When the operation mode is the first mode, for example, the base station 100 transmits DL signals to terminal devices in the DL band, and receives UL signals from terminal devices in the UL band.

When the operation mode is the second mode, for example, the base station 100 transmits DL signals to terminal devices in the DL band, and further transmits DL signals to terminal devices using DL subframes in the UL band. In addition, the base station 100 receives UL signals from terminal devices using UL subframes in the UL band.

(2) Terminal Device 200

The terminal device 200 is a terminal device that can communicate in the mobile communication system (or cellular system). The base station 100 in particular supports the second mode.

When the operation mode is the first mode, for example, the terminal device 200 receives DL signals from the base station 100 in the DL band, and transmits UL signals to the base station 100 in the UL band.

When the operation mode is the second mode, for example, the terminal device 200 receives DL signals from the base station 100 in the DL band, and further receives DL signals from the base station 100 using DL subframes in the UL band. In addition, the terminal device 200 transmits UL signals to the base station 100 using UL subframes in the UL band.

(3) HetNet (a) Case of Macrocell

The base station 100 is a base station of a macrocell. That is, the cell 101 is a macrocell. A specific example of this subject will be described below with reference to FIG. 6.

Figure 6:
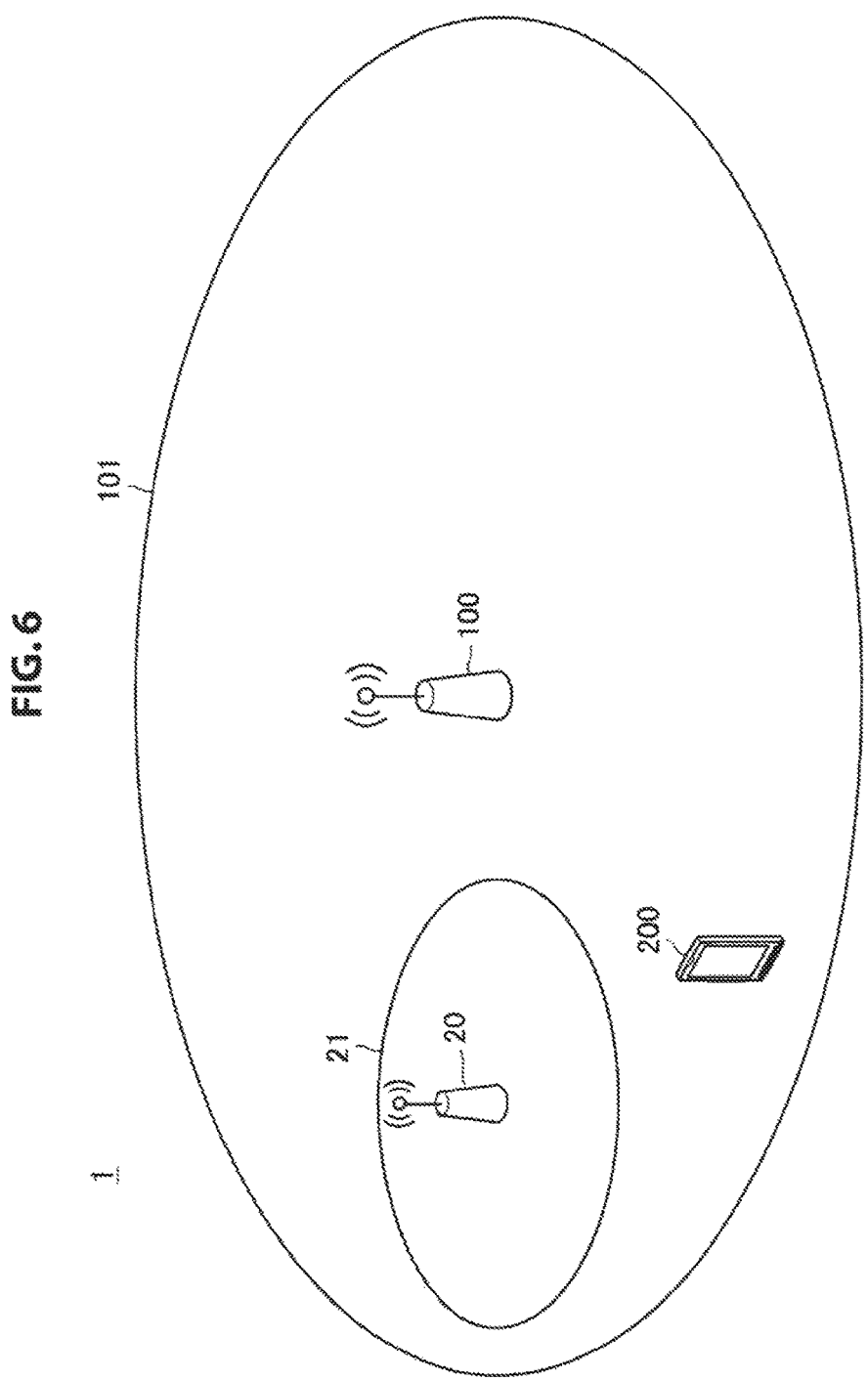
FIG. 6 is an explanatory diagram for describing a case in which a base station is a base station of a macrocell.

FIG. 6 is an explanatory diagram for describing a case in which the base station 100 is a base station of a macrocell. Referring to FIG. 6, the base station 100 and the terminal device 200 are shown. In this example, the base station 100 is a base station of a macrocell, and the cell 101 is the macrocell overlapping a small cell 21. The terminal device 200 can perform radio communication with a base station 20 of the small cell 21 when, for example, the terminal device is positioned within the small cell 21.

(b) Case of Small Cell

The base station 100 may be a base station of a small cell. That is, the cell 101 may be a small cell. A specific example of this subject will be described below with reference to FIG. 7.

Figure 7:
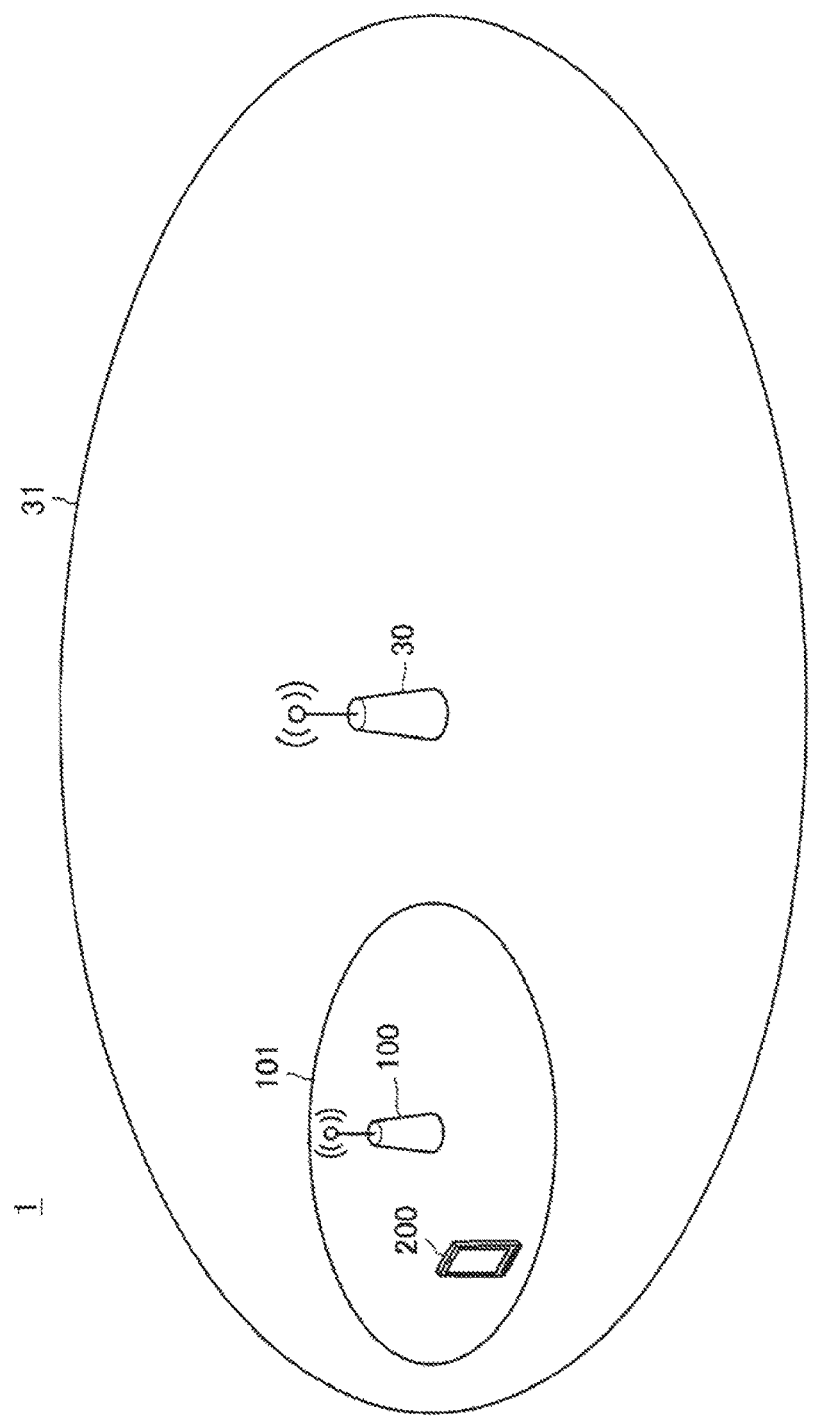
FIG. 7 is an explanatory diagram for describing a case in which the base station is a base station of a small cell.

FIG. 7 is an explanatory diagram for describing a case in which the base station 100 is a base station of a small cell. Referring to FIG. 7, the base station 100 and the terminal device 200 are shown. In this example, the base station 100 is a base station of a small cell, and the cell 101 is the small cell overlapped by a macrocell 31. The terminal device 200 can perform radio communication with a base station 30 of the macrocell 31 when, for example, the terminal device is positioned within the macrocell 31.

3. Configuration of Each Device

Now, configurations of the base station 100 and the terminal device 200 according to an embodiment of the present disclosure will be described with reference to FIGS. 8 and 10

<3.1. Configuration of Base Station>

First, an example of the configuration of the base station 100 according to an embodiment of the present disclosure will be described with reference to FIG. 8. FIG. 8 is a block diagram illustrating the example of the configuration of the base station 100 according to an embodiment of the present disclosure. According to FIG. 8, the base station 100 includes an antenna unit 110, a radio communication unit 120, a network communication unit 130, a storage unit 140, and a processing unit 150.

(1) Antenna Unit 110

The antenna unit 110 radiates signals output by the radio communication unit 120 out into space as radio waves. In addition, the antenna unit 110 converts radio waves in the space into signals, and outputs the signals to the radio communication unit 120.

(2) Radio Communication Unit 120

The radio communication unit 120 transmits and receives signals. For example, the radio communication unit 120 transmits a DL signal to a terminal device, and receives a UL signal from a terminal device.

(3) Network Communication Unit 130

The network communication unit 130 transmits and receives information. For example, the network communication unit 130 transmits information to other nodes, and receives information from other nodes. For example, the other nodes include another base station and a core network node.

(4) Storage Unit 140

The storage unit 140 temporarily or permanently stores a program and various data for operation of the base station 100.

(5) Processing Unit 150

The processing unit 150 provides various functions of the base station 100. The processing unit 150 includes a switching unit 151 and a control unit 153. Note that the processing unit 150 may further include a structural element other than these structural elements. That is, the processing unit 150 may perform operation other than the operation of these structural elements.

The switching unit 151 and the control unit 153 are described below in more detail.

<3.2. Configuration of Terminal Device>

Figure 9:
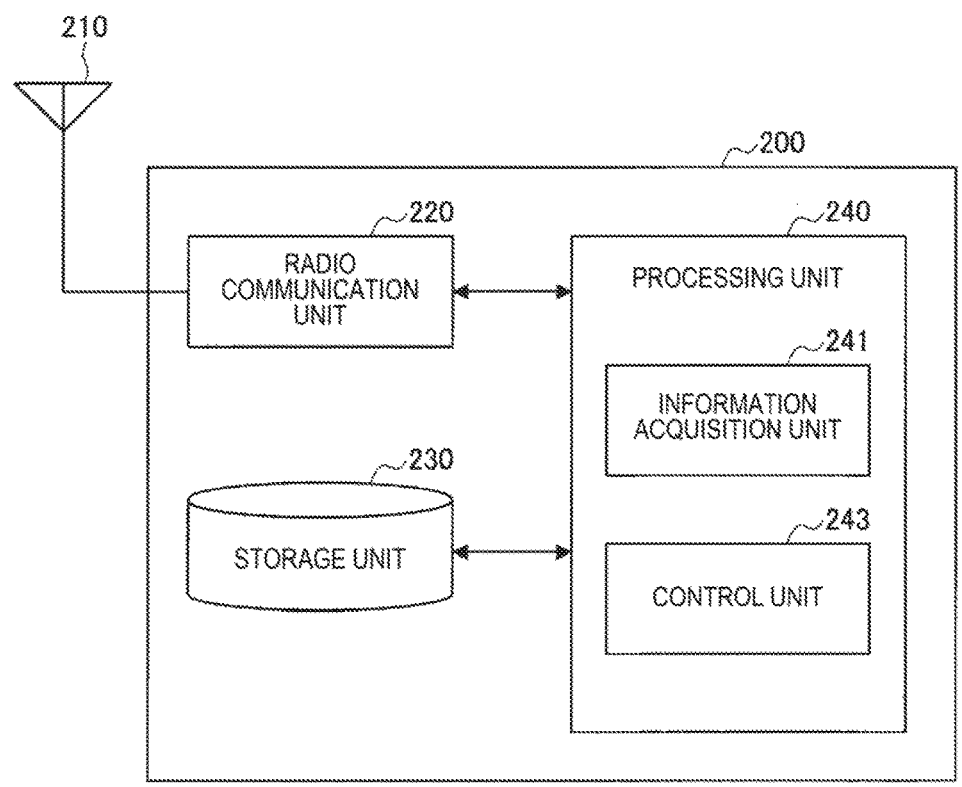
FIG. 9 is a block diagram illustrating an example of a configuration of a terminal device according to the embodiment.

First, an example of the configuration of the terminal device 200 according to an embodiment of the present disclosure will be described with reference to FIGS. 9 and 10. FIG. 9 is a block diagram illustrating the example of the configuration of the terminal device 200 according to an embodiment of the present disclosure. According to FIG. 9, the terminal device 200 includes an antenna unit 210, a radio communication unit 220, a storage unit 230, and a processing unit 240.

(1) Antenna Unit 210

The antenna unit 210 radiates signals output by the radio communication unit 220 out into space as radio waves. In addition, the antenna unit 210 converts radio waves in the space into signals, and outputs the signals to the radio communication unit 220.

(2) Radio Communication Unit 220

The radio communication unit 220 transmits and receives signals. The radio communication unit 220 receives, for example, DL signals from base stations and transmits UL signals to base stations. An example of hardware included in the radio communication unit 220 will be described below with reference to FIG. 10.

Figure 10:
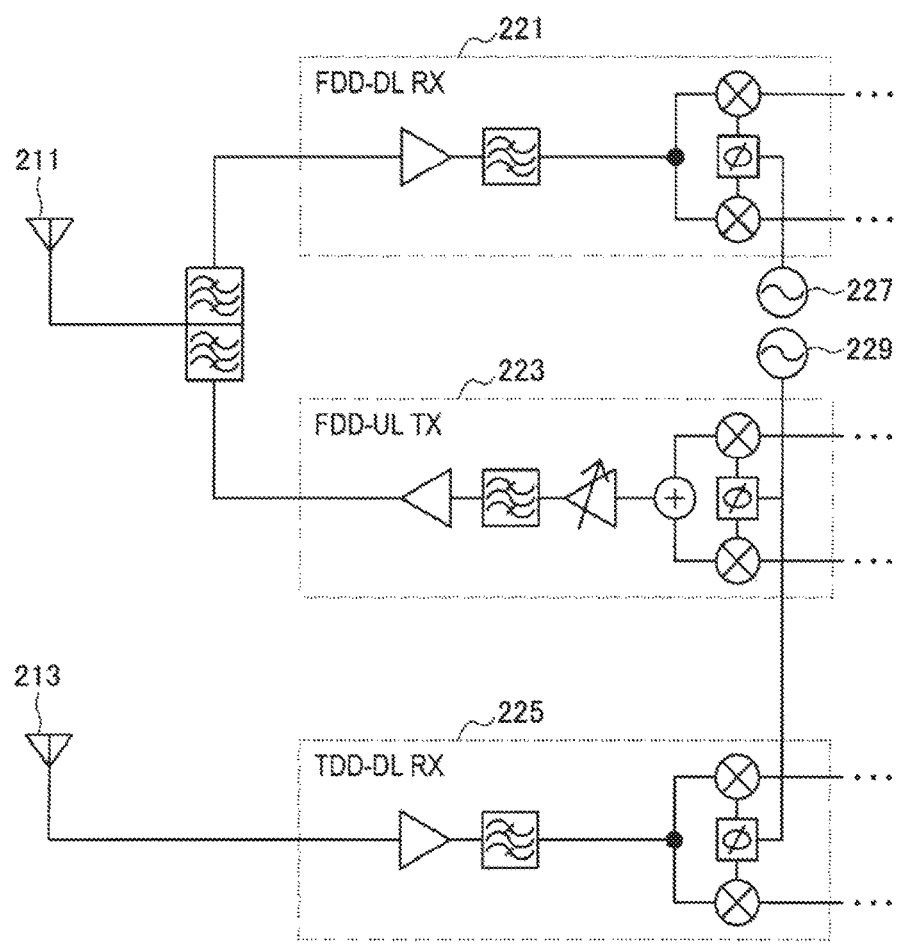
FIG. 10 is an explanatory diagram for describing an example of hardware included in a radio communication unit of the terminal device according to the embodiment.

FIG. 10 is an explanatory diagram for describing an example of hardware included in the radio communication unit 220 of the terminal device 200 according to the embodiment of the present disclosure. Referring to FIG. 10, an FDD-DL receiving circuit 221, an FDD-UL transmitting circuit 223, and a TDD-DL receiving circuit 225 included in the radio communication unit 220 are shown. In addition, a local oscillator 227 for UL bands of FDD and a local oscillator 229 for DL bands of FDD are also shown. Furthermore, an antenna 221 included in the antenna unit 210 is shown as well. When an operation mode of a UL band is the first mode in which the UL band is used for UL, for example, the FDD-DL receiving circuit 221 and the FDD-UL transmitting circuit 223 are used. When the operation mode is the second mode in which the UL band is used for both DL and UL in a time division manner, for example, the TDD-DL receiving circuit 225 is used in addition to the FDD-DL receiving circuit 221 and the FDD-UL transmitting circuit 223. More specifically, the FDD-UL transmitting circuit 223 and the TDD-DL receiving circuit 225 are used in a time division manner.

(3) Storage Unit 230

The storage unit 230 temporarily or permanently stores a program and various data for operation of the terminal device 200.

(4) Processing Unit 240

The processing unit 240 provides various functions of the terminal device 200. The processing unit 240 includes an information acquisition unit 241 and a control unit 243. Note that the processing unit 240 may further include a structural element other than these structural elements. That is, the processing unit 240 may perform operation other than the operation of these structural elements.

The information acquisition unit 241 and the control unit 243 are described below in more detail.

4. First Embodiment

Next, a first embodiment of the present disclosure will be described with reference to FIGS. 11 to 14.

<4.1. Technical Problem>

First, a technical problem according to the first embodiment will be described with reference to FIG. 11.

A technique of using a UL band of FDD for both DL and UL in a time division manner has been discussed. The technique can be called flexible duplex.

When a UL band of FDD is used for both DL and UL in a time division manner, however, there is a possibility of radio communication not being favorably performed in the UL band.

More specifically, a DL transmission timing in a UL band is delayed due to, for example, a switch from UL to DL in the UL band. As a result, there is a deviation between a DL transmission timing in a DL band of FDD and DL transmission timing in a UL band. For this reason, a UL transmission timing that is adjusted with reference to a DL reception timing in the DL band can differ from a UL transmission timing that is adjusted with reference to a DL reception timing in the UL band. Thus, there is a possibility of synchronization of UL reception timings of a base station not being realized. With respect to this subject, a specific example of a delay of a DL transmission timing caused by a switch will be described with reference to FIG. 11.

Figure 11:
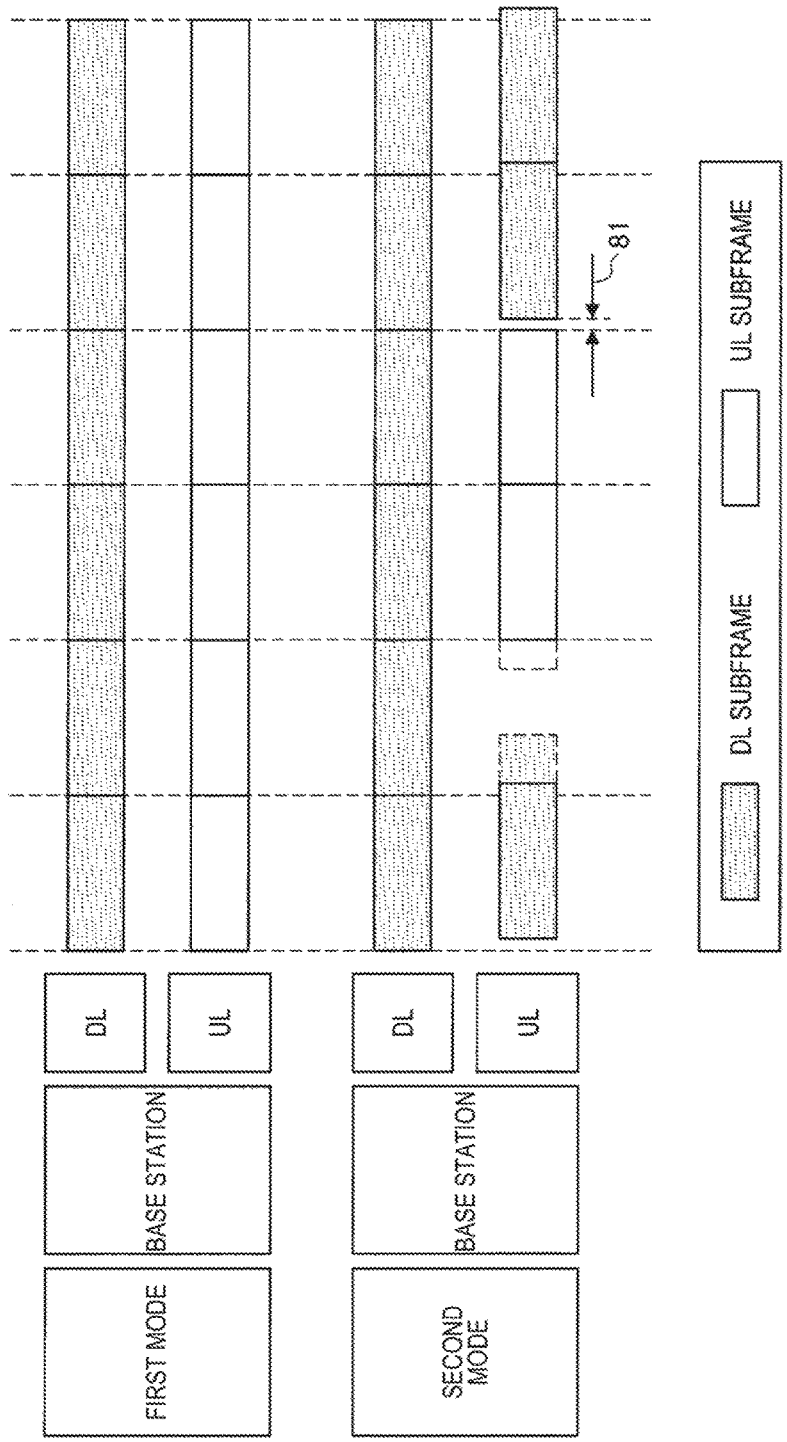
FIG. 11 is an explanatory diagram for describing an example of a delay of a DL transmission timing caused by a switch between UL and DL in a UL band.

FIG. 11 is an explanatory diagram for describing an example of a delay of a DL transmission timing caused by a switch between UL and DL in a UL band. Referring to FIG. 11, transmission and reception timings of a base station in the first mode in which a UL band of FDD is used for UL and transmission and reception timings of the base station in the second mode in which the UL band is used for both DL and UL in a time division manner are shown. In the first mode, for example, the DL transmission timings and the UL reception timings of the base station are synchronized. Meanwhile, in the second mode, a time 81 is necessary for a switch from UL to DL in the UL band, and thus, a DL transmission timing in the UL band is later than the DL transmission timing in the DL band for the base station. As a result, for a terminal device, a DL reception timing in the UL band is transmitted than a DL reception timing in the DL band. For this reason, a UL transmission timing adjusted with reference to the DL reception timing in the DL band is different from a UL transmission timing adjusted with reference to the DL reception timing in the UL band. Therefore, there is a possibility of synchronization of UL reception timings of the base station not being realized.

Thus, it is desirable to provide a mechanism which enables radio communication to be performed more favorably in a UL band of FDD when the UL band is used for both DL and UL in a time division manner. More specifically, it is desirable to provide a mechanism which enables synchronization of UL reception timings of a base station to be realized when, for example, a UL band of FDD is used for both DL and UL in a time division manner.

<4.2. Technical Features>

Next, technical features of the first embodiment will be described with reference to FIG. 12.

(1) Switch of Operation Mode

The base station 100 (the switching unit 151) switches an operation mode of a UL band of FDD between the first mode in which the UL band is used for UL and the second mode in which the UL band is used for both DL and UL in a time division manner.

(a) Trigger of Switch

When, for example, an amount of traffic in DL is sufficiently greater than an amount of traffic in UL in the cell 101 and the number of terminal devices that support the second mode is sufficient, the base station 100 (the switching unit 151) switches the operation mode of the UL band from the first mode to the second mode.

(b) UL Transmission Timings Before and after Switching

The base station 100 does not change UL transmission timings (i.e., UL frame timings), for example, before and after a switch of the operation mode of the UL band. Accordingly, it is possible to reduce an influence on, for example, terminal devices that do not support the second mode (each of which will be referred to as a "legacy terminal" hereinbelow).

Note that, in the second mode, a DL transmission timing in the UL band become later than a DL transmission timing in a DL band of FDD corresponding to the UL band by an amount of delay caused by a switch of the operation mode. This point is as described with reference to FIG. 11.

(c) Reporting of Switch

The base station 100 (the control unit 153) reports, for example, information indicating a switch of the operation mode between the first mode and the second mode (which will be described as "mode switch information" hereinbelow) to the terminal device 200.

Specifically, the base station 100 (the control unit 153) reports, for example, the mode switch information included in system information to the terminal device 200. Alternatively, the base station 100 (the control unit 153) may report the mode switch information to the terminal device 200 through individual signaling to the terminal device 200. The individual signaling may be, for example, radio resource control (RRC) signaling.

(d) Operation of Terminal Device 200 Corresponding to Switch

The terminal device 200 (the information acquisition unit 241) acquires the mode switch information. The terminal device 200 performs UL transmission in the UL band when the operation mode is the first mode, and performs DL reception and UL transmission in the UL band when the operation mode is the second mode.

The control unit 243 of the terminal device 200 performs a process for UL transmission in the UL band when the operation mode is the first mode, and performs a process for DL reception and UL transmission in the UL band when the operation mode is the second mode.

(2) Instruction on Timing Advances

In the first embodiment, the base station 100 (the control unit 153) gives an instruction on a first timing advance (TA) that is on the basis of a DL reception timing in the DL band and an instruction on a second TA that is on the basis of a DL reception timing in the UL band.

In the first embodiment, in particular, the instruction on the first TA and the instruction on the second TA are instructions to the same terminal device 200 that supports the second mode.

Meanwhile, the terminal device 200 (the control unit 243) adjusts a UL transmission timing in the UL band on the basis of a DL reception timing in the DL band and information indicating the first TA when the operation mode is the second mode. Alternatively, the terminal device 200 (the control unit 243) adjusts a UL transmission timing in the UL band on the basis of a DL reception timing in the UL band and information indicating the second TA when the operation mode is the second mode.

(a) Instruction in Second Mode

When the operation mode is the second mode, for example, the base station 100 (the control unit 153) gives the instruction on the first TA and the instruction on the second TA.

(b) First TA and Second TA

The second TA is, for example, longer than the first TA. Specific examples of the first TA and the second TA will be described below with reference to FIG. 12.

Figure 12:
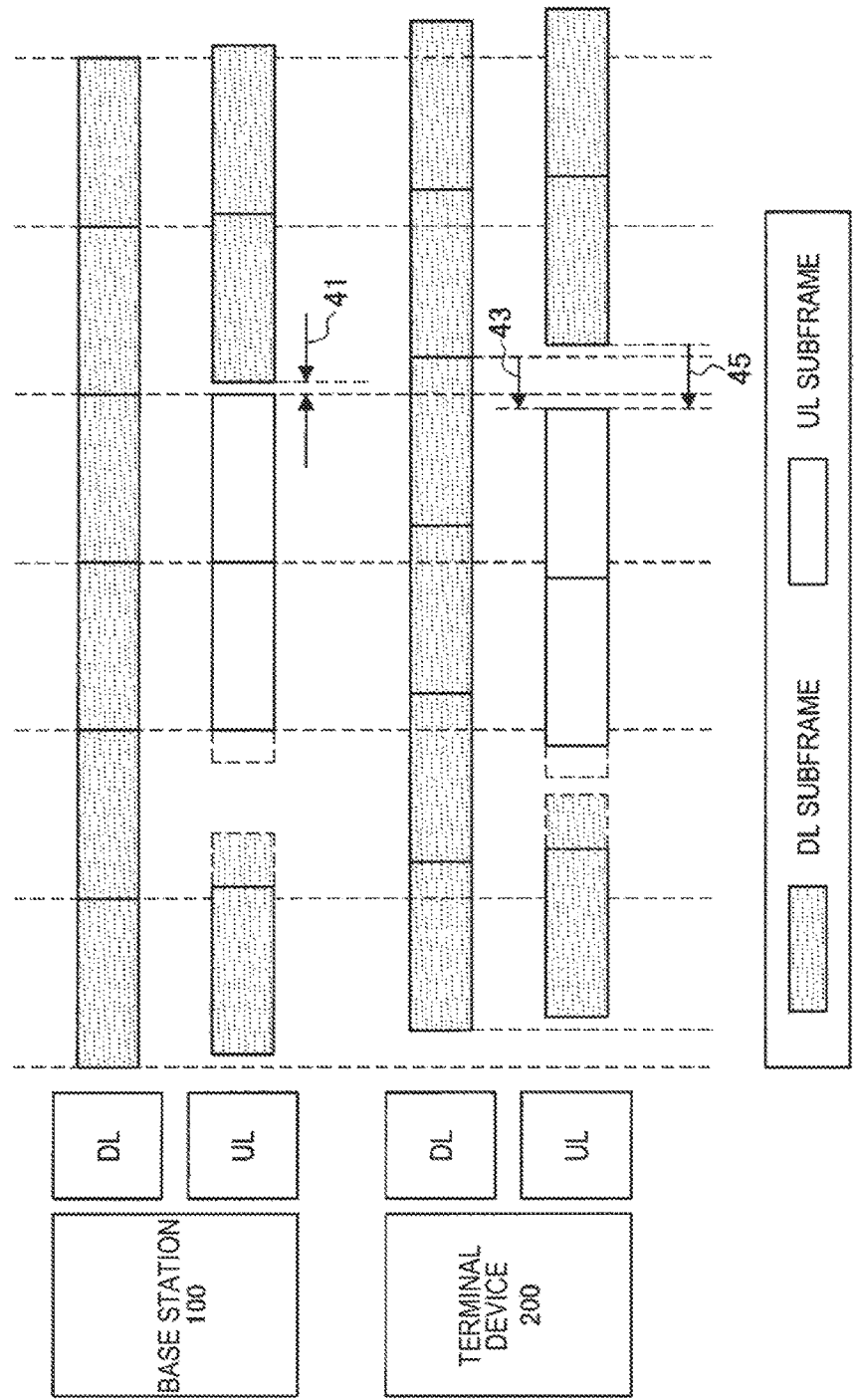
FIG. 12 is an explanatory diagram for describing examples of a first TA and a second TA.

FIG. 12 is an explanatory diagram for describing examples of the first TA and the second TA. Referring to FIG. 12, transmission and reception timings of the base station 100 and the terminal device 200 when an operation mode of a UL band is the second mode are shown. Since a time 41 is necessary for the base station 100 to switch from UL to DL in a UL band, a DL transmission timing in the UL band becomes later than a DL transmission timing in a DL band. As a result, for a terminal device 200, a DL reception timing in the UL band is transmitted than a DL reception timing in the DL band. For this reason, the base station 100 (the control unit 153) gives an instruction on a first TA 43 that is on the basis of the DL reception timing in the DL band and an instruction on a second TA 45 that is on the basis of the DL reception timing in the UL band. The second TA 45 is longer than the first TA 43. The terminal device 200 (the control unit 243) adjusts the UL transmission timing in the UL band on the basis of the DL reception timing in the DL band and information indicating the first TA 43. Alternatively, the terminal device 200 (the control unit 243) adjusts the UL transmission timing in the UL band on the basis of the DL reception timing in the UL band and information indicating the second TA 45.

(c) Technique of Instruction (c-1) Reporting of Timing Advance Command

The base station 100 (the control unit 153) gives the instruction on the first TA and the instruction on the second TA, for example, by reporting a timing advance (TA) command.

Individual TA Commands

The TA command includes, for example, a TA command for the first TA and a TA command for the second TA. In other words, the base station 100 (the control unit 153) gives an instruction on the first TA by reporting the TA command for the first TA, and gives an instruction on the second TA by reporting the TA command for the second TA.

The terminal device 200 (control unit 243) generates information indicating the first TA on the basis of the TA command for the first TA, and generates information indicating the second TA on the basis of the TA command for the second TA.

Specifically, the base station 100 (the control unit 153) reports, for example, a TA command indicating $T_{A1}$ for adjusting the first TA to the terminal device 200. Further, the base station 100 (the control unit 153) reports a TA command indicating $T_{A2}$ for adjusting the second TA to the terminal device 200. The terminal device 200 computes, for example, $N_{TA1}$ for the first TA from $T_{A1}$. In other words, the terminal device 200 generates $N_{TA1}$ which is information indicating the first TA. Then, the terminal device 200 adjusts a UL transmission timing in the UL band on the basis of a DL reception timing in the DL band and $N_{TA1}$. Alternatively, the terminal device 200 computes $N_{TA2}$ for the second TA from $T_{A2}$. In other words, the terminal device 200 generates $N_{TA2}$ which is information indicating the second TA. Then, the terminal device 200 adjusts a UL transmission timing in the UL band on the basis of a DL reception timing in the UL band and $N_{TA2}$.

Accordingly, it is possible to update, for example, the two TAs individually. Thus, the terminal device 200 can appropriately adjust the UL transmission timing in the UL band on the basis of any of the DL reception timing in the DL band and the DL reception timing in the UL. In addition, a timing can be adjusted with higher accuracy by adjusting the UL transmission timing in the UL band on the basis of the DL reception timing in the UL band, rather than the DL reception timing in the DL band in which delay dispersion is different from the UL band.

Timing Advance Group (TAG)

The TA command for the first TA is, for example, a command for a first TAG, and the TA command for the second TA is a command for a second TAG which is different from the first TAG Specifically, the base station 100 transmits, for example, an MAC control element including the TA command for the first TA and a TAG ID of the first TAG to the terminal device 200. Further, the base station 100 transmits an MAC control element including the TA command for the second TA and a TAG ID of the second TAG to the terminal device 200.

Accordingly, the terminal device 200 can distinguish, for example, the TA command for the first TA from the TA command for the second TA.

(c-2) Reporting of Offset

The base station 100 (the control unit 153) may give an instruction on one of the first TA and the second TA by reporting a TA command and an instruction on the other of the first TA and the second TA by reporting information indicating an offset between the first TA and the second TA (which will be referred to as "offset information" hereinbelow).

The terminal device 200 (the control unit 243) may generate information indicating one of the first TA and the second TA on the basis of the TA command and generate information indicating the other of the first TA and the second TA on the basis of the information and the offset information.

One of the first TA and the second TA may be the first TA, and the other of the first TA and the second TA may be the second TA.

Specific Example

Specifically, the base station 100 (the control unit 153) may report a TA command indicating $T_{A1}$ for adjusting the first TA to the terminal device 200. The terminal device 200 may compute $N_{TA1}$ for the first TA from $T_{A1}$. In other words, the terminal device 200 may generate $N_{TA1}$ which is information indicating the first TA. In addition, the base station 100 (the control unit 153) may report $N_{TA\_offset}$ which is information indicating an offset between the first TA and the second TA (offset information) (which is, for example, included in system information, or through signaling) to the terminal device 200. The terminal device 200 may compute $N_{TA2}$ from $N_{TA1}$ and $N_{TA\_offset}$ (e.g., $N_{TA1}+N_{TA\_offset}$). In other words, the terminal device 200 may generate $N_{TA2}$ which is information indicating the second TA. Note that $N_{TA\_offset}$ may be a predetermined value (e.g., 624).

Offset Use Methods

Use for Switch of Operation Mode

When the operation mode of the UL band is switched from the first mode to the second mode, the terminal device 200 may generate the information indicating the second TA (e.g., $N_{TA2}$) from the information indicating the first TA (e.g., $N_{TA1}$) and the offset information (e.g., $N_{TA\_offset}$) as an initial value. Then, the terminal device 200 may generate (update) the information indicating the second TA (e.g., $N_{TA2}$) on the basis of the second TA command.

Continuous Use

Alternatively, the terminal device 200 may continuously generate the information indicating the second TA (e.g., $N_{TA2}$) from the information indicating the first TA (e.g., $N_{TA1}$) and the offset information (e.g., $N_{TA\_offset}$).

Examples of Reporting

Reporting Methods

The base station 100 (the control unit 153) may report the offset information included in system information. Alternatively, the base station 100 (the control unit 153) may report the offset information through signaling.

Reporting Timing

The base station 100 (the control unit 153) may report the offset information when the operation mode is the first mode, without being limited to the case in which the operation mode is the second operation mode. In other words, the base station 100 (the control unit 153) may give the instruction on the second TA when the operation mode is the first mode, without being limited to the case in which the operation mode is the second operation mode.

Others

Instead of reporting of the offset information (e.g., $N_{TA\_offset}$) by the base station 100 to the terminal device 200, the offset information may be stored in the terminal device 200 beforehand.

(d) Selection of Timing Adjustment Method of Terminal Device 200

(d-1) UL Data

The base station 100 transmits, for example, scheduling information of UL data to the terminal device 200 in the DL band. The terminal device 200 (the control unit 243) adjusts a UL transmission timing in the UL band on the basis of a DL reception timing in the DL band and the information indicating the first TA, for example, for transmission of the UL data.

The base station 100 transmits, for example, scheduling information of UL data to the terminal device 200 using DL subframes in the UL band. In this case, the terminal device 200 (the control unit 243) adjusts a UL transmission timing in the UL band on the basis of a DL reception timing in the UL band and the information indicating the second TA, for example, for transmission of the UL data.

(d-2) ACK/NACK

The terminal device 200 (the control unit 243) adjusts a UL transmission timing in the UL band on the basis of a DL reception timing in the DL band and the information indicating the first TA, for example, for transmission of an ACK/NACK of DL data transmitted in the DL band.

The terminal device 200 (the control unit 243) adjusts a UL transmission timing in the UL band on the basis of a DL reception timing in the UL band and the information indicating the second TA, for example, for transmission of an ACK/NACK of DL data transmitted in the UL band.

(3) Others (a) UL/DL Configurations in UL Band

The base station 100 (the control unit 153) performs radio communication in the UL band in accordance with, for example, a UL/DL configuration when the operation mode of the UL band is the second mode.

(a-1) Examples of UL/DL Configurations

The UL/DL configuration is, for example, a UL/DL configuration of TDD. More specifically, the UL/DL configuration is, for example, one of Configurations 0 to 6 shown in FIG. 4.

Note that the UL/DL configuration may be another configuration (e.g., a configuration unique to FDD), rather than a UL/DL configuration of TDD.

(a-2) Selection of UL/DL Configuration

The base station 100 (the control unit 153) selects a UL/DL configuration and applies the UL/DL configuration to the UL band when, for example, the operation mode is switched from the first mode to the second mode.

The base station 100 (the control unit 153) selects a UL/DL configuration having a proper ratio of DL subframes and UL subframes on the basis of, for example, an amount of traffic in DL and an amount of traffic in UL in the cell 101.

(a-3) Change of UL/DL Configuration

The base station 100 (the control unit 153) may change a UL/DL configuration in the UL band from among a plurality of UL/DL configuration candidates when the operation mode is the second mode. For example, the base station 100 (the control unit 153) may change the UL/DL configuration in the UL band as in a fifth embodiment to be described below.

(a-4) Reporting of UL/DL Configuration

The base station 100 (the control unit 153) reports, for example, information indicating a UL/DL configuration in the UL (which will be referred to as "configuration information" below) to the terminal device 200.

As an example, the base station 100 (the control unit 153) reports the configuration information included in system information to the terminal device 200. The configuration information may be included in system information as new information. Alternatively, the configuration information may be included in system information transmitted using DL subframes in the UL band as information indicating a UL/DL configuration of TDD.

As another example, the base station 100 (the control unit 153) reports the configuration information to the terminal device 200 through individual signaling to the terminal device 200.

(b) Random Access (b-1) Random Access Time/Frequency Domain

The base station 100 gives a notification of, for example, a physical random access channel (PRACH) configuration index and a PRACH frequency offset included in a system information block (SIB) 2. Accordingly, the terminal device 200 can ascertain, for example, a radio resource (random access time/frequency domain) on which transmission of a random access preamble is permitted.

In FDD, only one random access time/frequency domain is deployed per subframe. It is possible to ascertain the subframe included in a radio frame in which random access time/frequency domain is deployed from a PRACH configuration index. It is possible to ascertain the resource block in which a random access time/frequency domain is deployed from a PRACH frequency offset.

The base station 100 deploys a random access time/frequency domain in a UL subframe when the operation mode of the UL band is the second mode.

(b-2) Random Access Procedure

The terminal device 200 transmits a random access preamble in a random access time/frequency domain for a transition from an idle state to a connected state.

The base station 100 transmits, for example, a random access response to the terminal device 200. At this time, the base station 100 reports a TA command to the terminal device 200. The base station 100 reports, for example, a TA command for the first TA to the terminal device 200. Alternatively, the base station 100 may report a TA command for the first TA and a TA command for the second TA to the terminal device 200.

(c) Transmission of Synchronization Signal

The base station 100 transmits, for example, a synchronization signal in the UL band when the operation mode of the UL band is the second mode.

The control unit 243 of the base station 100 performs a process for transmitting the synchronization signal in the UL band when the operation mode is the second mode. Specifically, the control unit 243 performs generation of the synchronization signal and/or mapping of the synchronization signal to radio resources.

Accordingly, the terminal device 200 can, for example, attain correct synchronization in the UL band.

(c-1) Synchronization Signal

The synchronization signal is, for example, a signal corresponding to a cell ID, like a synchronization signal transmitted in the DL band. More specifically, the synchronization signal is, for example, a primary synchronization signal (PSS) and a secondary synchronization signal (SSS).

(c-2) Transmission in Predetermined Subframe

The second mode is, for example, a mode in which the UL band is used for both DL and UL in a time division manner and the UL band is used for DL with at least predetermined subframes of a radio frame. In addition, the control unit 243 of the base station 100 transmits the synchronization signal on the predetermined subframes of the radio frame.

The control unit 243 of the base station 100 performs a process for transmitting the synchronization signal in the UL band when the operation mode is the second mode such that the synchronization signal is transmitted in the predetermined subframes of the radio frame.

As an example, similarly to a general case of TDD, the predetermined subframes may be subframes whose subframe numbers are 1 and 6 (subframes for PSS) and subframes whose subframe numbers are 0 and 5 (subframes for SSS). As another example, similarly to a general case of FDD, the predetermined subframes may be subframes whose subframe numbers are 0 and 5 (subframes for PSS and SSS).

Accordingly, the synchronization signal is, for example, reliably transmitted in the UL band and the terminal device 200 can reliably attain synchronization in the UL band.

(c-3) Operation of Terminal Device

The terminal device 200 (the control unit 243) attains synchronization in the UL band on the basis of the synchronization signal.

(d) Scheduling

The base station 100 (the control unit 153) performs, for example, radio resource allocation (i.e., scheduling).

(d-1) Legacy Terminal

Allocation of DL Resources

The base station 100 (the control unit 153) allocates, for example, radio resources of the DL band to a legacy terminal (i.e., a terminal device that does not support the second mode) as DL resources.

Particularly when the operation mode of the UL band is the second mode, the base station 100 (the control unit 153) allocates, for example, radio resources of the DL band included in the subframe 4 subframes before a UL subframe of the UL band to a legacy terminal. Accordingly, the legacy terminal can, for example, transmit an ACK/NACK of DL data that has is transmitted on the radio resources using the UL band.

Reporting of Scheduling Information

The base station 100 (the control unit 153) reports, for example, scheduling information (i.e., information indicating radio resource allocation) to the legacy terminal using the DL band. More specifically, the base station 100 (the control unit 153) reports scheduling information regarding, for example, a physical downlink shared channel (PDSCH) of the DL band and a physical uplink shared channel (PUSCH) of the UL band to the legacy terminal using a physical downlink control channel (PDCCH) of the DL band.

(d-2) Terminal Device 200

Allocation of DL Resources

The base station 100 (the control unit 153) allocates, for example, radio resources of the DL band or radio resources of the UL band (radio resources included in DL subframes) to the terminal device 200 (i.e., a terminal device that supports the second mode) as DL resources.

The terminal device 200 may perform measurement based on a reference signal transmitted in DL subframes in the UL band and notify the base station 100 of a measurement result. Then, the base station 100 (the control unit 153) may allocate radio resources of the UL band (radio resources included in DL subframes) to the terminal device 200 if the measurement result is favorable (e.g., if reception power is sufficiently high).

Reporting of Scheduling Information

DL Band

The base station 100 (the control unit 153) reports, for example, scheduling information regarding the DL band to the terminal device 200 using the DL band. More specifically, the base station 100 (the control unit 153) reports, for example, scheduling information for a PDSCH of the DL band to the terminal device 200 using a PDCCH of the DL band.

UL Band (DL Resources)

When the operation mode is the second mode, for example, the base station 100 (the control unit 153) reports scheduling information regarding DL resources of the UL band to the terminal device 200 using the DL band. More specifically, the base station 100 (the control unit 153) reports, for example, scheduling information regarding a PDSCH of the UL band to the terminal device 200 using a PDCCH of the DL band. In other words, cross carrier scheduling is performed.

Alternatively, when the operation mode is the second mode, the base station 100 (the control unit 153) may report scheduling information regarding DL resources of the UL band to the terminal device 200 using the UL band. More specifically, the base station 100 (the control unit 153) may report scheduling information regarding a PDSCH of the UL band to the terminal device 200 using a PDCCH of the UL band.

UL Band (UL Resources)

When the operation mode is the second mode, for example, the base station 100 (the control unit 153) reports scheduling information regarding UL resources of the UL band to the terminal device 200 using the DL band. More specifically, the base station 100 (the control unit 153) reports, for example, scheduling information regarding a PUSCH of the UL band to the terminal device 200 using a PDCCH of the DL band.

Alternatively, when the operation mode is the second mode, the base station 100 (the control unit 153) may report scheduling information regarding UL resources of the UL band to the terminal device 200 using the UL band. More specifically, the base station 100 (the control unit 153) may report scheduling information regarding a PUSCH of the UL band to the terminal device 200 using a PDCCH of the UL band.

(e) Reporting of Capability Information

The terminal device 200 reports, for example, capability information indicating a possibility of flexible duplex to the base station 100. The capability information indicates, for example, a possibility of flexible duplex for each band combination that the terminal device 200 supports. Accordingly, the base station 100 can ascertain that, for example, the terminal device 200 supports the second mode.

Note that the capability information may further indicate a possibility of DL carrier aggregation and a possibility of UL carrier aggregation (for each band combination that the terminal device 200 supports).

<4.3. Process Flow>

Next, examples of processes according to the first embodiment will be described with reference to FIGS. 13 and 14.

(1) Process in First Mode

Figure 13:
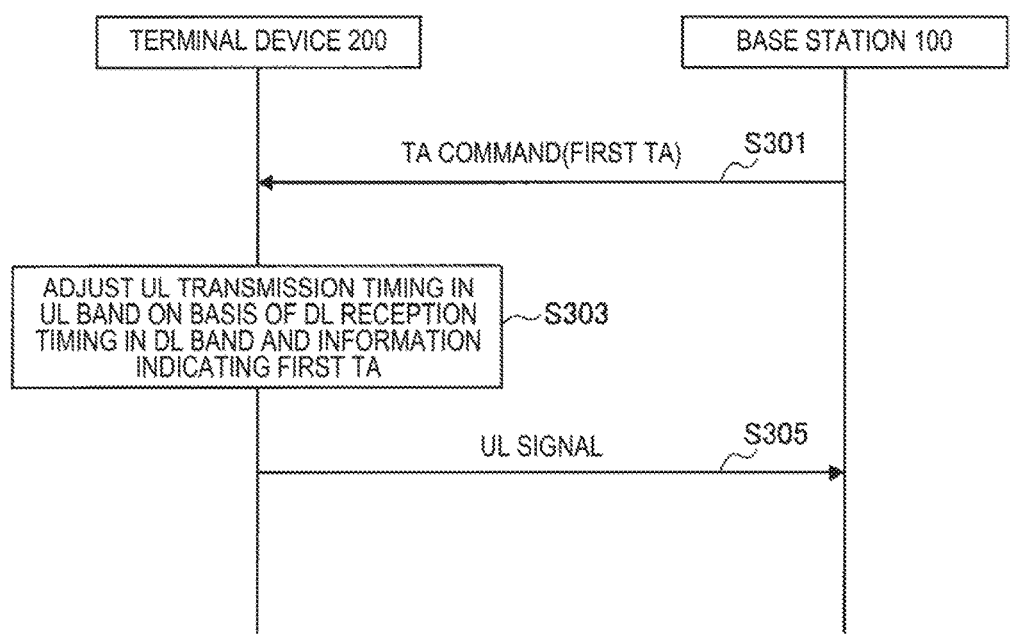
FIG. 13 is a sequence diagram showing an example of a schematic flow of a process in a first mode according to a first embodiment.

FIG. 13 is a sequence diagram showing an example of a schematic flow of a process in the first mode according to the first embodiment.

The base station 100 reports a TA command for a first TA to the terminal device 200 (S301). The first TA is a TA on the basis of a DL reception timing in a DL band of FDD.

The terminal device 200 adjusts a UL transmission timing in a UL band of FDD on the basis of the DL reception timing in the DL band and information indicating the first TA (S303). Then, the terminal device 200 performs UL transmission in the UL band (S305). That is, the terminal device 200 transmits a UL signal in the UL band.

(2) Process in Second Mode

Figure 14:
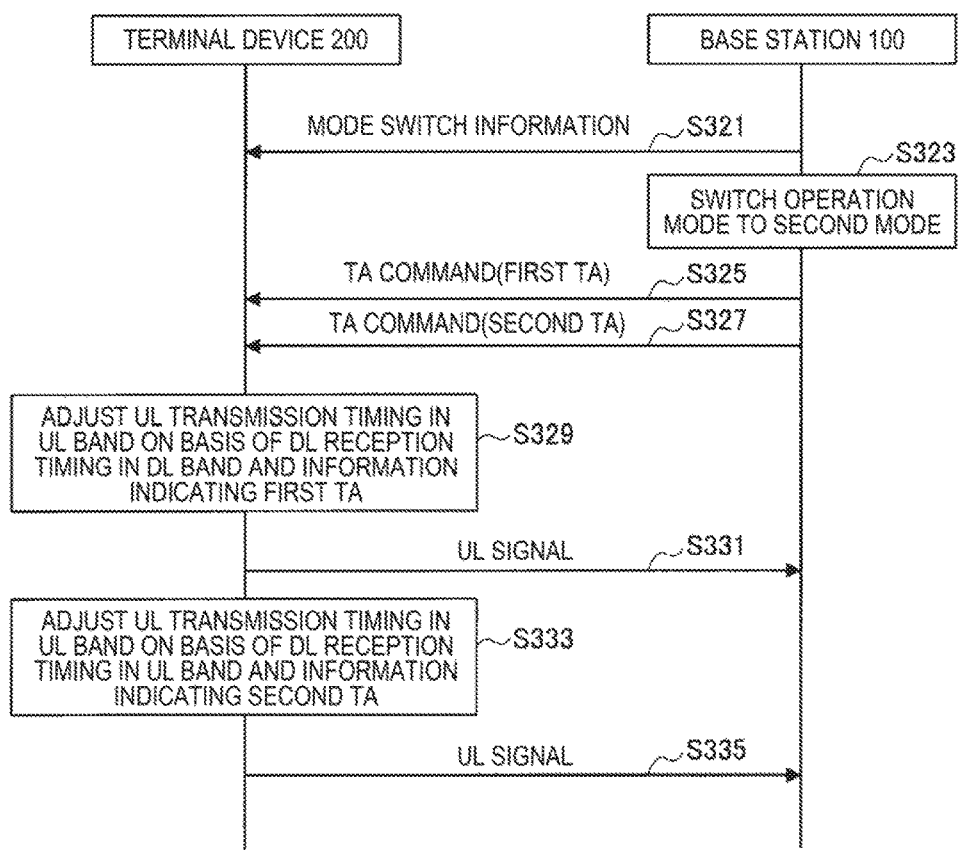
FIG. 14 is a sequence diagram showing an example of a schematic flow of a process in a second mode according to the first embodiment.

FIG. 14 is a sequence diagram showing an example of a schematic flow of a process in the second mode according to the first embodiment.

The base station 100 reports mode switch information to the terminal device 200 (S321). The mode switch information is information indicating a switch of an operation mode of the UL band between the first mode and the second mode. The mode switch information in particular indicates a switch of the operation mode from the first mode to the second mode. The first mode is a mode in which the UL band is used UL, and the second mode is a mode in which the UL band is used for both DL and UL in a time division manner.

The base station 100 switches the operation mode from the first mode to the second mode (S323).

The base station 100 reports a TA command for a first TA to the terminal device 200 (S325). The first TA is a TA on the basis of a DL reception timing in the DL band. Furthermore, the base station 100 reports a TA command for a second TA to the terminal device 200 (S327). The second TA is a TA on the basis of a DL reception timing in the UL band.

The terminal device 200 adjusts a UL transmission timing in the UL band on the basis of the DL reception timing in the DL band and the information indicating the first TA (S329). Then, the terminal device 200 performs UL transmission in the UL band (S331). That is, the terminal device 200 transmits a UL signal in the UL band.

The terminal device 200 adjusts a UL transmission timing in the UL band on the basis of the DL reception timing in the UL band and information indicating the second TA (S333). Then, the terminal device 200 performs UL transmission in the UL band (S335). That is, the terminal device 200 transmits a UL signal in the UL band.

The first embodiment has been described above. According to the first embodiment, it is possible to perform radio communication more favorably in a UL band of FDD when, for example, the UL band is used for both DL and UL.

More specifically, the terminal device 200 can appropriately adjust, for example, a UL transmission timing in the UL band on the basis of any of a DL reception timing in the DL band and a DL reception timing in the UL band. Thus, even when the UL band is used for both DL and UL in a time division manner, synchronization of UL reception timings of the base station 100 is realized. As a result, radio communication can be performed more favorably in the UL band.

5. Second Embodiment

Next, a first embodiment of the present disclosure will be described with reference to FIG. 15.

<5.1. Technical Problem>

A technical problem of the second embodiment is the same as that of the first embodiment. Thus, overlapping description is omitted here.

<5.2. Technical Features>

Next, technical features of the second embodiment will be described.

(1) Switch of Operation Mode

The base station 100 (the switching unit 151) switches an operation mode of a UL band of FDD between a first mode in which the UL band is used for UL and a second mode in which the UL band is used for both DL and UL in a time division manner.

There is no difference in description of a switch of an operation mode between the first and second embodiments. Thus, overlapping description is omitted here.

(2) Instruction on Timing Advance

In the second embodiment, the base station 100 (the control unit 153) gives an instruction on a first TA on the basis of a DL reception timing in the DL band and an instruction on a second TA on the basis of a DL reception timing in the UL band.

In the second embodiment, in particular, the instruction on the first TA is an instruction to a legacy terminal that does not support the second mode, and the instruction on the second TA is an instruction to the terminal device 200 that supports the second mode.

Meanwhile, the legacy terminal adjusts a UL transmission timing in the UL band on the basis of a DL reception timing in the DL band and information indicating the first TA. In the second embodiment, in particular, the terminal device 200 (the control unit 243) adjusts a UL transmission timing in the UL band on the basis of a DL reception timing in the UL band and information indicating the second TA when the operation mode is the second mode. Accordingly, the terminal device 200 can appropriately adjust, for example, the UL transmission timing in the UL band even when the UL band is used for both DL and UL in a time division manner.

(a) Instruction in Second Mode

The base station 100 (the control unit 153) gives the instruction on the first TA and the instruction on the second TA when, for example, the operation mode is the second mode.

(b) First TA and Second TA

The second TA is, for example, longer than the first TA.

There is no difference in description of examples of the first TA and the second TA between the first and second embodiments. Thus, overlapping description is omitted here.

(c) Instructing Method

The base station 100 (the control unit 153) gives the instruction on the first TA and the instruction on the second TA by, for example, reporting a timing advance (TA) command.

Individual TA Commands

The TA command includes, for example, a TA command for the first TA and a TA command for the second TA. In other words, the base station 100 (the control unit 153) gives the instruction on the first TA by reporting a TA command for the first TA and the instruction on the second TA by reporting a TA command for the second TA.

The legacy terminal generates, for example, information indicating the first TA on the basis of the TA command for the first TA. The terminal device 200 (the control unit 243) generates information indicating the second TA on the basis of the TA command for the second TA.

(3) Others (a) UL/DL Configurations in UL Band

There is no difference in description of UL/DL configurations between the first and second embodiments. Thus, overlapping description is omitted here.

(b) Random Access (b-1) Random Access Time/Frequency Domain

There is no difference in description of random access time/frequency domains between the first and second embodiments. Thus, overlapping description is omitted here.

(b-2) Random Access Procedure

The terminal device 200 transmits a random access preamble in a random access time/frequency domain for a transition from an idle state to a connected state.

The base station 100 transmits, for example, a random access response to the terminal device 200. At this time, the base station 100 reports a TA command to the terminal device 200. When the operation mode is the second mode in the UL band, in particular, the base station 100 reports a TA command for the second TA to the terminal device 200.

Note that, when the operation mode is the first mode, the base station 100 reports a TA command for a first TA (a TA on the basis of a DL reception timing in the DL band) to the terminal device 200. Here, "first TA" simply means a TA on the basis of a DL reception timing in the DL band, and does not mean a TA for a specific terminal (e.g., the legacy terminal). That is, a "first TA" for the terminal device 200 is a different TA from a "first TA" for the legacy terminal.

(c) Transmission of Synchronization Signal

There is no difference in description of transmission of a synchronization signal between the first and second embodiments. Thus, overlapping description is omitted here.

(d) Scheduling

There is no difference in description of scheduling between the first and second embodiments. Thus, overlapping description is omitted here.

(e) Reporting of Capability Information

There is no difference in description of reporting of capability information between the first and second embodiments. Thus, overlapping description is omitted here.

<5.3. Process Flow>

Next, an example of a process according to the second embodiment will be described with reference to FIG. 15.

(1) Process in First Mode

There is no difference in description of a process in the first mode between the first and second embodiments. Thus, overlapping description is omitted here.

(2) Process in Second Mode

Figure 15:
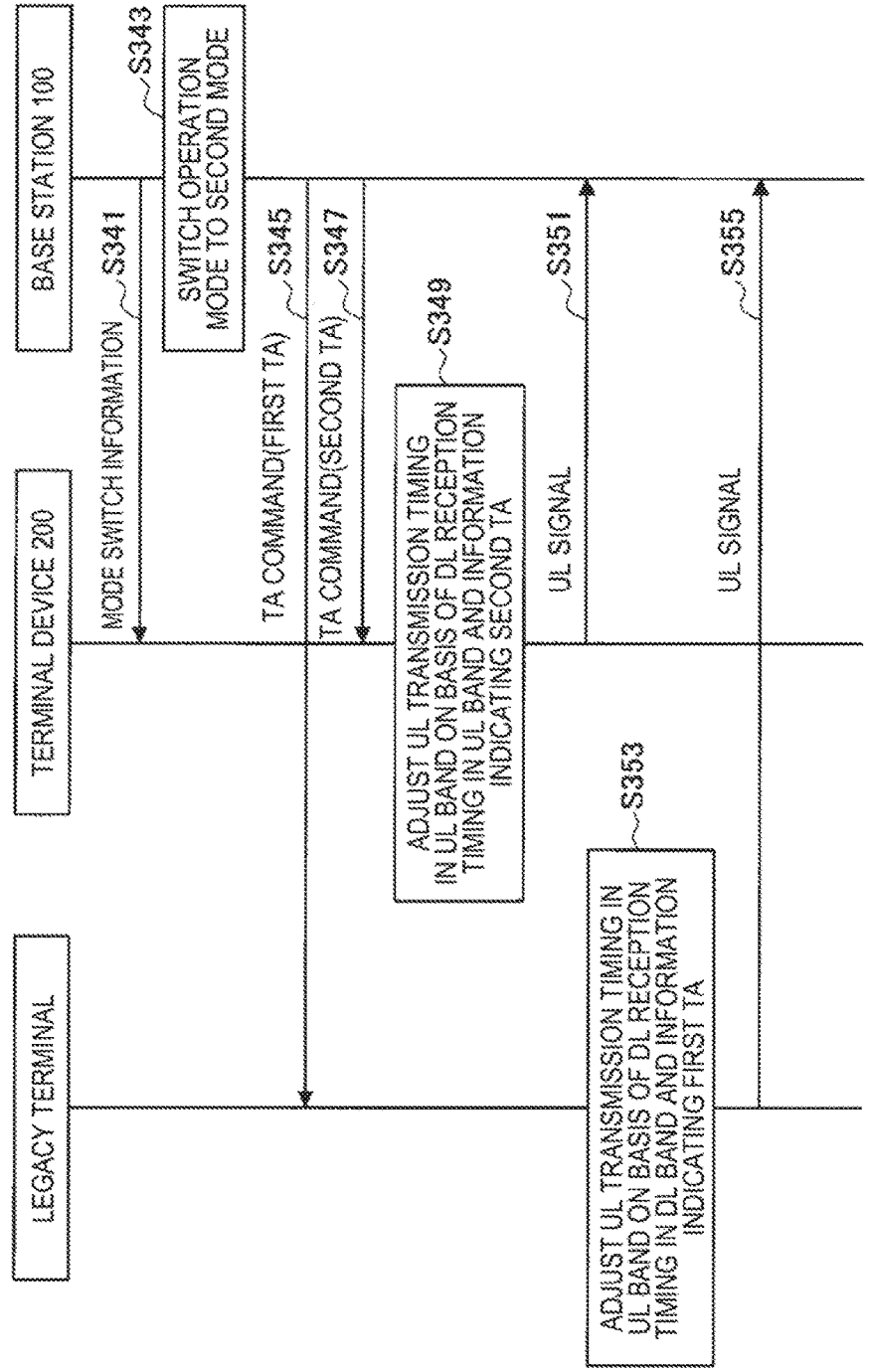
FIG. 15 is a sequence diagram showing an example of a schematic flow of a process in a second mode according to the first embodiment.

FIG. 15 is a sequence diagram showing an example of a schematic flow of a process in the second mode according to the second embodiment.

The base station 100 reports mode switch information to the terminal device 200 (S341). The mode switch information is information indicating a switch of an operation mode of the UL band between the first mode and the second mode. The mode switch information in particular indicates a switch of the operation mode from the first mode to the second mode. The first mode is a mode in which the UL band is used UL, and the second mode is a mode in which the UL band is used for both DL and UL in a time division manner.

The base station 100 switches the operation mode from the first mode to the second mode (S343).

The base station 100 reports a TA command for a first TA to the legacy terminal (S345). The first TA is a TA on the basis of a DL reception timing in the DL band. Furthermore, the base station 100 reports a TA command for a second TA to the terminal device 200 (S347). The second TA is a TA on the basis of a DL reception timing in the UL band.

The terminal device 200 adjusts a UL transmission timing in the UL band on the basis of the UL reception timing in the DL band and the information indicating the second TA (S349). Then, the terminal device 200 performs UL transmission in the UL band (S351). That is, the terminal device 200 transmits a UL signal in the UL band.

The legacy terminal adjusts a UL transmission timing in the UL band on the basis of the DL reception timing in the DL band and the information indicating the first TA (S353). Then, the legacy terminal performs UL transmission in the UL band (S355). That is, the terminal device 200 transmits a UL signal in the UL band.

The second embodiment has been described above. According to the second embodiment, it is possible to perform radio communication more favorably in a UL band of FDD when, for example, the UL band is used for both DL and UL.

More specifically, when the operation mode is the second mode, for example, the terminal device 200 adjusts a UL transmission timing in the UL band on the basis of a DL reception timing in the UL band and not on the basis of a DL reception timing in the DL band. Thus, even when the UL band is used for both DL and UL in a time division manner, synchronization of a UL reception timing of the base station 100 is realized. As a result, radio communication can be performed more favorably in the UL band. In addition, since the number of TAs for the terminal device 200 does not increase, an increase in overhead of signaling can be suppressed.

6. Third Embodiment

Next, a third embodiment of the present disclosure will be described with reference to FIGS. 16 and 17.

<6.1. Technical Problem>

A technical problem of the second embodiment is the same as that of the third embodiment. Thus, overlapping description is omitted here.

<5.2. Technical Features>

Next, technical features of the third embodiment will be described with reference to FIG. 16.

(1) Switch of Operation Mode

The base station 100 (the switching unit 151) switches an operation mode of a UL band of FDD between the first mode in which the UL band is used for UL and the second mode in which the UL band is used for both DL and UL in a time division manner.

(a) Trigger of Switch

There is no difference in description of a trigger of a switch of the operation mode between the first and third embodiments. Thus, overlapping description is omitted here.

(b) Reporting of Switch

There is no difference in description of reporting of a switch of the operation mode between the first and third embodiments. Thus, overlapping description is omitted here.

(c) Operation of Terminal Device 200 Corresponding to Switch

There is no difference in description of an operation of the terminal device 200 corresponding to a switch of the operation mode between the first and third embodiments. Thus, overlapping description is omitted here.

(2) Downlink Transmission Timings

In the third embodiment, when the operation mode is the second mode, the base station 100 (the control unit 153) synchronizes a DL transmission timing in a DL band of FDD corresponding to the UL band with a DL transmission timing in the UL band. A specific example of this subject will be described below with reference to FIG. 16.

Figure 16:
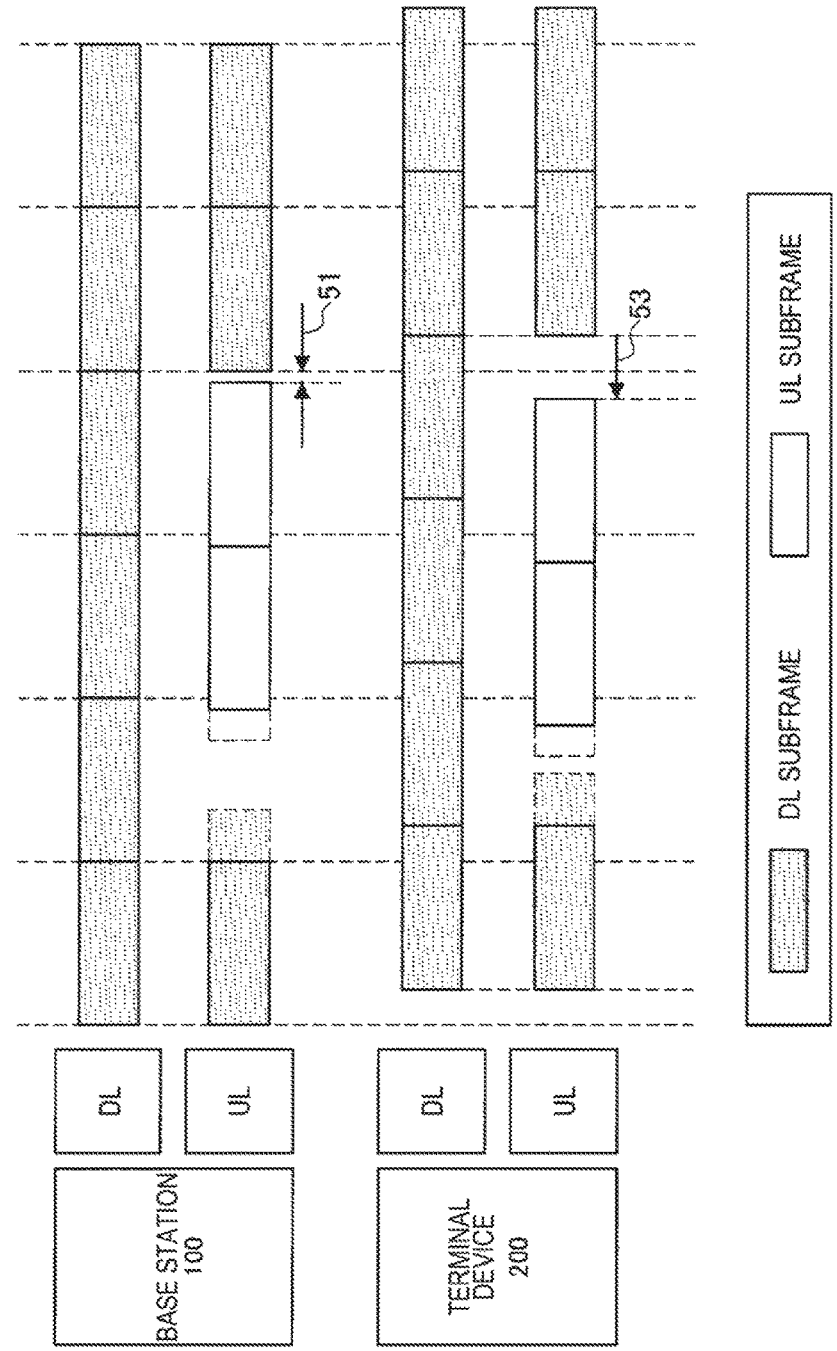
FIG. 16 is an explanatory diagram for describing examples of DL transmission timings in a DL band and a UL band.
Figure 17:
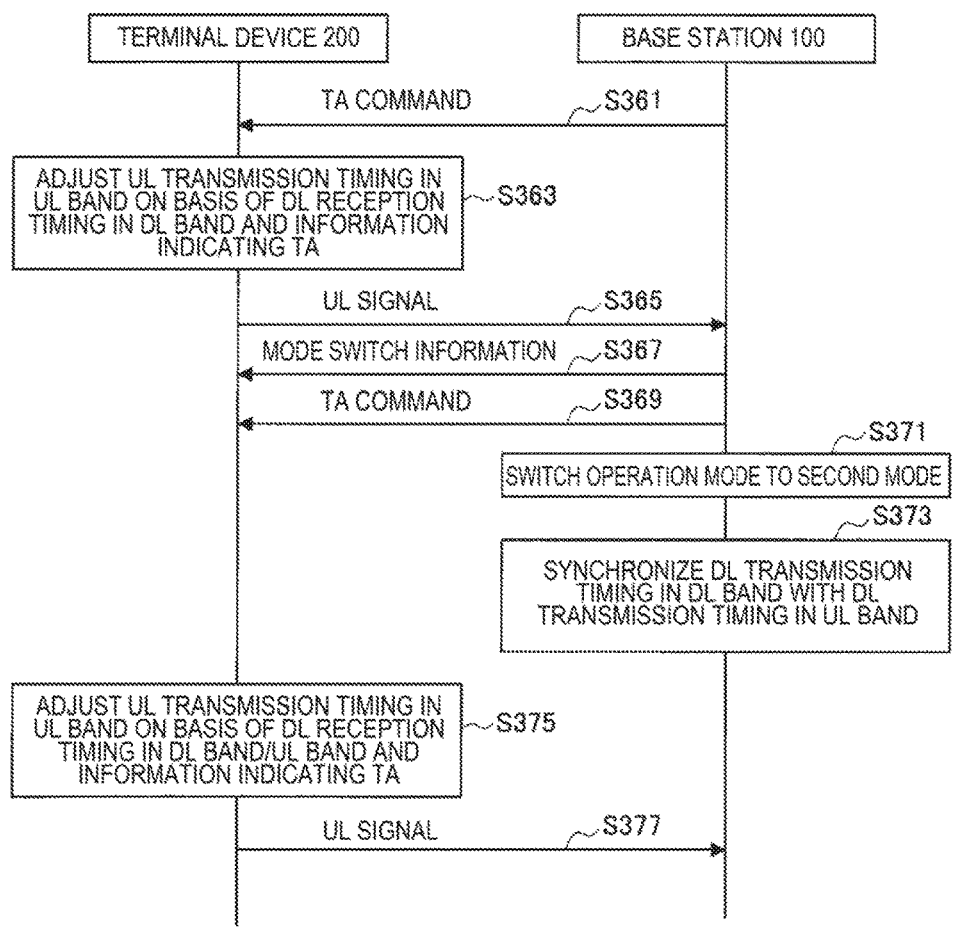
FIG. 17 is a sequence diagram showing an example of a schematic flow of a process according to a third embodiment.

FIG. 16 is an explanatory diagram for describing examples of DL transmission timings in a DL band and a UL band. Referring to FIG. 16, transmission and reception timings of the base station 100 and the terminal device 200 when an operation mode of the UL band is the second mode are shown. A time 51 is necessary for the base station 100 to switch from UL to DL in the UL band. In the second embodiment, however, the base station 100 synchronizes a DL transmission timing in the UL band with a DL transmission timing in the DL band in consideration of the time 51. As a result, for the terminal device 200, for example, a DL reception timing in the DL band is synchronized with a DL reception timing in the UL band. Thus, the terminal device 200 adjusts a UL transmission timing in the UL band on the basis of the DL reception timing (the DL reception timing in the DL band or the DL reception timing in the UL band) and a TA 53.

Accordingly, the terminal device 200 can appropriately adjust the UL transmission timing in the UL band even when, for example, the UL band is used for both DL and UL in a time division manner.

Note that, in the present specification, "synchronize timings" may not mean "synchronize the timings so that there is no difference between the timings," but may mean, for example, "synchronize the timings so that the difference between the timings falls within a predetermined range."

(3) Uplink Reception Timings (a) Second Mode

At least when the operation mode is the second mode, for example, a UL reception timing in the UL band is a predetermined period of time earlier than a DL transmission timing in the DL band. The predetermined period of timing is, for example, the time required to switch from UL to DL in the UL band.

Referring to FIG. 16 again, the UL reception timing of the base station 100 in the UL band is a time 51 (i.e., time required to switch from UL to DL in the UL band) earlier than the DL transmission timing of the DL band.

Accordingly, the terminal device 200 can synchronize the DL transmission timing in the DL band with the DL transmission timing in the UL band even when, for example, the UL band is used for both DL and UL in a time division manner.

(b) First Mode (b-1) First Example

As a first example, when the operation mode is the first mode, a UL reception timing of the base station 100 in the UL band is synchronized with a DL transmission timing in the DL band. That is, the base station 100 sets the UL reception timing in the UL band to be the predetermined period of time earlier when the operation mode is switched from the first mode to the second mode.

(b-2) Second Example

As a second example, even when the operation mode is the first mode, a UL reception timing of the base station 100 in the UL band may be the predetermined period of time earlier than a DL transmission timing in the DL band. That is, the base station 100 may not change the UL reception timing in the UL band even when the operation mode has been switched.

(4) Instruction on Timing Advance (a) First Example

As described above, as the first example, the UL reception timing in the UL band is synchronized with the DL transmission timing in the DL band when the operation mode is the first mode. In addition, when the operation mode is the second mode, the UL reception timing in the UL band is the predetermined period of time earlier than the DL transmission timing in the DL band.

The base station 100 (the control unit 153) gives an instruction on a TA of UL transmission in the UL band such that the TA is lengthened by the predetermined period of time in accordance with a switch of the operation mode from the first mode to the second mode. The instruction is an instruction to the terminal device 200. Accordingly, for example, a UL reception timing in the UL band can be a predetermined period of time earlier in accordance with the switch. As a result, a collision of UL subframes and DL subframes, for example, is avoided.

(a-1) Reporting of TA Command

The base station 100 (the control unit 153) gives the instruction on the TA by, for example, reporting a TA command in a subframe 6 subframes before the switch. The TA command indicates, for example, a value (TA) that sets the TA of UL transmission in the UL band to be lengthened by the predetermined period of time. Accordingly, it is possible to set the TA to be lengthened by the predetermined period of time at, for example, the timing of the switch.

The terminal device 200 (the control unit 243) generates, for example, information indicating a TA (e.g., $N_{TA}$) of UL transmission in the UL band on the basis of the TA command.

Note that the base station 100 (the control unit 153) gives, for example, an instruction on a TA for UL transmission in the UL band so that the TA is shortened by the predetermined period of time before a switch of the operation mode from the second mode to the first mode. For example, the base station 100 (the control unit 153) gives the instruction on the TA by reporting a TA command in a subframe 6 subframes before the switch.

(a-2) Reporting of Offset

The base station 100 (the control unit 153) may give the instruction on the TA by reporting information indicating an offset corresponding to the predetermined period of time (which will be referred to as "offset information").

The terminal device 200 (the control unit 243) may generate information indicating a TA (e.g., $N_{TA}$) of UL transmission in the UL band on the basis of the offset information.

Specific Example

Specifically, the base station 100 (the control unit 153) may report offset information $N_{TA\_offset}$ (which is, for example, included in system information, or through signaling) to the terminal device 200. The terminal device 200 may compute new $N_{TA}$ from $N_{TA}$ and $N_{TA\_offset}$. In other words, the terminal device 200 may generate new $N_{TA}$ which is information indicating the TA. Note that $N_{TA\_offset}$ may be a predetermined value (e.g., 624).

Offset Use Method (Use at Time of Switch of Operation Mode)

The terminal device 200 may generate the information indicating the TA (e.g., $N_{TA}$) on the basis of the offset information when the operation mode of the UL band is switched from the first mode to the second mode. Then, the terminal device 200 may generate (update) the information indicating the TA (e.g., $N_{TA}$) on the basis of a TA command.

Example of Reporting

The base station 100 (the control unit 153) may report the offset information included in system information. Alternatively, the base station 100 (the control unit 153) may report the offset information through individual signaling. The individual signaling may be RRC signaling.

Others

Instead of reporting of the offset information (e.g., $N_{TA\_offset}$) by the base station 100 to the terminal device 200, the offset information may be stored in the terminal device 200 beforehand.

(b) Second Example

As a second example, the UL reception timing in the UL band may be the predetermined period of time earlier than the DL transmission timing in the DL band regardless of whether the operation mode is the first mode or the second mode, as described above.

In this case, the base station 100 (the control unit 153) may give an instruction on a TA of UL transmission in the UL band regardless of the presence or absence of the switch of the operation mode. For example, the base station 100 (the control unit 153) may give an instruction on the TA by reporting a TA command as usual.

(c) Operation of Terminal Device 200

The terminal device 200 (the control unit 243) adjusts, for example, the UL transmission timing in the UL band on the basis of a DL reception timing and a TA of UL transmission in the UL band. When the operation mode is the first mode, the DL reception timing is a DL reception timing in the DL band. When the operation mode is the second mode, the DL reception timing may be a DL reception timing in the DL band, or a DL reception timing in the UL band.

(5) Others (a) Reporting of UL/DL Configuration in Uplink Band

There is no difference in description of UL/DL configurations between the first and third embodiments. Thus, overlapping description is omitted here.

(b) Random Access (b-1) Random Access Time/Frequency Domain

There is no difference in description of random access time/frequency domains between the first and third embodiments. Thus, overlapping description is omitted here.

(b-2) Random Access Procedure

The terminal device 200 transmits a random access preamble in a random access time/frequency domain for a transition from an idle state to a connected state.

The base station 100 transmits, for example, a random access response to the terminal device 200. At this time, the base station 100 reports a TA command to the terminal device 200.

(c) Synchronization Signal

Even when the operation mode is the second mode, for example, no synchronization signal is transmitted in the UL band. That is, the base station 100 transmits no synchronization signal in the UL band even when the operation mode is the second mode. It is because the DL transmission timing in the UL band is synchronized with the DL transmission timing in the DL band. Thus, radio resources are, for example, saved.

Alternatively, the base station 100 may transmit a synchronization signal in the UL band when the operation mode is the second mode.

(d) Scheduling

There is no difference in description of scheduling between the first and third embodiments. Thus, overlapping description is omitted here.

(e) Reporting of Capability Information

There is no difference in description of reporting of capability information between the first and third embodiments. Thus, overlapping description is omitted here.

<6.3. Process Flow>

Next, an example of a process according to the third embodiment will be described with reference to FIG. 17. FIG. 17 is a sequence diagram showing an example of a schematic flow of a process according to the third embodiment. Note that it is assumed in the description of the process that an operation mode of a UL band of FDD is initially the first mode.

The base station 100 reports a TA command for a TA to the terminal device 200 (S361).

The terminal device 200 adjusts a UL transmission timing in a UL band of FDD on the basis of the DL reception timing in the DL band of FDD and information indicating the first TA (S363). Then, the terminal device 200 performs UL transmission in the UL band (S365). That is, the terminal device 200 transmits a UL signal in the UL band.

The base station 100 reports mode switch information to the terminal device 200 (S367). The mode switch information is information indicating a switch of an operation mode of the UL band between the first mode and the second mode. The mode switch information in particular indicates a switch of the operation mode from the first mode to the second mode. The first mode is a mode in which the UL band is used UL, and the second mode is a mode in which the UL band is used for both DL and UL in a time division manner.

The base station 100 reports a TA command for a TA to the terminal device 200 before a switch of the operation mode (S369). For example, the base station 100 reports the TA command to the terminal device 200 using a subframe 6 subframes before the switch.

The base station 100 switches the operation mode from the first mode to the second mode (S371). In addition, the base station 100 synchronizes a DL transmission timing in the DL band with a DL transmission timing of the UL band (S373).

The terminal device 200 adjusts a UL transmission timing in the UL band on the basis of the DL reception timing in the DL band or the UL band and the information indicating the first TA (S375). Then, the terminal device 200 performs UL transmission in the UL band (S377). That is, the terminal device 200 transmits a UL signal in the UL band.

The third embodiment has been described above. According to the third embodiment, it is possible to perform radio communication more favorably in a UL band of FDD when, for example, the UL band is used for both DL and UL.

More specifically, the terminal device 200 can appropriately adjust a UL transmission timing in the UL band on the basis of, for example, any of a DL reception timing in the DL band and a DL reception timing in the UL band. Thus, even when the UL band is used for both DL and UL in a time division manner, synchronization of UL reception timings of the base station 100 is realized. As a result, radio communication can be performed more favorably in the UL band. In addition, since the number of TAs for the terminal device 200 does not increase, an increase in overhead of signaling can be suppressed.

7. Fourth Embodiment

Figure 18:
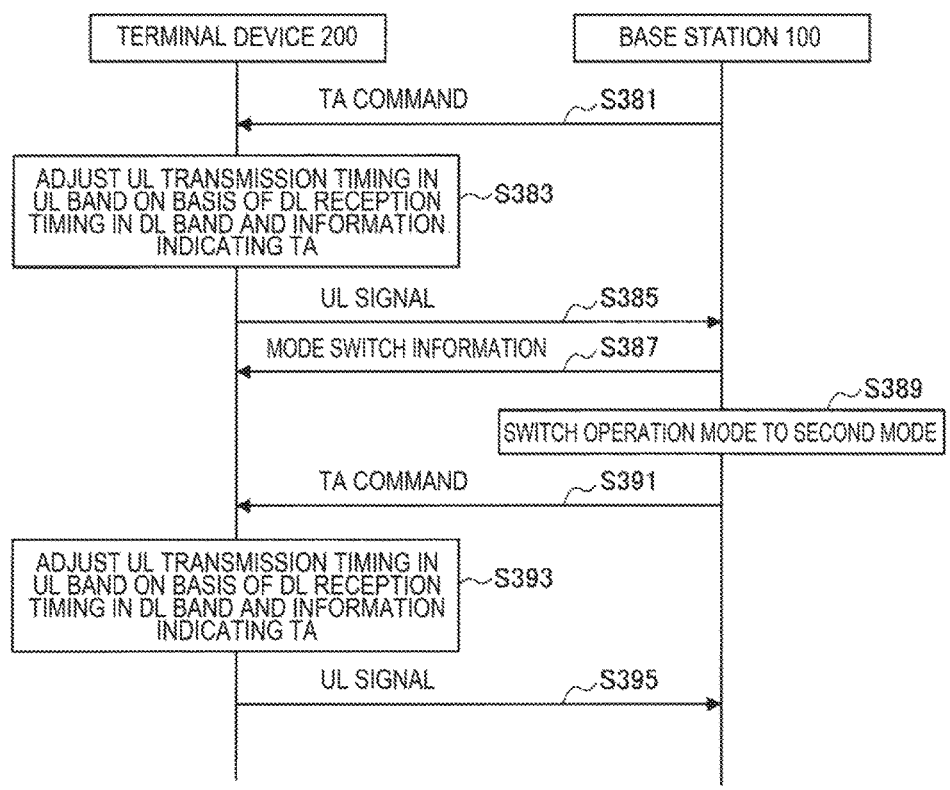
FIG. 18 is a sequence diagram showing an example of a schematic flow of a process according to a fourth embodiment.

Next, a fourth embodiment of the present disclosure will be described with reference to FIG. 18.
<7.1. Technical Problem>
A technical problem of the fourth embodiment is the same as that of the first embodiment. Thus, overlapping description is omitted here.
<7.2. Technical Features>
Next, technical features of the fourth embodiment will be described.
(1) Switch of Operation Mode
The base station 100 (the switching unit 151) switches an operation mode of a UL band of FDD between the first mode in which the UL band is used for UL and the second mode in which the UL band is used for both DL and UL in a time division manner.

There is no difference in description of a switch of an operation mode between the first and fourth embodiments. Thus, overlapping description is omitted here.
(2) Instruction on Timing Advance
In the fourth embodiment, the base station 100 (the control unit 153) gives an instruction on a TA on the basis of a DL reception timing in a DL band of FDD corresponding to the UL band regardless of whether the operation mode is the first mode or the second mode. The instruction is an instruction to the terminal device 200. Note that the base station 100 (the control unit 153) gives no instruction on a TA on the basis of a DL reception timing in the UL band.

On the other hand, in the fourth embodiment, the terminal device 200 (the control unit 243) in particular adjusts a UL transmission timing in the UL band on the basis of the DL reception timing in the DL band regardless of whether the operation mode is the first mode or the second mode.

Specifically, the base station 100 (the control unit 153) gives the instruction on the TA by reporting, for example, a TA command for the TA on the basis of the DL reception timing in the DL band. The terminal device (the information acquisition unit 241) acquires the TA command. Then, the terminal device 200 (the control unit 243) adjusts the UL transmission timing in the UL band on the basis of the DL reception timing in the DL band and information indicating the TA. Note that the terminal device 200 (the control unit 243) generates the information indicating the TA on the basis of the TA command.

Referring to FIG. 11 again, the base station 100 reports, for example, a TA command for a TA 43 (a TA on the basis of the DL reception timing in the DL band) to the terminal device 200 regardless of an operation mode of the UL band. The terminal device 200 (the control unit 243) adjusts the UL transmission timing in the UL band on the basis of the DL reception timing in the DL band and information indicating TA43 regardless of the operation mode of the UL band.
(3) Others
(a) Reporting of UL/DL Configuration in Uplink Band
There is no difference in description of UL/DL configurations between the first and fourth embodiments. Thus, overlapping description is omitted here.
(b) Random Access
(b-1) Random Access Time/Frequency Domain
There is no difference in description of random access time/frequency domains between the first and fourth embodiments. Thus, overlapping description is omitted here.
(b-2) Random Access Procedure
The terminal device 200 transmits a random access preamble in a random access time/frequency domain for a transition from an idle state to a connected state.

The base station 100 transmits, for example, a random access response to the terminal device 200. At this time, the base station 100 reports a TA command to the terminal device 200.
(c) Transmission of Synchronization Signal
There is no difference in description of transmission of a synchronization signal between the first and fourth embodiments. Thus, overlapping description is omitted here.
(d) Scheduling
There is no difference in description of scheduling between the first and fourth embodiments. Thus, overlapping description is omitted here.
(e) Reporting of Capability Information
There is no difference in description of reporting of capability information between the first and fourth embodiments. Thus, overlapping description is omitted here.
<7.3. Process Flow>
Next, an example of a process according to the fourth embodiment will be described with reference to FIG. 18. FIG. 18 is a sequence diagram showing an example of a schematic flow of a process according to the fourth embodiment. Note that it is assumed in the description of the process that an operation mode of a UL band of FDD is initially the first mode.

The base station 100 reports a TA command for a TA on the basis of a DL reception timing in a DL band of FDD to the terminal device 200 (S381).

The terminal device 200 adjusts a UL transmission timing in a UL band of FDD on the basis of the DL reception timing in the DL band and information indicating the TA (S383).

Then, the terminal device 200 performs UL transmission in the UL band (S385). That is, the terminal device 200 transmits a UL signal in the UL band.

The base station 100 reports mode switch information to the terminal device 200 (S387). The mode switch information is information indicating a switch of an operation mode of the UL band between the first mode and the second mode. The mode switch information in particular indicates a switch of the operation mode from the first mode to the second mode. The first mode is a mode in which the UL band is used UL, and the second mode is a mode in which the UL band is used for both DL and UL in a time division manner.

The base station 100 switches the operation mode from the first mode to the second mode (S389).

The base station 100 reports a TA command for a TA on the basis of the DL reception timing in the DL band to the terminal device 200 (S391).

The terminal device 200 adjusts a UL transmission timing in the UL band of on the basis of the DL reception timing in the DL band and information indicating the TA (S393). Then, the terminal device 200 performs UL transmission in the UL band (S395). That is, the terminal device 200 transmits a UL signal in the UL band.

The fourth embodiment has been described above. According to the fourth embodiment, it is possible to perform radio communication more favorably in a UL band of FDD when, for example, the UL band is used for both DL and UL.

More specifically, for example, the terminal device 200 adjusts a UL transmission timing in the UL band on the basis of a DL reception timing in the UL band and regardless of whether the operation mode is the first mode or the second mode. Thus, even when the UL band is used for both DL and UL in a time division manner, synchronization of a UL reception timing of the base station 100 is realized. As a result, radio communication can be performed more favorably in the UL band. In addition, since the number of TAs for the terminal device 200 does not increase, an increase in overhead of signaling can be suppressed.

8. Fifth Embodiment

Next, a fifth embodiment of the present disclosure will be described with reference to FIGS. 19 to 25.
<8.1. Technical Problem>

First, a technical problem according to the fifth embodiment will be described with reference to FIG. 19.

A technique of using a UL band of FDD for both DL and UL in a time division manner has been discussed. The technique can be called flexible duplex.

When a UL band of FDD is used for both DL and UL in a time division manner, however, there is a possibility of radio communication not being favorably performed in the UL band.

More specifically, when DL data is transmitted in a certain subframe in a DL band of FDD, for example, an ACK/NACK of the DL data is transmitted in a subframe 4 subframes after the certain subframe in a UL band of FDD. When the UL band is used for both DL and UL in a time division manner, however, the subframe 4 subframes after the certain subframe can be a DL subframe. Thus, the terminal device may not be able to transmit the ACK/NACK of the DL data. Alternatively, a subframe in which DL data is transmitted in the DL band can be limited only to a subframe 4 subframes before a UL subframe. A specific example of this point will be described below with reference to FIG. 19.

Figure 19:
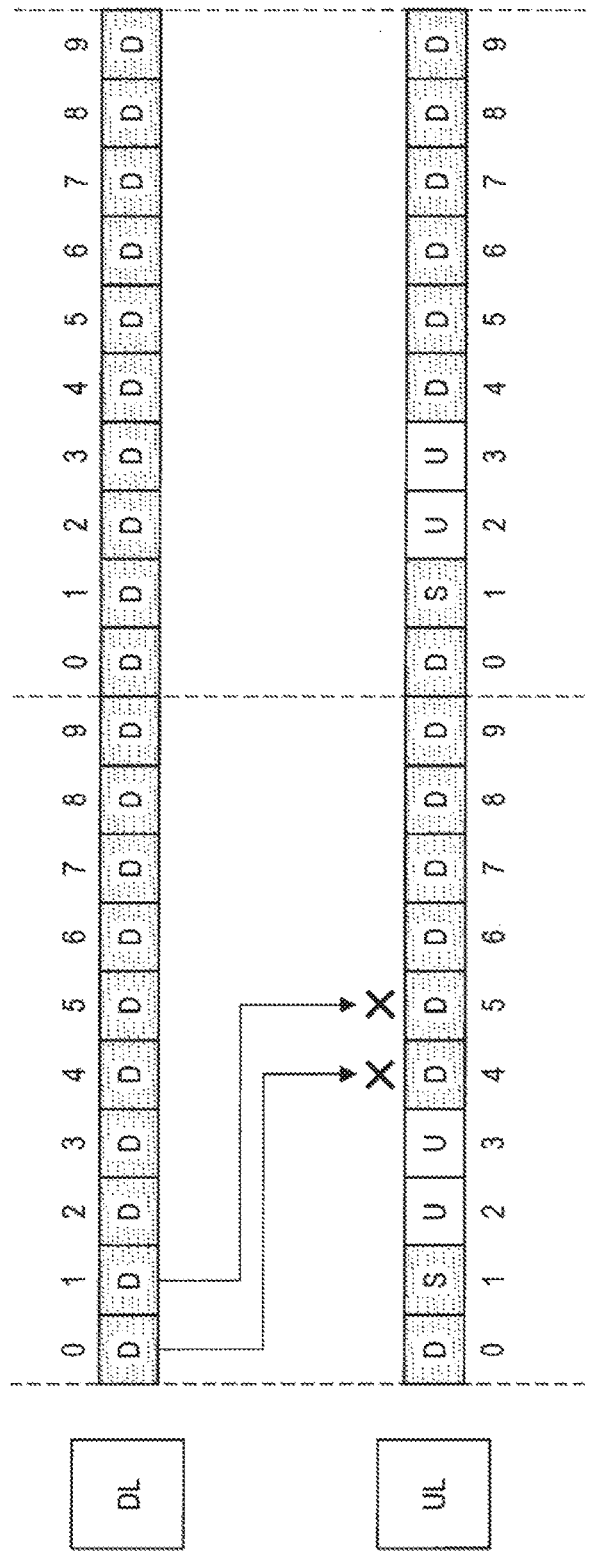
FIG. 19 is an explanatory diagram for describing an example in which subframes in which the ACK/NACK of DL data is transmitted are DL subframes.

FIG. 19 is an explanatory diagram for describing an example in which subframes in which an ACK/NACK of DL data is transmitted are DL subframes. Referring to FIG. 19, subframes of a DL band of FDD and subframes of a UL band of FDD are shown. In this example, the UL band is used for both DL and UL in a time division manner. When DL data is transmitted in a subframe whose subframe number is 0 in the DL band, for example, the ACK/NACK of the DL data is generally transmitted in the subframe whose subframe number is 4 in the UL band. However, since the UL band is used for both DL and UL in a time division manner and the subframe whose subframe number is 4 is a DL subframe, the terminal device is not able to transmit the ACK/NACK of the DL data. Alternatively, the base station is not able to transmit the DL data in the subframe whose frame number is 0. Likewise, when DL data is transmitted in the subframe whose subframe number is 1 in the DL band, for example, the ACK/NACK of the DL data is generally transmitted in the subframe whose subframe is 5 in the UL band. However, since the UL band is used for both DL and UL in a time division manner and the subframe whose subframe number is 5 is a DL subframe, the terminal device is not able to transmit the ACK/NACK of the DL data. Alternatively, the base station is not able to transmit the DL data in the subframe whose subframe number is 1.

Therefore, it is desirable to provide a mechanism in which radio communication is performed more favorably in a UL band of FDD when the UL band is used for both DL and UL in a time division manner. More specifically, for example, it is desirable to provide a mechanism in which the ACK/NACK of DL data is appropriately transmitted when a UL band of FDD is used for both DL and UL in a time division manner.
<8.2. Technical Features>

Next, technical features of the fifth embodiment will be described with reference to FIGS. 20 to 24.
(1) Switch of Operation Mode The base station 100 (the switching unit 151) switches an operation mode of a UL band of FDD between the first mode in which the UL band is used for UL and the second mode in which the UL band is used for both DL and UL in a time division manner.

Description of a switch of an operation mode in the fifth embodiment is the same as the description of a switch of an operation mode in any of the first to the fourth embodiments. Thus, overlapping description is omitted here.
(2) UL/DL Configurations The base station 100 (the control unit 153) performs radio communication in the UL band in accordance with, for example, a UL/DL configuration when the operation mode of the UL band is the second mode.
(a) Examples of UL/DL Configurations The UL/DL configuration is, for example, a UL/DL configuration of TDD. More specifically, the UL/DL configuration is, for example, one of Configurations 0 to 6 shown in FIG. 4.

Note that the UL/DL configuration may be another configuration (e.g., a configuration unique to FDD), rather than a UL/DL configuration of TDD.
(c) Change of UL/DL Configuration The base station 100 (the control unit 153) changes a UL/DL configuration for the UL band among a plurality of UL/DL configuration candidates when, for example, the operation mode is the second mode. The base station 100 (the control unit 153) may dynamically change the UL/DL configuration for the UL band, or semi-statically change the UL/DL configuration for the UL band.

(c-1) Plurality of UL/DL Configuration Candidates

The plurality of UL/DL configuration candidates are, for example, a plurality of UL/DL configurations of TDD. More specifically, the plurality of UL/DL configuration candidates are, for example, two or more of Configurations 0 to 6 shown in FIG. 4. As an example, the plurality of UL/DL configuration candidates are Configurations 0, 1, 3, and 4 shown in FIG. 4.

Note that the plurality of UL/DL configuration candidates may not be a plurality of UL/DL configurations of TDD, but may be a plurality of other configurations (e.g., a plurality of configurations unique to FDD).

(c-2) Change Method

The base station 100 (the control unit 153) changes a UL/DL configuration for the UL band, for example, on the basis of an amount of traffic in DL and an amount of traffic in UL in a cell 101. More specifically, the base station 100 (the control unit 153) changes a UL/DL configuration for the UL band to a UL/DL configuration having a proper ratio between DL subframes and UL subframes.

By changing the UL/DL configuration for the UL band, for example, an amount of DL resources and an amount of UL resources can be adjusted more flexibly.

(d) Reporting of UL/DL Configuration

The base station 100 (the control unit 153) reports, for example, information indicating a UL/DL configuration in the UL (which will be referred to as "configuration information" below) to the terminal device 200.

As an example, the base station 100 (the control unit 153) reports the configuration information included in system information to the terminal device 200. The configuration information may be included in system information as new information. Alternatively, the configuration information may be included in system information transmitted using DL subframes in the UL band as information indicating a UL/DL configuration of TDD.

As another example, the base station 100 (the control unit 153) reports the configuration information to the terminal device 200 through individual signaling to the terminal device 200. The individual signaling is, for example, RRC signaling.

(3) Reporting of ACK/NACK Subframe-Related Information (a) Subframe in which ACK/NACK of Downlink Data is Transmitted In the fifth embodiment, the base station 100 (the control unit 153) in particular reports information regarding a subframe in which an ACK/NACK of DL data is transmitted when the operation mode is the second mode (which will be referred to as "DL-ACK/NACK subframe-related information" hereinbelow) to the terminal device 200.

Meanwhile, the terminal device (the information acquisition unit 241) acquires the DL-ACK/NACK subframe-related information. Furthermore, the terminal device 200 transmits the ACK/NACK of DL data in the UL band on the basis of the DL-ACK/NACK subframe-related information when the operation mode is the second mode. The control unit 243 of the terminal device 200 performs a process for transmitting the ACK/NACK of the DL data on the basis of the DL-ACK/NACK subframe-related information when the operation mode is the second mode.

Accordingly, it is possible to appropriately transmit the ACK/NACK of the DL data when, for example, the UL band is used for both DL and UL in a time division manner.

(a-1) DL Data

DL Data Transmitted in DL Band

The DL data includes, for example, DL data transmitted in a DL band of FDD corresponding to the UL band. That is, the DL-ACK/NACK subframe-related information is information regarding a subframe in which an ACK/NACK of DL data to be transmitted in the DL band is transmitted. In addition, the control unit 243 of the terminal device 200 transmits the ACK/NACK of DL data to be transmitted in the DL band in the UL band on the basis of the DL-ACK/NACK subframe-related information when the operation mode is the second mode.

Accordingly, for example, the ACK/NACK of the DL data to be transmitted in the DL band can be appropriately transmitted.

DL Data Transmitted in UL Band

The DL data further includes, for example, DL data transmitted in a DL band of FDD corresponding to the UL band. That is, the DL-ACK/NACK subframe-related information is information regarding a subframe in which an ACK/NACK of DL data to be transmitted in the UL band is transmitted. In addition, the control unit 243 of the terminal device 200 transmits the ACK/NACK of DL data to be transmitted in the UL band in the UL band on the basis of the DL-ACK/NACK subframe-related information when the operation mode is the second mode.

Accordingly, for example, the ACK/NACK of the DL data to be transmitted in the UL band can be appropriately transmitted.

(a-2) Subframe

The subframe (in which the ACK/NACK of the DL data is transmitted) is a UL subframe shared between the plurality of UL/DL configuration candidates. Thus, even when a UL/DL configuration for the UL band is changed to one among the plurality of UL/DL configuration candidates, for example, it is possible to reliably transmit the ACK/NACK of DL data. For example, even when the changed UL/DL configuration is applied before the terminal device 200 ascertains the changed UL/DL configuration, the terminal device 200 can transmit the ACK/NACK of the DL data using the UL subframe.

More specifically, the subframe (in which the ACK/NACK of the DL data is transmitted) is, for example, a subframe for transmitting the ACK/NACK of the DL data defined for a first UL/DL configuration candidate among the plurality of UL/DL configuration candidates. In such a case, the first UL/DL configuration candidate can be called a DL reference UL/DL configuration. An example of a subframe (a subframe for transmitting the ACK/NACK of DL data) defined for a DL reference UL/DL configuration will be described below with reference to FIG. 20.

FIG. 20 is an explanatory diagram for describing examples of subframes defined for DL reference UL/DL configurations. Referring to FIG. 20, subframes for transmitting the ACK/NACK of DL data defined for the DL reference UL/DL configurations are shown. This table is the same as Table 10.1.3A-1 included in the 3GPP TS 36.213. For Configuration 4, for example, subframes whose subframe numbers are 2 and 3 are defined as subframes for transmitting the ACK/NACK of DL data. More specifically, the ACK/NACK of DL data transmitted in subframes 7 to 12 subframes before the relevant subframe (i.e., subframes whose subframe numbers are 0 to 5) is transmitted in the subframe whose subframe number is 2. In addition, the ACK/NACK of DL data transmitted in the subframes 4 to 7 subframes before the relevant subframe (i.e., subframes whose subframe numbers are 6 to 9) is transmitted in the subframe whose subframe number is 3.

The first UL/DL configuration candidate is, for example, a UL/DL configuration candidate having a minimum number of UL subframes among the plurality of UL/DL configuration candidates. As an example, the plurality of UL/DL configuration candidates are Configurations 0, 1, 3, and 4 shown in FIG. 4 as described above. In this case, the first UL/DL configuration candidate is Configuration 4 shown in FIG. 4. Furthermore, subframes in which the ACK/NACK of DL data is transmitted in this case are the subframes whose subframe numbers are 2 and 3 as illustrated in FIG. 20. Examples of transmission of the ACK/NACK of DL data will be described below with reference to FIGS. 21 and 22.

Figure 21:
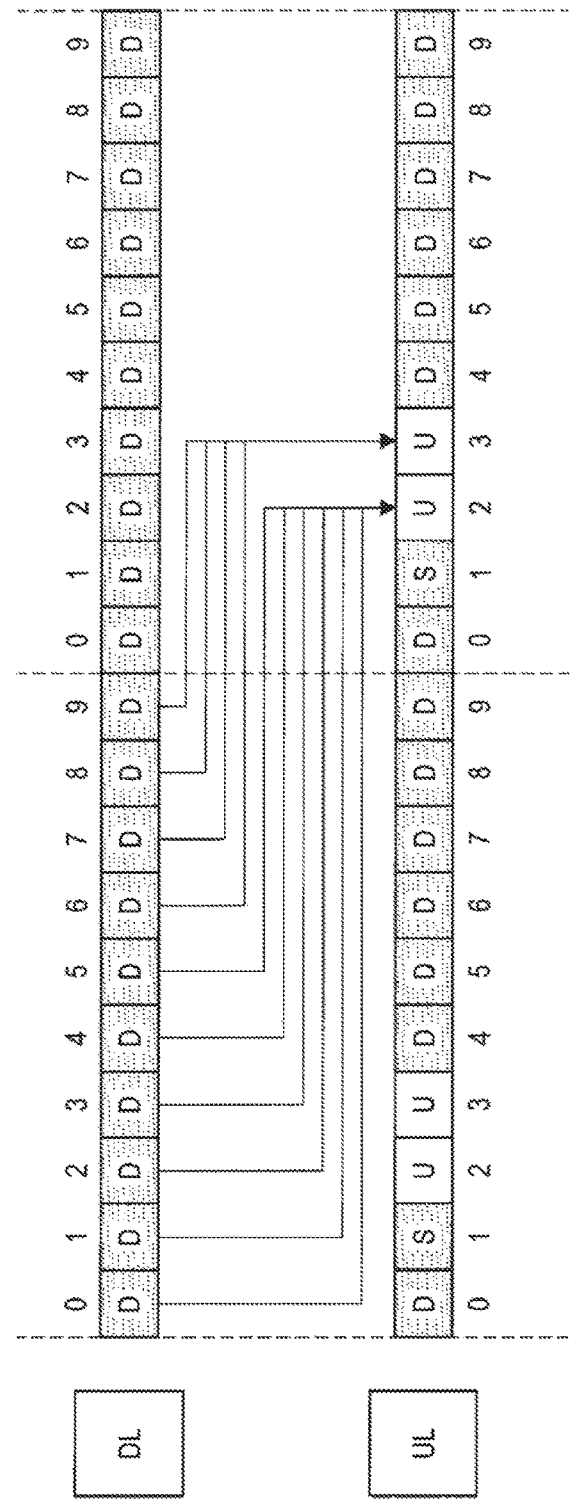
FIG. 21 is an explanatory diagram for describing an example of transmission of the ACK/NACK of DL data transmitted in a DL band.

FIG. 21 is an explanatory diagram for describing an example of transmission of the ACK/NACK of DL data transmitted in a DL band. Referring to FIG. 21, subframes of the DL band of FDD and subframes of a UL band of FDD are shown. In this example, an operation mode of the UL band is the second mode, and the UL band is used for both DL and UL in a time division manner. In addition, a UL/DL configuration for the UL band is Configuration 4. When DL data is transmitted using a subframe whose subframe number is one of 0 to 5 in the DL band, for example, the ACK/NACK of the DL data is transmitted in a subframe (UL subframe) whose subframe number is 2 in the UL band. In addition, when DL data is transmitted in a subframe whose subframe number is one of 6 to 9 in the DL band, for example, the ACK/NACK of the DL data is transmitted in a subframe (UL subframe) whose subframe number is 3 in the UL band.

Figure 22:
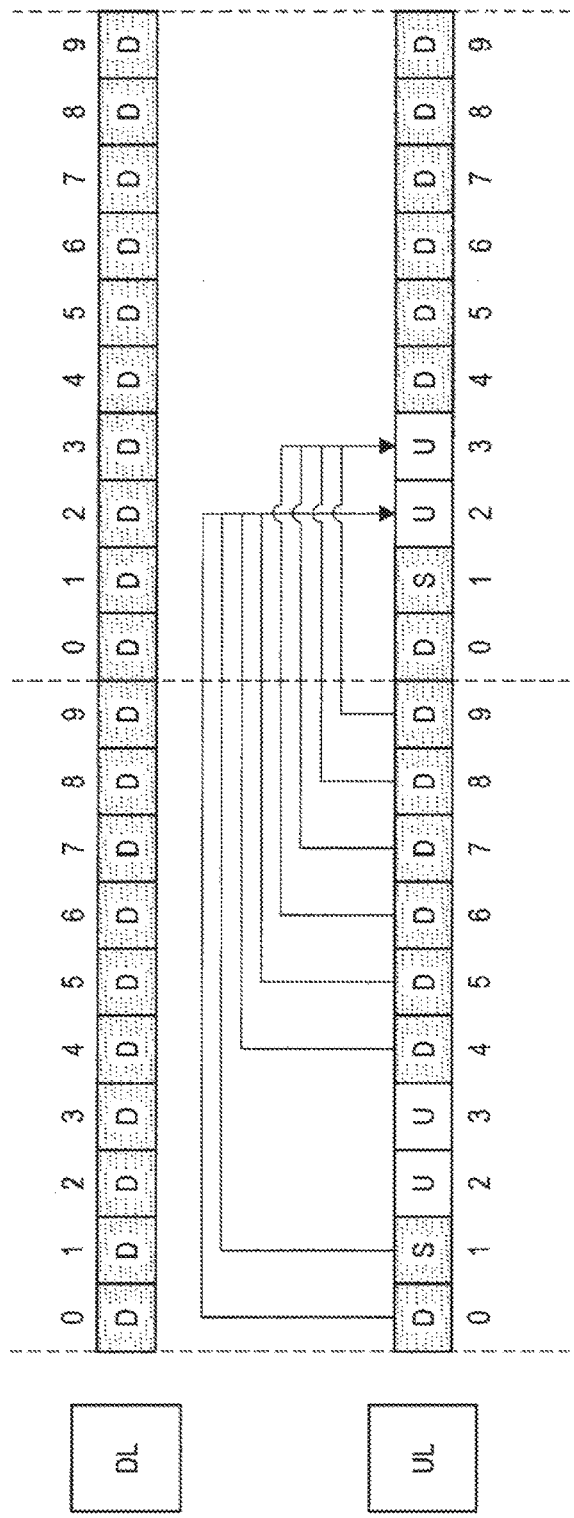
FIG. 22 is an explanatory diagram for describing an example of transmission of the ACK/NACK of DL data transmitted in a UL band.

FIG. 22 is an explanatory diagram for describing an example of transmission of the ACK/NACK of DL data transmitted in a UL band. Referring to FIG. 22, subframes of the UL band of FDD and subframes of a UL band of FDD are shown. In this example, an operation mode of the UL band is the second mode, and the UL band is used for both DL and UL in a time division manner. In addition, a UL/DL configuration for the UL band is Configuration 4. When DL data is transmitted using a subframe whose subframe number is one of 0, 1, 4, 5 in the UL band, for example, the ACK/NACK of the DL data is transmitted in a subframe (UL subframe) whose subframe number is 2 in the UL band. In addition, when DL data is transmitted in a subframe whose subframe number is one of 6 to 9 in the DL band, for example, the ACK/NACK of the DL data is transmitted in a subframe (UL subframe) whose subframe number is 3 in the UL band.

Note that the subframes (in which the ACK/NACK of the DL data is transmitted) are of course not limited thereto. The subframes may be, for example, an arbitrary UL subframe shared between the plurality of UL/DL configuration candidates.

As described above, the terminal device 200 transmits the ACK/NACK of DL data in the UL band, for example, on the basis of the DL-ACK/NACK subframe-related information regardless of UL/DL subframes of the UL band.

(a-3) DL-ACK/NACK Subframe-Related Information

The DL-ACK/NACK subframe-related information is, for example, information indicating the first UL/DL configuration candidate (which will be referred to as "DL reference UL/DL configuration information" below).

As an example, the plurality of UL/DL configuration candidates are two or more of Configurations 0 to 6 shown in FIG. 4 as described above, and the DL-ACK/NACK subframe-related information is one of indices 0 to 6.

Note that the DL-ACK/NACK subframe-related information is of course not limited to the DL reference UL/DL configuration information, and may be other information. As an example, the DL-ACK/NACK subframe-related information may be information indicating a subframe in which the ACK/NACK of DL data is transmitted when the operation mode is the second mode. Specifically, it may be information corresponding to any row of the table shown in FIG. 20.

(a-4) Reporting Method

The base station 100 (the control unit 153) reports the DL-ACK/NACK subframe-related information to the terminal device 200 through, for example, individual signaling. As an example, the base station 100 (the control unit 153) reports the DL-ACK/NACK subframe-related information to the terminal device 200 through the individual signaling when a state of the terminal device 200 transitions from an idle state to a connected state. The individual signaling is, for example, RRC signaling.

Note that the base station 100 (the control unit 153) may report the DL-ACK/NACK subframe-related information included in system information to the terminal device 200. The system information may be system information transmitted in the UL band, or system information transmitted in the DL band.

(b) Subframe in which ACK/NACK of Uplink Data is Transmitted

The base station 100 (the control unit 153) reports, for example, information regarding a subframe in which an ACK/NACK of UL data is transmitted (which will be referred to as "UL-ACK/NACK subframe-related information" hereinbelow) to the terminal device 200 when the operation mode is the second mode.

Meanwhile, the terminal device (the information acquisition unit 241) acquires, for example, the UL-ACK/NACK subframe-related information. Furthermore, the terminal device 200 receives, for example, the ACK/NACK of UL data in the UL band on the basis of the UL-ACK/NACK subframe-related information when the operation mode is the second mode. The control unit 243 of the terminal device 200 performs a process for receiving the ACK/NACK of the UL data on the basis of the UL-ACK/NACK subframe-related information when the operation mode is the second mode.

Accordingly, the ACK/NACK of the UL data can be appropriately received when, for example, the UL band is used for both DL and UL in a time division manner.

(b-1) Uplink Data

The uplink data is UL data transmitted in the UL band.

(b-2) Subframe

The subframe (in which the ACK/NACK of the UL data is transmitted) is, for example, a DL subframe shared between the plurality of UL/DL configuration candidates. The DL subframe includes, for example, not only a simple DL subframe but also a special subframe. Thus, even when a UL/DL configuration for the UL band is changed to one among the plurality of UL/DL configuration candidates, for example, it is possible to reliably receive the ACK/NACK of UL data. For example, even when the changed UL/DL configuration is applied before the terminal device 200 ascertains the changed UL/DL configuration, the terminal device 200 can receive the ACK/NACK of UL data using the DL subframe.

More specifically, the subframe (in which the ACK/NACK of the UL data is transmitted) is, for example, a subframe for transmitting the ACK/NACK of the UL data defined for a second UL/DL configuration candidate among the plurality of UL/DL configuration candidates. In such a case, the second UL/DL configuration candidate can be called a UL reference UL/DL configuration. An example of a subframe (a subframe for transmitting the ACK/NACK of UL data) defined for a UL reference UL/DL configuration will be described below with reference to FIG. 23.

FIG. 23 is an explanatory diagram for describing an example of subframes defined for UL reference UL/DL configurations. Referring to FIG. 23, subframes for transmitting the ACK/NACK of UL data defined for the UL reference UL/DL configurations are shown. The table is the same as Table 9.1.2-1 included in the 3GPP TS 36.213. In Configuration 0, for example, when UL data is transmitted in the subframe whose subframe number is 2, the ACK/NACK of the UL data is transmitted in the subframe 4 subframes after that (i.e., the subframe whose subframe number is 6). In addition, in Configuration 0, when UL data is transmitted in the subframe whose subframe number is 3, the ACK/NACK of the UL data is transmitted in the subframe 7 subframes after that (i.e., the subframe whose subframe number is 0). Likewise, when UL data is transmitted in the subframes whose subframe numbers are 4, 7, 8, and 9, the ACK/NACK of the UL data is transmitted in the subframes 6, 4, 7, and 6 subframes after that, respectively (i.e., the subframes whose subframe numbers are 0, 1, 5, and 5). In this manner, the subframes whose subframe numbers are 0, 1, 5, and 6 are defined for Configuration 0 as subframes for transmitting the ACK/NACK of the UL data.

The second UL/DL configuration candidate is, for example, a UL/DL configuration candidate having a minimum number of DL subframes among the plurality of UL/DL configuration candidates. For example, the DL subframes include not only a simple DL subframe but also a special subframe. As an example, the plurality of UL/DL configuration candidates are Configurations 0, 1, 3, and 4 shown in FIG. 4 as described above. In this case, the second UL/DL configuration candidate is Configuration 0 shown in FIG. 4. Furthermore, in this case, subframes in which the ACK/NACK of UL data is transmitted are the subframes whose subframe numbers are 0, 1, 5, and 6. An example of transmission of the ACK/NACK of UL data will be described below with reference to FIG. 24.

Figure 24:
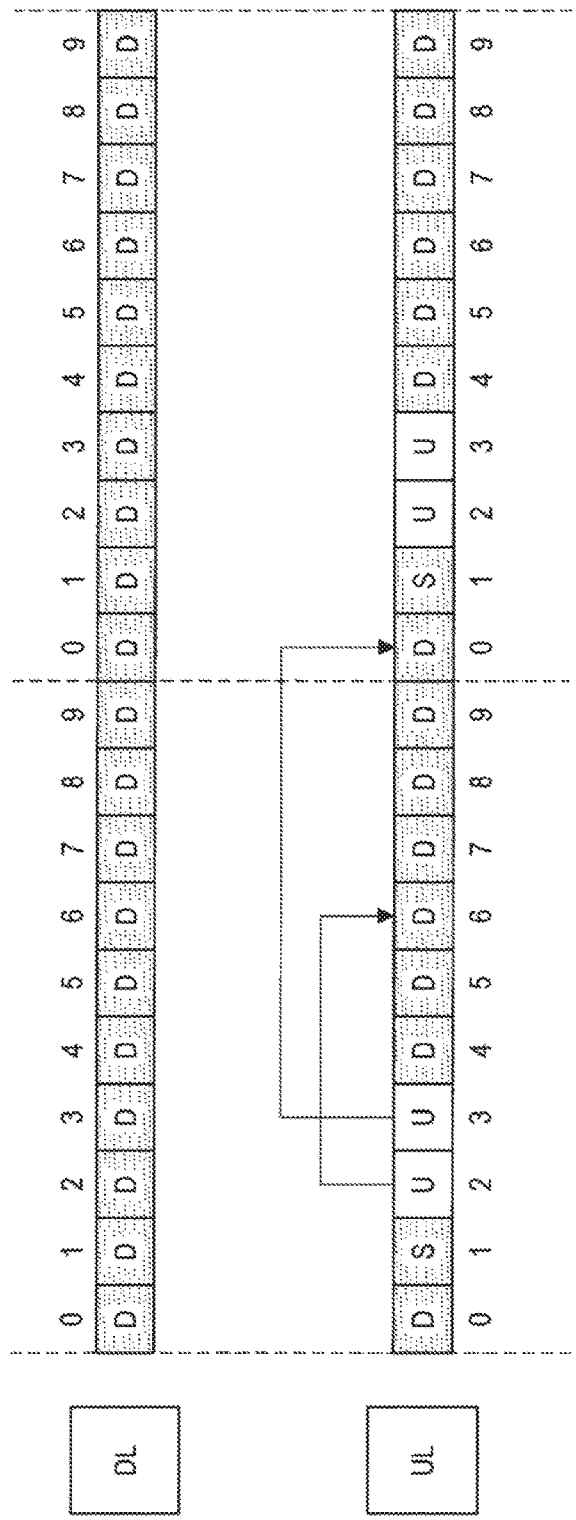
FIG. 24 is an explanatory diagram for describing an example of transmission of the ACK/NACK of UL data transmitted in a UL band.

FIG. 24 is an explanatory diagram for describing an example of transmission of the ACK/NACK of UL data transmitted in a UL band. Referring to FIG. 24, subframes of the UL band of FDD and subframes of a UL band of FDD are shown. In this example, an operation mode of the UL band is the second mode, and the UL band is used for both DL and UL in a time division manner. In addition, a UL/DL configuration for the UL band is Configuration 4. When UL data is transmitted using a subframe whose subframe number is 2 in the UL band, for example, the ACK/NACK of the UL data is transmitted in a subframe (DL subframe) whose subframe number is 6 in the UL band. In addition, when UL data is transmitted in a subframe whose subframe number is 3 in the UL band, for example, the ACK/NACK of the UL data is transmitted in a subframe (DL subframe) whose subframe number is 0 in the UL band.

Note that the subframes (in which the ACK/NACK of the UL data is transmitted) are of course not limited thereto. The subframes may be, for example, an arbitrary DL subframe shared between the plurality of UL/DL configuration candidates.

As described above, the terminal device 200 transmits the ACK/NACK of UL data in the UL band, for example, on the basis of the UL-ACK/NACK subframe-related information regardless of UL/DL subframes of the UL band.

(b-3) UL-ACK/NACK Subframe-Related Information

The UL-ACK/NACK subframe-related information is, for example, information indicating the second UL/DL configuration candidate (which will be referred to as "UL reference UL/DL configuration information" below).

As an example, the plurality of UL/DL configuration candidates are two or more of Configurations 0 to 6 shown in FIG. 4 as described above, and the DL-ACK/NACK subframe-related information is one of indices 0 to 6.

Note that the UL-ACK/NACK subframe-related information is of course not limited to the UL reference UL/DL configuration information, and may be other information. As an example, the UL-ACK/NACK subframe-related information may be information indicating a subframe in which the ACK/NACK of UL data is transmitted when the operation mode is the second mode. Specifically, it may be information corresponding to any row of the table shown in FIG. 23.

(b-4) Reporting Method

The base station 100 (the control unit 153) reports the UL-ACK/NACK subframe-related information to the terminal device 200 through, for example, individual signaling. As an example, the base station 100 (the control unit 153) reports the UL-ACK/NACK subframe-related information to the terminal device 200 through the individual signaling when a state of the terminal device 200 transitions from an idle state to a connected state. The individual signaling is, for example, RRC signaling.

Note that the base station 100 (the control unit 153) may report the UL-ACK/NACK subframe-related information included in system information to the terminal device 200. The system information may be system information transmitted in the UL band, or system information transmitted in the DL band.

(4) Others (a) Measurements

As described above, the subframes (in which the ACK/NACK of UL data is transmitted) are, for example, DL subframes shared between the plurality of UL/DL configuration candidates. The DL subframes include, for example, not only a simple DL subframe but also a special subframe. In this case, the terminal device 200 (the control unit 243) controls, for example, measurement of the UL band on the basis of the UL-ACK/NACK subframe-related information.

Specifically, the terminal device 200 performs measurement of the UL band, for example, on the basis of a reference signal transmitted in the UL band in the subframe (in which the ACK/NACK of the UL data is transmitted). The reference signal is, for example, a cell-specific reference signal (CRS), and the measurement is measurement of reference signal received power (RSRP) and/or reference signal received quality (RSRQ).

Accordingly, the terminal device 200 can perform measurement on, for example, a subframe (i.e., a DL subframe) in which the reference signal is reliably transmitted. Thus, an error in measurement, for example, is avoided.

(b) Random Access

Description of random access according to the fifth embodiment is the same as the description of random access in any of the first to fourth embodiments. Thus, overlapping description is omitted here.

(c) Synchronization Signal

Description of transmission of a synchronization signal according to the fifth embodiment is the same as the description of transmission of a synchronization signal in any of the first to fourth embodiments. Thus, overlapping description is omitted here.

(d) Scheduling

Description of scheduling according to the fifth embodiment is the same as the description of scheduling in any of the first to fourth embodiments. Thus, overlapping description is omitted here.

(e) Reporting of Capability Information

Description of reporting of capability information according to the fifth embodiment is the same as the description of reporting of capability information in any of the first to fourth embodiments. Thus, overlapping description is omitted here.

<8.3. Process Flow>

Figure 25:
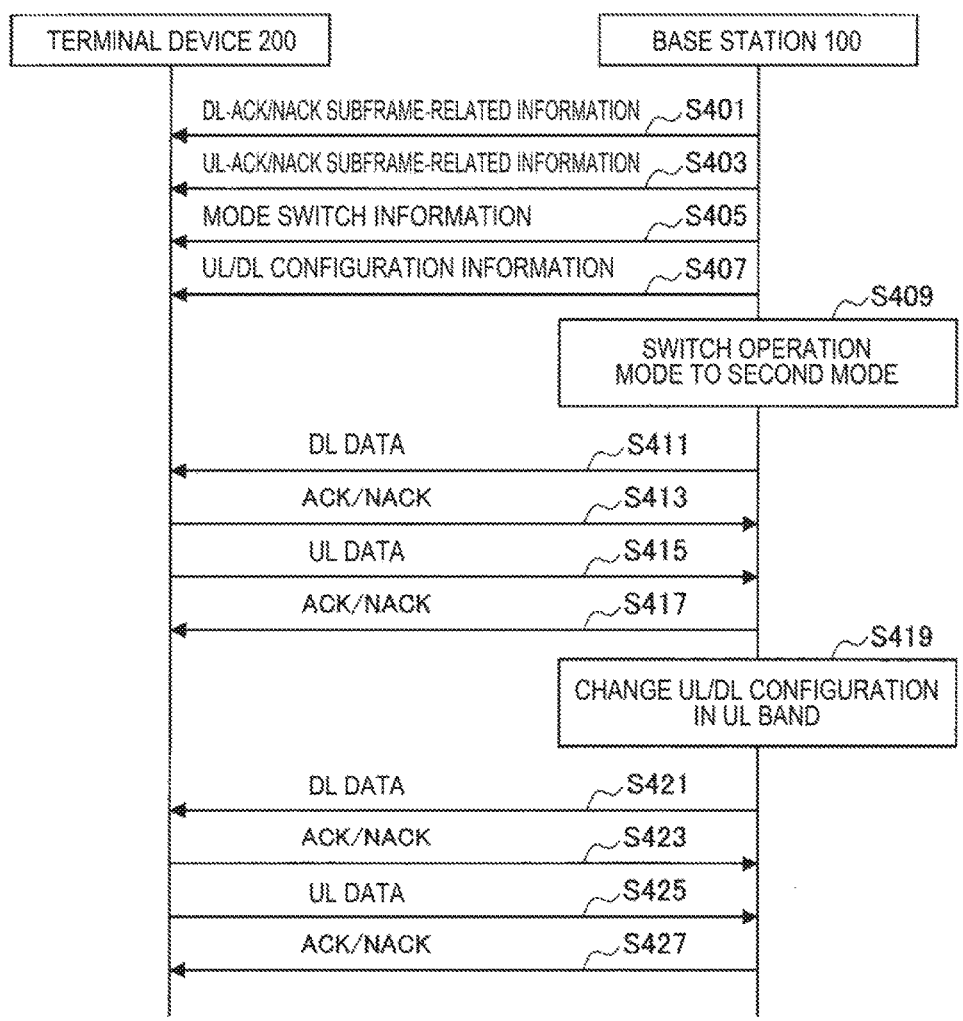
FIG. 25 is a sequence diagram showing an example of a schematic flow of a process according to a fifth embodiment.

Next, an example of a process according to the fifth embodiment will be described with reference to FIG. 25. FIG. 25 is a sequence diagram showing an example of a schematic flow of a process according to the fifth embodiment. Note that it is assumed in the description of the process that an operation mode of a UL band of FDD is initially the first mode.

The base station 100 (the control unit 153) reports DL-ACK/NACK subframe-related information to the terminal device 200 (S401). The DL-ACK/NACK subframe-related information is information regarding a subframe in which the ACK/NACK of DL data is transmitted when an operation mode of a UL band of FDD is a second mode. The second mode is a mode in which the UL band is used for both DL and UL in a time division manner. The DL-ACK/NACK subframe-related information is, for example, information indicating a DL reference UL/DL configuration.

The base station 100 (the control unit 153) reports UL-ACK/NACK subframe-related information to the terminal device 200 (S403). The UL-ACK/NACK subframe-related information is information regarding a subframe in which the ACK/NACK of UL data is transmitted when an operation mode of the UL band is the second mode. The UL-ACK/NACK subframe-related information is, for example, information indicating a UL reference UL/DL configuration.

The base station 100 reports mode switch information to the terminal device 200 (S405). The mode switch information is information indicating a switch of an operation mode of the UL band between a first mode and the second mode. The mode switch information in particular indicates a switch of the operation mode from the first mode to the second mode. The first mode is a mode in which the UL band is used for UL.

The base station 100 reports a UL/DL configuration for the UL band to the terminal device 200 (S407).

The base station 100 switches the operation mode from the first mode to the second mode (S409).

The base station 100 transmits DL data to the terminal device 200 (S411). The base station 100 transmits, for example, the DL data in the UL band using a DL subframe to the terminal device 200. Alternatively, the base station 100 transmits the DL data in the DL band to the terminal device 200. Then, the terminal device 200 transmits the ACK/NACK of the DL data to the base station 100 in the UL band on the basis of the DL-ACK/NACK subframe-related information (S413).

The terminal device 200 transmits UL data to the base station 100 in the UL band (S415). Then, the base station 100 transmits an ACK/NACK of the UL data to the terminal device 200 in the UL band using a DL subframe (S417). The terminal device 200 receives the ACK/NACK of the UL data in the UL band on the basis of the UL-ACK/NACK subframe-related information.

The base station 100 changes a UL/DL configuration for the UL band (S419).

The base station 100 transmits DL data to the terminal device 200 (S421). The base station 100 transmits, for example, the DL data in the UL band using a DL subframe to the terminal device 200. Alternatively, the base station 100 transmits the DL data in the DL band to the terminal device 200. Then, the terminal device 200 transmits the ACK/NACK of the DL data to the base station 100 in the UL band on the basis of the DL-ACK/NACK subframe-related information (S423).

The terminal device 200 transmits UL data to the base station 100 in the UL band (S425). Then, the base station 100 transmits an ACK/NACK of the UL data to the terminal device 200 in the UL band using a DL subframe (S427). The terminal device 200 receives the ACK/NACK of the UL data in the UL band on the basis of the UL-ACK/NACK subframe-related information.

Note that the base station 100 reports the changed UL/DL configuration to the terminal device 200 at any timing. The changed UL/DL configuration may be reported to the terminal device 200 before the transmission of ACK/NACK (S423 and S427), or the changed UL/DL configuration may be reported after the transmission of ACK/NACK (S423 or S427). In any case, the terminal device 200 can transmit the ACK/NACK of the DL data on the basis of the DL-ACK/NACK subframe-related information (S423), and can receive the ACK/NACK of the UL data on the basis of the UL-ACK/NACK subframe-related information (S427).

The fourth embodiment has been described above. According to the fifth embodiment, it is possible to perform radio communication more favorably in a UL band of FDD when, for example, the UL band is used for both DL and UL.

More specifically, when the UL band of FDD is used for both DL and UL in a time division manner, for example, the ACK/NACK of DL data is appropriately transmitted. In addition, when the UL band of FDD is used for both DL and UL in a time division manner, for example, the ACK/NACK of UL data is appropriately transmitted.

The fifth embodiment may be combined with one of the first to fourth embodiments. Specifically, the base station 100 (particularly, the control unit 153) of one of the first to fourth embodiments may perform operations of the base station 100 (particularly, the control unit 153) of the fifth embodiment. In addition, the terminal device 200 (particularly, the control unit 243) of one of the first to fourth embodiments may perform operations of the terminal device 200 (the control unit 243) of the fifth embodiment.

9. Application Example

The technology of the present disclosure can be applied to various products. The base station 100 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the base station 100 may be realized as another type of base station such as a node B or a base transceiver station (BTS). The base station 100 may include a main body that controls radio communication (also referred to as a base station device) and one or more remote radio heads (RRHs) disposed in a different place from the main body. In addition, various types of terminals to be described below may operate as the base station 100 by temporarily or semi-permanently executing the base station function. Furthermore, at least some of constituent elements of the base station 100 may be realized in a base station device or a module for a base station device.

In addition, the terminal device 200 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal device 200 may be realized as a terminal that performs machine-to-machine (M2M) communication (also referred to as a machine type communication (MTC) terminal). Furthermore, at least some of constituent elements of the terminal device 200 may be realized in a module mounted in such a terminal (for example, an integrated circuit module configured in one die).

<9.1. Application Example with Regard to Base Station>

First Application Example

Figure 26:
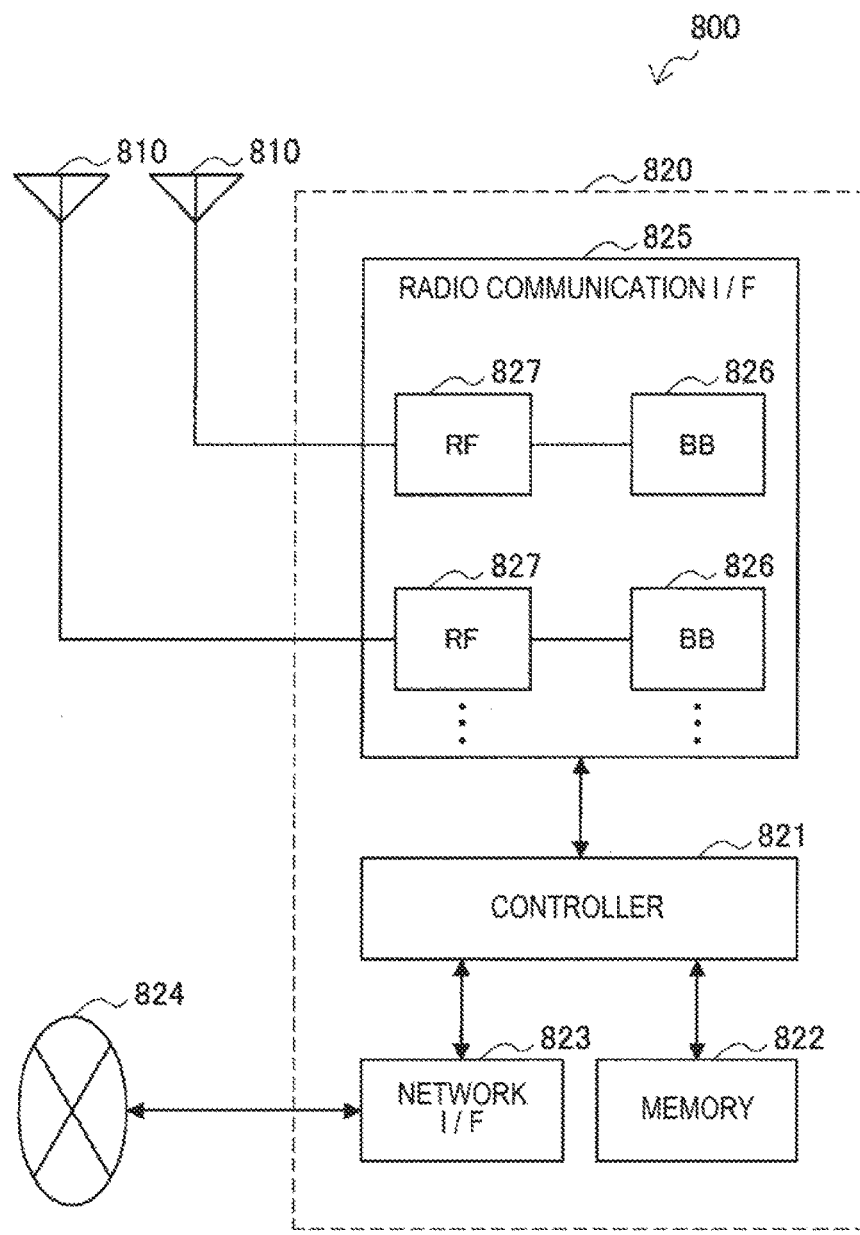
FIG. 26 is a block diagram illustrating a first example of a schematic configuration of an eNB.

FIG. 26 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 26. For example, the multiple antennas 810 may be compatible with multiple frequency bands used by the eNB 800. Although FIG. 26 illustrates the example in which the eNB 800 includes the multiple antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a higher layer of the base station device 820. For example, the controller 821 generates a data packet from data in signals processed by the radio communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a radio communication interface for radio backhaul. If the network interface 823 is a radio communication interface, the network interface 823 may use a higher frequency band for radio communication than a frequency band used by the radio communication interface 825.

The radio communication interface 825 supports any cellular communication scheme such as Long Term Evolution (LTE) and LTE-Advanced, and provides radio connection to a terminal positioned in a cell of the eNB 800 via the antenna 810. The radio communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The radio communication interface 825 may include the multiple BB processors 826, as illustrated in FIG. 26. For example, the multiple BB processors 826 may be compatible with multiple frequency bands used by the eNB 800. The radio communication interface 825 may include the multiple RF circuits 827, as illustrated in FIG. 26. For example, the multiple RF circuits 827 may be compatible with multiple antenna elements. Although FIG. 26 illustrates the example in which the radio communication interface 825 includes the multiple BB processors 826 and the multiple RF circuits 827, the radio communication interface 825 may also include a single BB processor 826 or a single RF circuit 827.

In the eNB 800 shown in FIG. 26, the switching unit 151 and/or the control unit 153 described with reference to FIG. 8 may be implemented by the radio communication interface 825. Alternatively, at least some of these constituent elements may be implemented by the controller 821. As an example, a module which includes a part (for example, the BB processor 826) or all of the radio communication interface 825 and/or the controller 821 may be mounted in eNB 800, and the switching unit 151 and/or the control unit 153 may be implemented by the module. In this case, the module may store a program for causing the processor to function as the switching unit 151 and/or the control unit 153 (i.e., a program for causing the processor to execute operations of the switching unit 151 and/or the control unit 153) and may execute the program. As another example, the program for causing the processor to function as the switching unit 151 and/or the control unit 153 may be installed in the eNB 800, and the radio communication interface 825 (for example, the BB processor 826) and/or the controller 821 may execute the program. As described above, the eNB 800, the base station device 820, or the module may be provided as a device which includes the switching unit 151 and/or the control unit 153, and the program for causing the processor to function as the switching unit 151 and/or the control unit 153 may be provided. In addition, a readable recording medium in which the program is recorded may be provided.

In addition, in the eNB 800 shown in FIG. 26, the radio communication unit 120 described with reference to FIG. 8 may be implemented by the radio communication interface 825 (for example, the RF circuit 827). Moreover, the antenna unit 110 may be implemented by the antenna 810. In addition, the network communication unit 130 may be implemented by the controller 821 and/or the network interface 823.

Second Application Example

Figure 27:
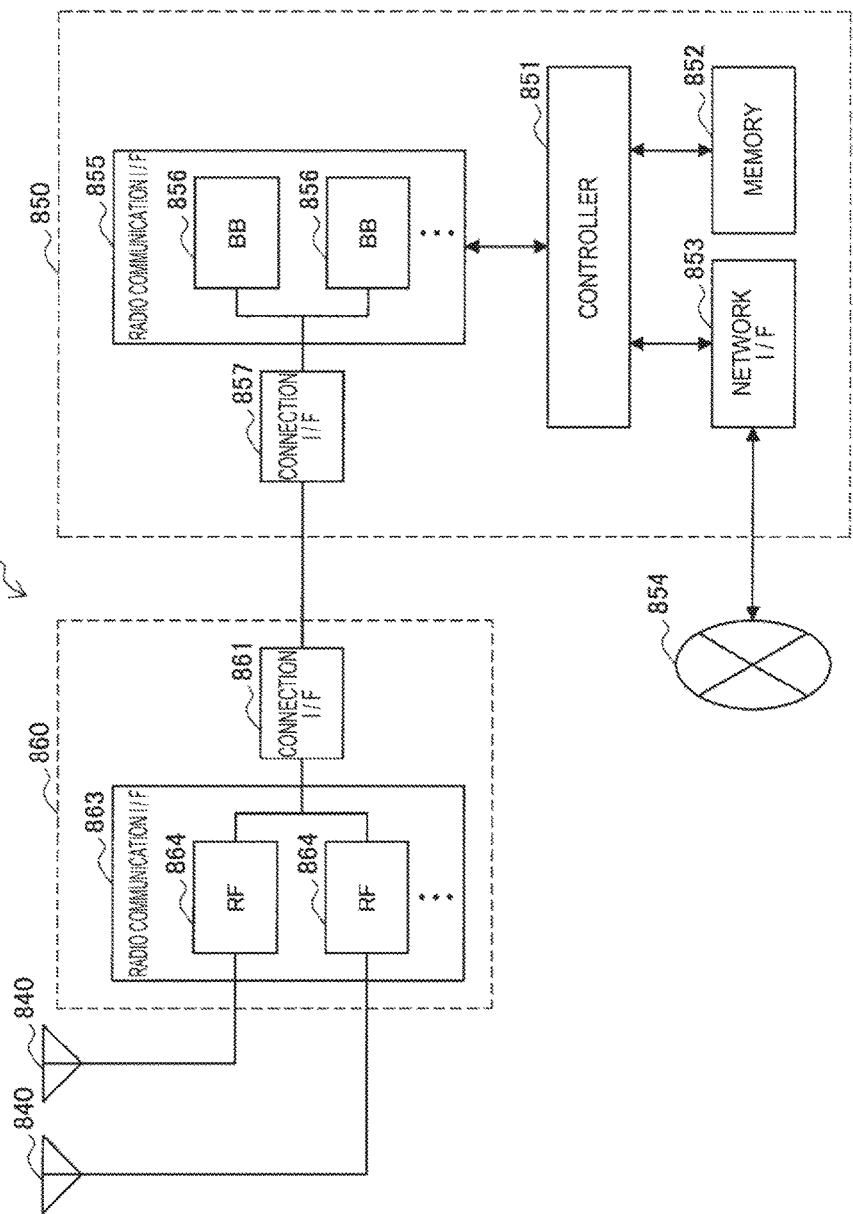
FIG. 27 is a block diagram illustrating a second example of the schematic configuration of the eNB.

FIG. 27 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 27. For example, the multiple antennas 840 may be compatible with multiple frequency bands used by the eNB 830. Although FIG. 27 illustrates the example in which the eNB 830 includes the multiple antennas 840, the eNB 830 may also include a single antenna 840.

The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 26.

The radio communication interface 855 supports any cellular communication scheme such as LTE and LTE-Advanced, and provides radio communication to a terminal positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 26, except the BB processor 856 is connected to the RF circuit 864 of the RRH 860 via the connection interface 857. The radio communication interface 855 may include the multiple BB processors 856, as illustrated in FIG. 27. For example, the multiple BB processors 856 may be compatible with multiple frequency bands used by the eNB 830. Although FIG. 27 illustrates the example in which the radio communication interface 855 includes the multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, the RF circuit 864. The RF circuit 864 may include, for example, a mixer, a filter, and an amplifier, and transmits and receives radio signals via the antenna 840. The radio communication interface 863 may include multiple RF circuits 864, as illustrated in FIG. 27. For example, the multiple RF circuits 864 may support multiple antenna elements. Although FIG. 27 illustrates the example in which the radio communication interface 863 includes the multiple RF circuits 864, the radio communication interface 863 may also include a single RF circuit 864.

In the eNB 830 shown in FIG. 27, the switching unit 151 and/or the control unit 153 described with reference to FIG. 8 may be implemented by the radio communication interface 855 and/or the radio communication interface 863. Alternatively, at least some of these constituent elements may be implemented by the controller 851. As an example, a module which includes a part (for example, the BB processor 856) or all of the radio communication interface 855 and/or the controller 851 may be mounted in eNB 830, and the switching unit 151 and/or the control unit 153 may be implemented by the module. In this case, the module may store a program for causing the processor to function as the switching unit 151 and/or the control unit 153 (i.e., a program for causing the processor to execute operations of the switching unit 151 and/or the control unit 153) and may execute the program. As another example, the program for causing the processor to function as the switching unit 151 and/or the control unit 153 may be installed in the eNB 830, and the radio communication interface 855 (for example, the BB processor 856) and/or the controller 851 may execute the program. As described above, the eNB 830, the base station device 850, or the module may be provided as a device which includes the switching unit 151 and/or the control unit 153, and the program for causing the processor to function as the switching unit 151 and/or the control unit 153 may be provided. In addition, a readable recording medium in which the program is recorded may be provided.

Figure 8:
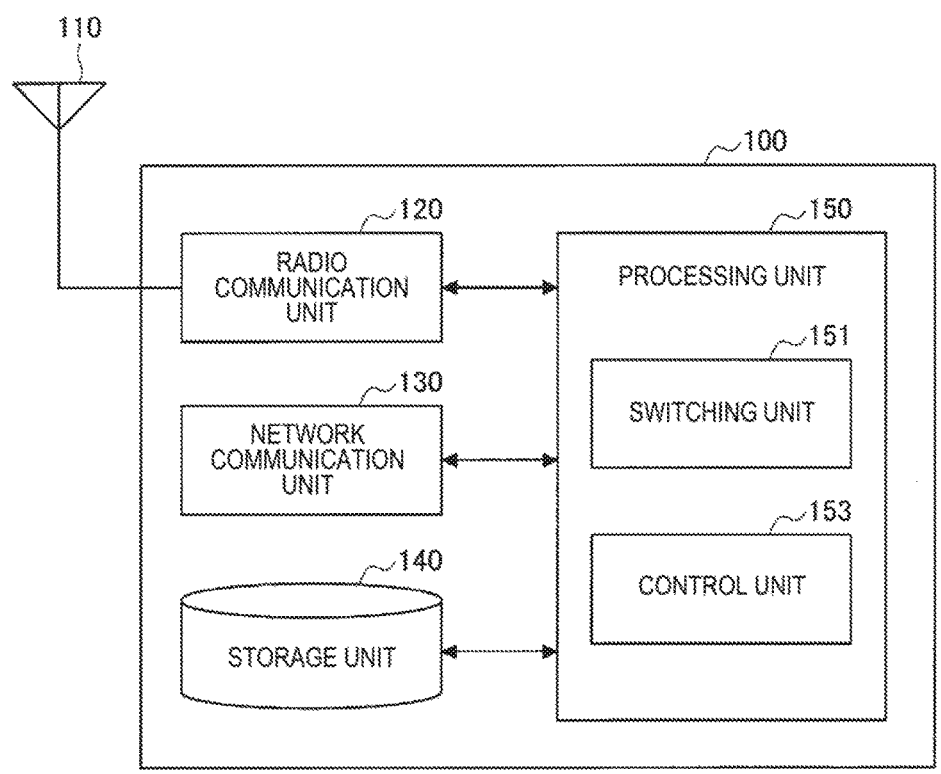
FIG. 8 is a block diagram illustrating an example of a configuration of a base station according to the embodiment.

In addition, in the eNB 830 shown in FIG. 27, the radio communication unit 120 described, for example, with reference to FIG. 8 may be implemented by the radio communication interface 863 (for example, the RF circuit 864). Moreover, the antenna unit 110 may be implemented by the antenna 840. In addition, the network communication unit 130 may be implemented by the controller 851 and/or the network interface 853.

<9.2. Application Example with Regard to Terminal Device>

First Application Example

Figure 28:
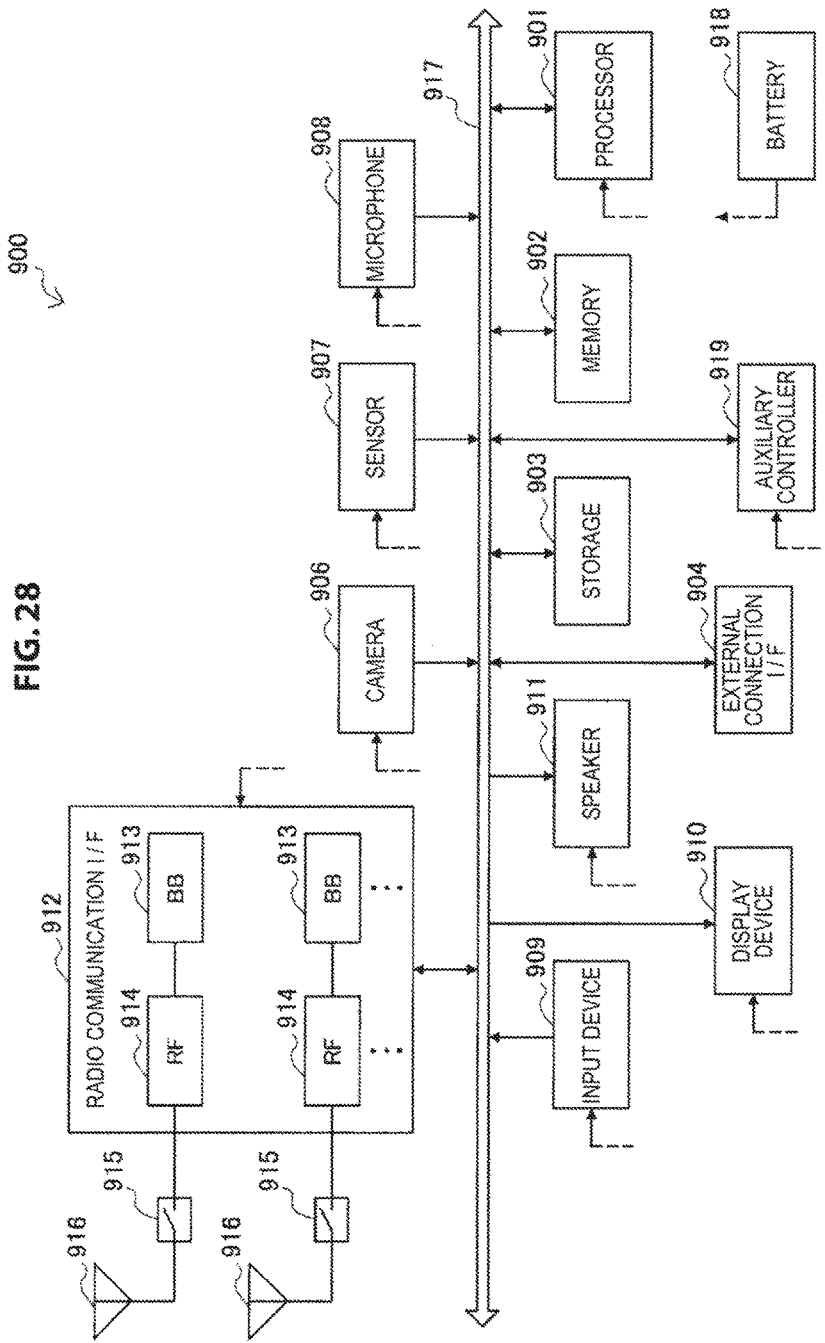
FIG. 28 is a block diagram illustrating an example of a schematic configuration of a smartphone.

FIG. 28 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The radio communication interface 912 supports any cellular communication scheme such as LTE and LTE-Advanced, and performs radio communication. The radio communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for radio communication. Meanwhile, the RF circuit 914 may include, for example, a mixer, a filter, and an amplifier, and transmits and receives radio signals via the antenna 916. The radio communication interface 912 may also be a one chip module that has the BB processor 913 and the RF circuit 914 integrated thereon. The radio communication interface 912 may include the multiple BB processors 913 and the multiple RF circuits 914, as illustrated in FIG. 28. Although FIG. 28 illustrates the example in which the radio communication interface 912 includes the multiple BB processors 913 and the multiple RF circuits 914, the radio communication interface 912 may also include a single BB processor 913 or a single RF circuit 914.

Furthermore, in addition to a cellular communication scheme, the radio communication interface 912 may support another type of radio communication scheme such as a short-distance wireless communication scheme, a near field communication scheme, and a radio local area network (LAN) scheme. In that case, the radio communication interface 912 may include the BB processor 913 and the RF circuit 914 for each radio communication scheme.

Each of the antenna switches 915 switches connection destinations of the antennas 916 among multiple circuits (such as circuits for different radio communication schemes) included in the radio communication interface 912.

Each of the antennas 916 includes a single or multiple antenna elements (such as multiple antenna elements included in an MIMO antenna), and is used for the radio communication interface 912 to transmit and receive radio signals. The smartphone 900 may include the multiple antennas 916, as illustrated in FIG. 28. Although FIG. 28 illustrates the example in which the smartphone 900 includes the multiple antennas 916, the smartphone 900 may also include a single antenna 916.

Furthermore, the smartphone 900 may include the antenna 916 for each radio communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to blocks of the smartphone 900 illustrated in FIG. 28 via feeder lines, which are partially shown as dashed lines in the figure. The auxiliary controller 919 operates a minimum necessary function of the smartphone 900, for example, in a sleep mode.

In the smartphone 900 shown in FIG. 28, the information acquisition unit 241 and/or the control unit 243 described with reference to FIG. 9 may be implemented by the radio communication interface 912. Alternatively, at least some of these constituent elements may be implemented by the processor 901 or the auxiliary controller 919. As an example, a module which includes a part (for example, the BB processor 913) or all of the radio communication interface 912, the processor 901 and/or the auxiliary controller 919 may be mounted in the smartphone 900, and the information acquisition unit 241 and/or the control unit 243 may be implemented by the module. In this case, the module may store a program for causing the processor to function as the information acquisition unit 241 and/or the control unit 243 (i.e., a program for causing the processor to execute operations of the information acquisition unit 241 and/or the control unit 243) and may execute the program. As another example, the program for causing the processor to function as the information acquisition unit 241 and/or the control unit 243 may be installed in the smartphone 900, and the radio communication interface 912 (for example, the BB processor 913), the processor 901 and/or the auxiliary controller 919 may execute the program. As described above, the smartphone 900 or the module may be provided as a device which includes the information acquisition unit 241 and/or the control unit 243, and the program for causing the processor to function as the information acquisition unit 241 and/or the control unit 243 may be provided. In addition, a readable recording medium in which the program is recorded may be provided.

In addition, in the smartphone 900 shown in FIG. 28, the radio communication unit 220 described, for example, with reference to FIG. 9 may be implemented by the radio communication interface 912 (for example, the RF circuit 914). Moreover, the antenna unit 210 may be implemented by the antenna 916.

Second Application Example

Figure 29:
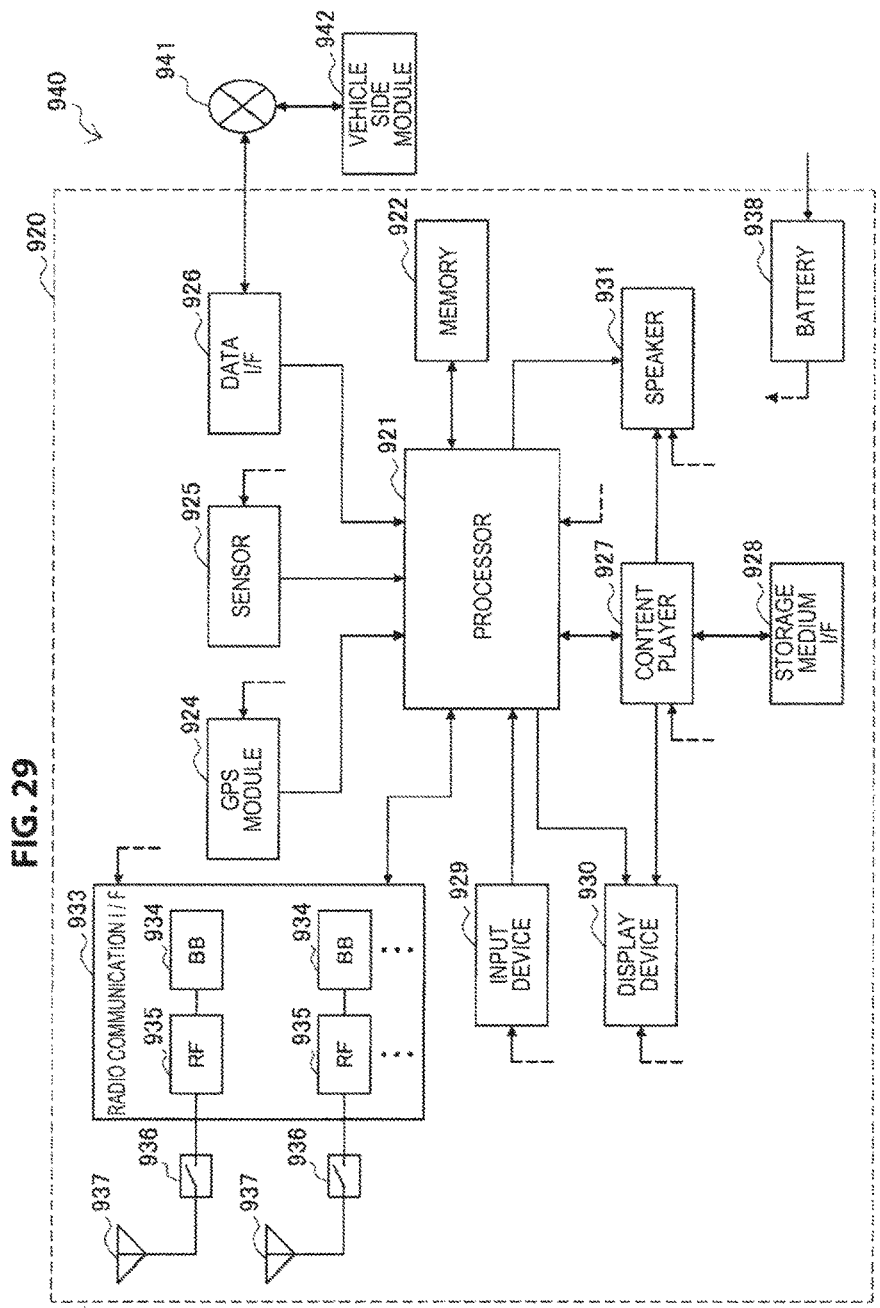
FIG. 29 is a block diagram illustrating an example of a schematic configuration of a car navigation device.

FIG. 29 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The radio communication interface 933 supports any cellular communication scheme such as LET and LTE-Advanced, and performs radio communication. The radio communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for radio communication. Meanwhile, the RF circuit 935 may include, for example, a mixer, a filter, and an amplifier, and transmits and receives radio signals via the antenna 937. The radio communication interface 933 may be a one chip module having the BB processor 934 and the RF circuit 935 integrated thereon. The radio communication interface 933 may include the multiple BB processors 934 and the multiple RF circuits 935, as illustrated in FIG. 29. Although FIG. 29 illustrates the example in which the radio communication interface 933 includes the multiple BB processors 934 and the multiple RF circuits 935, the radio communication interface 933 may also include a single BB processor 934 or a single RF circuit 935.

Furthermore, in addition to a cellular communication scheme, the radio communication interface 933 may support another type of radio communication scheme such as a short-distance wireless communication scheme, a near field communication scheme, and a radio LAN scheme. In that case, the radio communication interface 933 may include the BB processor 934 and the RF circuit 935 for each radio communication scheme.

Each of the antenna switches 936 switches connection destinations of the antennas 937 among multiple circuits (such as circuits for different radio communication schemes) included in the radio communication interface 933.

Each of the antennas 937 includes a single or multiple antenna elements (such as multiple antenna elements included in an MIMO antenna), and is used for the radio communication interface 933 to transmit and receive radio signals. The car navigation device 920 may include the multiple antennas 937, as illustrated in FIG. 29. Although FIG. 29 illustrates the example in which the car navigation device 920 includes the multiple antennas 937, the car navigation device 920 may also include a single antenna 937.

Furthermore, the car navigation device 920 may include the antenna 937 for each radio communication scheme. In that case, the antenna switches 936 may be omitted from the configuration of the car navigation device 920.

The battery 938 supplies power to blocks of the car navigation device 920 illustrated in FIG. 29 via feeder lines that are partially shown as dashed lines in the figure. The battery 938 accumulates power supplied form the vehicle.

In the car navigation device 920 shown in FIG. 32, the information acquisition unit 241 and/or the control unit 243 described with reference to FIG. 10 may be implemented by the radio communication interface 933. Alternatively, at least some of these constituent elements may be implemented by the processor 921. As an example, a module which includes a part (for example, the BB processor 934) or all of the radio communication interface 933 and/or the processor 921 may be mounted in the car navigation device 920, and the information acquisition unit 241 and/or the control unit 243 may be implemented by the module. In this case, the module may store a program for causing the processor to function as the information acquisition unit 241 and/or the control unit 243 (i.e., a program for causing the processor to execute operations of the information acquisition unit 241 and/or the control unit 243) and may execute the program. As another example, the program for causing the processor to function as the information acquisition unit 241 and/or the control unit 243 may be installed in the car navigation device 920, and the radio communication interface 933 (for example, the BB processor 934) and/or the processor 921 may execute the program. As described above, the car navigation device 920 or the module may be provided as a device which includes the information acquisition unit 241 and/or the control unit 243, and the program for causing the processor to function as the information acquisition unit 241 and/or the control unit 243 may be provided. In addition, a readable recording medium in which the program is recorded may be provided.

In addition, in the car navigation device 920 shown in FIG. 29, the radio communication unit 220 described, for example, with reference to FIG. 9 may be implemented by the radio communication interface 933 (for example, the RF circuit 935). Moreover, the antenna unit 210 may be implemented by the antenna 937.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the information acquisition unit 241 and/or the control unit 243. The vehicle module 942 generates vehicle data such as vehicle speed, engine speed, and trouble information, and outputs the generated data to the in-vehicle network 941.

10. Conclusion

So far, communication devices and processes according to embodiments of the present disclosure have been described with reference to FIGS. 5 to 29. According to the embodiments of the present disclosure, (1) First to Fourth Embodiments In the first and second embodiments, the base station 100 includes the switching unit 151 which switches an operation mode of a UL band of FDD between the first mode in which the UL band is used for UL and a second mode in which the UL band is used for both DL and UL in a time division manner, and the control unit 153 which gives an instruction on a first TA on the basis of a DL reception timing in a DL band of FDD corresponding to the UL band and an instruction on a second TA on the basis of a DL reception timing in the UL band.

In the third embodiment, the base station 100 includes the switching unit 151 which switches an operation mode of a UL band of FDD between the first mode in which the UL band is used for UL and the second mode in which the UL band is used for both DL and UL in a time division manner, and the control unit 153 which synchronizes a DL transmission timing in a DL band of FDD corresponding to the UL band with a DL transmission timing in the UL band when the operation mode is the second mode.

In the fourth embodiment, the terminal device 200 includes the information acquisition unit 241 which acquires information indicating a switch of an operation mode of a UL band of FDD between the first mode in which the UL band is used for UL and the second mode in which the UL band is used for both DL and UL in a time division manner, and the control unit 243 which performs a process for UL transmission in the UL band when the operation mode is the first mode, and performs a process for DL reception and DL transmission in the UL band when the operation mode is the second mode. The control unit 243 adjusts a UL transmission timing in the UL band on the basis of a DL reception timing in the DL band of FDD corresponding to the UL band regardless of whether the operation mode is the first mode or the second mode.

Accordingly, radio communication can be performed more favorably in a UL band of FDD when, for example, the UL band is used for both DL and UL in a time division manner. Specifically, when the UL band of FDD is used for both DL and UL in a time division manner, for example, synchronization of UL reception timings of a base station is realized.

(2) Fifth Embodiment

In the fifth embodiment, the base station 100 includes the switching unit 151 which switches an operation mode of a UL band of FDD between the first mode in which the UL band is used for UL and a second mode in which the UL band is used for both DL and UL in a time division manner, and the control unit 153 which reports information regarding a subframe, in which the ACK/NACK of DL data is transmitted, to the terminal device 200 when the operation mode is the second mode.

Accordingly, radio communication can be performed more favorably a UL band of FDD when, for example, the UL band is used for both DL and UL in a time division manner. Specifically, for example, the ACK/NACK of DL data is appropriately transmitted when a UL band of FDD is used for both DL and UL in a time division manner.

So far, exemplary embodiments of the present disclosure have been described with reference to accompanying diagrams, but it is a matter of course that the present disclosure is not limited thereto. It is obvious that a person skilled in the art can conceive various modified examples or altered examples within the scope described in the claims, and it is understood that such examples also belong to the technical scope of the present disclosure.

For example, the examples in which the system including the base station and the terminal device is a system on the basis of LTE, LTE-Advanced, or a communication standard equivalent thereto, however, the present disclosure is not limited thereto. The system may be, for example, a system on the basis of another communication standard.

In addition, processing steps in processes of the present specification may not necessarily be executed in, for example, a time series manner in the order described in the flowcharts or sequence diagrams. The processing steps in the processes may also be executed in, for example, a different order from the order described in the flowcharts or sequence diagrams, or may be executed in parallel.

In addition, a computer program for causing a processor (for example, a CPU, a DSP, or the like) provided in a device of the present specification (for example, a base station, a base station device or a module for a base station device, or a terminal device or a module for a terminal device) to function as a constituent element of the device (for example, the switching unit and/or the control unit, or the information acquisition unit and/or the control unit) (in other words, a computer program for causing the processor to execute operations of the constituent element of the device) can also be created. In addition, a recording medium in which the computer program is recorded may also be provided. Further, a device that includes a memory in which the computer program is stored and one or more processors that can execute the computer program (a base station, a base station device or a module for a base station device, or a terminal device or a module for a terminal device) may also be provided. In addition, a method including an operation of the constituent element of the device (for example, the switching unit and/or the control unit, or the information acquisition unit and/or the control unit) is also included in the technology of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

A device including:

a switching unit configured to switch an operation mode of an uplink band of frequency division duplex (FDD) between a first mode in which the uplink band is used for uplink and a second mode in which the uplink band is used for both downlink and uplink in a time division manner; and a control unit configured to give an instruction on a first timing advance on the basis of a downlink reception timing in a downlink band of FDD corresponding to the uplink band and an instruction on a second timing advance on the basis of a downlink reception timing in the uplink band.

(2)

The device according to (1), wherein the control unit gives the instruction on the first timing advance and the instruction on the second timing advance when the operation mode is the second mode.

(3)

The device according to (1) or (2), wherein the instruction on the first timing advance and the instruction on the second timing advance are instructions to the same terminal device that supports the second mode.

(4)

The device according to (3), wherein the control unit gives the instruction on the first timing advance and the instruction on the second timing advance by reporting a timing advance command.

(5)

The device according to (4), wherein the timing advance command includes a timing advance command for the first timing advance and a timing advance command for the second timing advance.

(6)

The device according to (5), wherein the timing advance command for the first timing advance is a command for a first timing advance group, and the timing advance command for the second timing advance is a command for a second timing advance group that is different from the first timing advance group.

(7)

The device according to any one of (3) to (6), wherein the control unit gives an instruction on one of the first timing advance and the second timing advance by reporting a timing advance command, and gives an instruction on the other of the first timing advance and the second timing advance by reporting information indicating an offset between the first timing advance and the second timing advance.

(8)

The device according to (1) or (2), wherein the instruction on the first timing advance is an instruction to a first terminal device that does not support the second mode, and the instruction on the second timing advance is an instruction to a second terminal device that supports the second mode.

(9)

The device according to (8), wherein the first terminal device is a terminal device which adjusts an uplink transmission timing in the uplink band on the basis of a downlink reception timing in the downlink band, and the second terminal device is a terminal device which adjusts an uplink transmission timing in the uplink band on the basis of a downlink reception timing in the uplink band when the operation mode is the second mode.

(10)

The device according to any one of (1) to (9), wherein the control unit performs a process for transmitting a synchronization signal in the uplink band when the operation mode is the second mode.

(11)

The device according to (10), wherein the second mode is a mode in which the uplink band is used for both downlink and uplink in a time division manner and the uplink band is used for downlink with at least a predetermined subframe of a radio frame, and the control unit performs a process for transmitting the synchronization signal in the uplink band when the operation mode is the second mode such that the synchronization signal is transmitted in the predetermined subframe of the radio frame.

(12)

A device including:

a switching unit configured to switch an operation mode of an uplink band of FDD between a first mode in which the uplink band is used for uplink and a second mode in which the uplink band is used for both downlink and uplink in a time division manner; and a control unit configured to synchronize a downlink transmission timing in a downlink band of FDD corresponding to the uplink band with a downlink transmission timing in the uplink band when the operation mode is the second mode.

(13)

The device according to (12), wherein an uplink reception timing in the uplink band is a predetermined period of time earlier than a downlink transmission timing in the downlink band at least when the operation mode is the second mode.

(14)

The device according to (13), wherein the predetermined period of time is the time required for a switch from uplink to downlink in the uplink band.

(15)

The device according to (13) or (14), wherein an uplink reception timing in the uplink band is synchronized with a downlink transmission timing in the downlink band when the operation mode is the first mode, and is the predetermined period of time earlier than a downlink transmission timing in the downlink band when the operation mode is the second mode, and the control unit gives an instruction on a timing advance of uplink transmission in the uplink band such that the timing advance is lengthened by the predetermined period of time in accordance with a switch of the operation mode from the first mode to the second mode.

(16)

The device according to (15), wherein the control unit gives the instruction on the timing advance by reporting a timing advance command in a subframe 6 subframes before the switch.

(17)

The device according to (15), wherein the control unit gives the instruction on the timing advance by reporting information indicating an offset corresponding to the predetermined period of time.

(18)

The device according to any one of (12) to (17), wherein a synchronization signal is not transmitted in the uplink band even when the operation mode is the second mode.

(19)

The device according to any one of (1) to (18), wherein the control unit reports information indicating an uplink/downlink configuration for the uplink band to a terminal device.

(20)

A device including:

an acquisition unit configured to acquire information indicating a switch of an operation mode of an uplink band of FDD between a first mode in which the uplink band is used for uplink and a second mode in which the uplink band is used for both downlink and uplink in a time division manner; and a control unit configured to perform a process for uplink transmission in the uplink band when the operation mode is the first mode, and perform a process for downlink reception and uplink transmission in the uplink band when the operation mode is the second mode, wherein the control unit adjusts an uplink transmission timing in the uplink band on the basis of a downlink reception timing in a downlink band of FDD corresponding to the uplink band regardless of whether the operation mode is the first mode or the second mode.

(21)

A method including, by a processor:

switching an operation mode of an uplink band of FDD between a first mode in which the uplink band is used for uplink and a second mode in which the uplink band is used for both downlink and uplink in a time division manner; and giving an instruction on a first timing advance on the basis of a downlink reception timing in a downlink band of FDD corresponding to the uplink band and an instruction on a second timing advance on the basis of a downlink reception timing in the uplink band.

(22)
A program causing a processor to execute:
switching an operation mode of an uplink band of FDD between a first mode in which the uplink band is used for uplink and a second mode in which the uplink band is used for both downlink and uplink in a time division manner; and
giving an instruction on a first timing advance on the basis of a downlink reception timing in a downlink band of FDD corresponding to the uplink band and an instruction on a second timing advance on the basis of a downlink reception timing in the uplink band.

(23)
A readable recording medium having a program recorded thereon, the program causing a processor to execute:
switching an operation mode of an uplink band of FDD between a first mode in which the uplink band is used for uplink and a second mode in which the uplink band is used for both downlink and uplink in a time division manner; and
giving an instruction on a first timing advance on the basis of a downlink reception timing in a downlink band of FDD corresponding to the uplink band and an instruction on a second timing advance on the basis of a downlink reception timing in the uplink band.

(24)
A method including, by a processor:
switching an operation mode of an uplink band of FDD between a first mode in which the uplink band is used for uplink and a second mode in which the uplink band is used for both downlink and uplink in a time division manner; and
synchronizing a downlink transmission timing in a downlink band of FDD corresponding to the uplink band with a downlink transmission timing in the uplink band when the operation mode is the second mode.

(25)
A program causing a processor to execute:
switching an operation mode of an uplink band of FDD between a first mode in which the uplink band is used for uplink and a second mode in which the uplink band is used for both downlink and uplink in a time division manner; and
synchronizing a downlink transmission timing in a downlink band of FDD corresponding to the uplink band with a downlink transmission timing in the uplink band when the operation mode is the second mode.

(26)
A readable recording medium having a program recorded thereon, the program causing a processor to execute:
switching an operation mode of an uplink band of FDD between a first mode in which the uplink band is used for uplink and a second mode in which the uplink band is used for both downlink and uplink in a time division manner; and
synchronizing a downlink transmission timing in a downlink band of FDD corresponding to the uplink band with a downlink transmission timing in the uplink band when the operation mode is the second mode.

(27)
A method including, by a processor:
acquiring information indicating a switch of an operation mode of an uplink band of FDD between a first mode in which the uplink band is used for uplink and a second mode in which the uplink band is used for both downlink and uplink in a time division manner;
performing a process for uplink transmission in the uplink band when the operation mode is the first mode, and performing a process for downlink reception and uplink transmission in the uplink band when the operation mode is the second mode; and
adjusting an uplink transmission timing in the uplink band on the basis of a downlink reception timing in a downlink band of FDD corresponding to the uplink band regardless of whether the operation mode is the first mode or the second mode.

(28)
A program causing a processor to execute:
acquiring information indicating a switch of an operation mode of an uplink band of FDD between a first mode in which the uplink band is used for uplink and a second mode in which the uplink band is used for both downlink and uplink in a time division manner;
performing a process for uplink transmission in the uplink band when the operation mode is the first mode, and performing a process for downlink reception and uplink transmission in the uplink band when the operation mode is the second mode; and
adjusting an uplink transmission timing in the uplink band on the basis of a downlink reception timing in a downlink band of FDD corresponding to the uplink band regardless of whether the operation mode is the first mode or the second mode.

(29)
A readable recording medium having a program recorded thereon, the program causing a processor to execute:
acquiring information indicating a switch of an operation mode of an uplink band of FDD between a first mode in which the uplink band is used for uplink and a second mode in which the uplink band is used for both downlink and uplink in a time division manner;
performing a process for uplink transmission in the uplink band when the operation mode is the first mode, and performing a process for downlink reception and uplink transmission in the uplink band when the operation mode is the second mode; and
adjusting an uplink transmission timing in the uplink band on the basis of a downlink reception timing in a downlink band of FDD corresponding to the uplink band regardless of whether the operation mode is the first mode or the second mode.

(30)
A device including:
an acquisition unit configured to acquire information indicating a switch of an operation mode of an uplink band of FDD between a first mode in which the uplink band is used for uplink and a second mode in which the uplink band is used for both downlink and uplink in a time division manner; and
a control unit configured to perform a process for uplink transmission in the uplink band when the operation mode is the first mode, and perform a process for downlink reception and uplink transmission in the uplink band when the operation mode is the second mode,
wherein the control unit adjusts, when the operation mode is the second mode, an uplink transmission timing in the uplink band on the basis of a downlink reception timing in a downlink band of FDD corresponding to the uplink band and information indicating a first timing advance on the basis of the downlink reception timing in the downlink band, and an uplink transmission timing in the uplink band on the basis of a downlink reception timing in the uplink band and information indicating a second timing advance on the basis of the downlink reception timing in the uplink band.

(31)
A method including, by a processor:
acquiring information indicating a switch of an operation mode of an uplink band of FDD between a first mode in which the uplink band is used for uplink and a second mode in which the uplink band is used for both downlink and uplink in a time division manner;

performing a process for uplink transmission in the uplink band when the operation mode is the first mode, and performing a process for downlink reception and uplink transmission in the uplink band when the operation mode is the second mode; and adjusting, when the operation mode is the second mode, an uplink transmission timing in the uplink band on the basis of a downlink reception timing in a downlink band of FDD corresponding to the uplink band and information indicating a first timing advance on the basis of the downlink reception timing in the downlink band, and an uplink transmission timing in the uplink band on the basis of a downlink reception timing in the uplink band and information indicating a second timing advance on the basis of the downlink reception timing in the uplink band.

(32) A program causing a processor to execute:

acquiring information indicating a switch of an operation mode of an uplink band of FDD between a first mode in which the uplink band is used for uplink and a second mode in which the uplink band is used for both downlink and uplink in a time division manner;

performing a process for uplink transmission in the uplink band when the operation mode is the first mode, and performing a process for downlink reception and uplink transmission in the uplink band when the operation mode is the second mode; and adjusting, when the operation mode is the second mode, an uplink transmission timing in the uplink band on the basis of a downlink reception timing in a downlink band of FDD corresponding to the uplink band and information indicating a first timing advance on the basis of the downlink reception timing in the downlink band, and an uplink transmission timing in the uplink band on the basis of a downlink reception timing in the uplink band and information indicating a second timing advance on the basis of the downlink reception timing in the uplink band.

(33) A readable recording medium having a program recorded thereon, the program causing a processor to execute:

acquiring information indicating a switch of an operation mode of an uplink band of FDD between a first mode in which the uplink band is used for uplink and a second mode in which the uplink band is used for both downlink and uplink in a time division manner;

performing a process for uplink transmission in the uplink band when the operation mode is the first mode, and performing a process for downlink reception and uplink transmission in the uplink band when the operation mode is the second mode; and adjusting, when the operation mode is the second mode, an uplink transmission timing in the uplink band on the basis of a downlink reception timing in a downlink band of FDD corresponding to the uplink band and information indicating a first timing advance on the basis of the downlink reception timing in the downlink band, and an uplink transmission timing in the uplink band on the basis of a downlink reception timing in the uplink band and information indicating a second timing advance on the basis of the downlink reception timing in the uplink band.

(34) A device including:

an acquisition unit configured to acquire information indicating a switch of an operation mode of an uplink band of FDD between a first mode in which the uplink band is used for uplink and a second mode in which the uplink band is used for both downlink and uplink in a time division manner; and a control unit configured to perform a process for uplink transmission in the uplink band when the operation mode is the first mode, and perform a process for downlink reception and uplink transmission in the uplink band when the operation mode is the second mode, wherein the control unit adjusts, when the operation mode is the second mode, an uplink transmission timing in the uplink band on the basis of a downlink reception timing in the uplink band and information indicating a timing advance on the basis of the downlink reception timing in the uplink band.

(35) A method including, by a processor:

acquiring information indicating a switch of an operation mode of an uplink band of FDD between a first mode in which the uplink band is used for uplink and a second mode in which the uplink band is used for both downlink and uplink in a time division manner;

performing a process for uplink transmission in the uplink band when the operation mode is the first mode, and performing a process for downlink reception and uplink transmission in the uplink band when the operation mode is the second mode; and adjusting, when the operation mode is the second mode, an uplink transmission timing in the uplink band on the basis of a downlink reception timing in the uplink band and information indicating a timing advance on the basis of the downlink reception timing in the uplink band.

(36) A program causing a processor to execute:

acquiring information indicating a switch of an operation mode of an uplink band of FDD between a first mode in which the uplink band is used for uplink and a second mode in which the uplink band is used for both downlink and uplink in a time division manner;

performing a process for uplink transmission in the uplink band when the operation mode is the first mode, and performing a process for downlink reception and uplink transmission in the uplink band when the operation mode is the second mode; and adjusting, when the operation mode is the second mode, an uplink transmission timing in the uplink band on the basis of a downlink reception timing in the uplink band and information indicating a timing advance on the basis of the downlink reception timing in the uplink band.

(37) A readable recording medium having a program recorded thereon, the program causing a processor to execute:

acquiring information indicating a switch of an operation mode of an uplink band of FDD between a first mode in which the uplink band is used for uplink and a second mode in which the uplink band is used for both downlink and uplink in a time division manner;

performing a process for uplink transmission in the uplink band when the operation mode is the first mode, and performing a process for downlink reception and uplink transmission in the uplink band when the operation mode is the second mode; and adjusting, when the operation mode is the second mode, an uplink transmission timing in the uplink band on the basis of a downlink reception timing in the uplink band and information indicating a timing advance on the basis of the downlink reception timing in the uplink band.

Additionally, the present technology may also be configured as below.

(1)

A device including:

a switching unit configured to switch an operation mode of an uplink band of frequency division duplex (FDD) between a first mode in which the uplink band is used for uplink and a second mode in which the uplink band is used for both downlink and uplink in a time division manner; and a control unit configured to report, when the operation mode is the second mode, information regarding a subframe, in which an acknowledgment (ACK)/a negative acknowledgment (NACK) of downlink data is transmitted, to a terminal device.

(2)

The device according to (1), wherein the downlink data includes downlink data transmitted in a downlink band of FDD corresponding to the uplink band.

(3)

The device according to (2), wherein the downlink data further includes downlink data to be transmitted in the uplink band.

(4)

The device according to any one of (1) to (3), wherein the control unit changes an uplink/downlink configuration for the uplink band from among a plurality of uplink/downlink configuration candidates when the operation mode is the second mode, and the subframe is an uplink subframe shared between the plurality of uplink/downlink configuration candidates.

(5)

The device according to (4), wherein the subframe is a subframe for transmitting the ACK/NACK of downlink data defined for a first uplink/downlink configuration candidate among the plurality of uplink/downlink configuration candidates, and the information is information indicating the first uplink/downlink configuration candidate.

(6)

The device according to (5), wherein the first uplink/downlink configuration candidate is an uplink/downlink configuration candidate having a minimum number of uplink subframes among the plurality of uplink/downlink configuration candidates.

(7)

The device according to any one of (1) to (6), wherein the control unit reports other information regarding a subframe, in which the ACK/NACK of uplink data is transmitted, to a terminal device when the operation mode is the second mode.

(8)

The device according to (7), wherein the uplink data is uplink data transmitted in the uplink band.

(9)

The device according to (7) or (8), wherein the control unit changes an uplink/downlink configuration for the uplink band from among a plurality of uplink/downlink configuration candidates when the operation mode is the second mode, and the subframe in which the ACK/NACK of the uplink data is transmitted is a downlink subframe shared between the plurality of uplink/downlink configuration candidates.

(10)

The device according to (9), wherein the subframe in which the ACK/NACK of the uplink data is transmitted is a subframe for transmitting the ACK/NACK of uplink data defined for a second uplink/downlink configuration candidate among the plurality of uplink/downlink configuration candidates, and the other information is information indicating the second uplink/downlink configuration candidate.

(11)

The device according to (10), wherein the second uplink/downlink configuration candidate is an uplink/downlink configuration candidate having a minimum number of downlink subframes among the plurality of uplink/downlink configuration candidates.

(12)

The device according to any one of (1) to (11), wherein the control unit reports the information to a terminal device through individual signaling.

(13)

The device according to any one of (1) to (13), wherein the control unit reports the information included in system information to a terminal device.

(14)

The device according to any one of (1) to (18), wherein the control unit reports information indicating an uplink/downlink configuration for the uplink band to a terminal device.

(15)

A method including, by a processor:

switching an operation mode of an uplink band of FDD between a first mode in which the uplink band is used for uplink and a second mode in which the uplink band is used for both downlink and uplink in a time division manner; and reporting information regarding a subframe, in which an ACK/NACK of downlink data is transmitted to a terminal device, when the operation mode is the second mode.

(16)

A device including:

an acquisition unit configured to acquire information indicating a switch of an operation mode of an uplink band of FDD between a first mode in which the uplink band is used for uplink and a second mode in which the uplink band is used for both downlink and uplink in a time division manner; and a control unit configured to perform a process for uplink transmission in the uplink band when the operation mode is the first mode, and perform a process for downlink reception and uplink transmission in the uplink band when the operation mode is the second mode, wherein the acquisition unit acquires information regarding a subframe, in which an ACK/NACK of downlink data is transmitted, when the operation mode is the second mode, and the control unit performs a process for transmitting the ACK/NACK of downlink data on the basis of the information regarding the subframe when the operation mode is the second mode.

(17)

The device according to (16), wherein the downlink data includes downlink data transmitted in a downlink band of FDD corresponding to the uplink band.

(18)

The device according to (17), wherein the downlink data further includes downlink data to be transmitted in the uplink band.

(19)

The device according to any one of (16) to (18), wherein the acquisition unit acquires other information regarding a subframe, in which an ACK/NACK of uplink data is transmitted, when the operation mode is the second mode, and the control unit performs a process for receiving the ACK/NACK of uplink data on the basis of the other information regarding the subframe when the operation mode is the second mode.

(20)

The device according to (19), wherein the subframe in which the ACK/NACK of the uplink data is transmitted is a downlink subframe shared between a plurality of uplink/downlink configuration candidates in the uplink band, and the control unit controls measurement of the uplink band on the basis of the other information.

(21)

A program causing a processor to execute:

switching an operation mode of an uplink band of FDD between a first mode in which the uplink band is used for uplink and a second mode in which the uplink band is used for both downlink and uplink in a time division manner; and reporting information regarding a subframe, in which an ACK/NACK of downlink data is transmitted to a terminal device, when the operation mode is the second mode.

(22)

A readable recording medium having a program recorded thereon, the program causing a processor to execute:

switching an operation mode of an uplink band of FDD between a first mode in which the uplink band is used for uplink and a second mode in which the uplink band is used for both downlink and uplink in a time division manner; and reporting information regarding a subframe, in which an ACK/NACK of downlink data is transmitted to a terminal device, when the operation mode is the second mode.

(23)

A method including, by a processor:

acquiring information indicating a switch of an operation mode of an uplink band of FDD between a first mode in which the uplink band is used for uplink and a second mode in which the uplink band is used for both downlink and uplink in a time division manner;

performing a process for uplink transmission in the uplink band when the operation mode is the first mode, and performing a process for downlink reception and uplink transmission in the uplink band when the operation mode is the second mode;

acquiring information regarding a subframe, in which an ACK/NACK of downlink data is transmitted, when the operation mode is the second mode; and performing a process for transmitting the ACK/NACK of downlink data on the basis of the information regarding the subframe when the operation mode is the second mode.

(24)

A program causing a processor to execute:

acquiring information indicating a switch of an operation mode of an uplink band of FDD between a first mode in which the uplink band is used for uplink and a second mode in which the uplink band is used for both downlink and uplink in a time division manner;

performing a process for uplink transmission in the uplink band when the operation mode is the first mode, and performing a process for downlink reception and uplink transmission in the uplink band when the operation mode is the second mode;

acquiring information regarding a subframe, in which an ACK/NACK of downlink data is transmitted, when the operation mode is the second mode; and performing a process for transmitting the ACK/NACK of downlink data on the basis of the information regarding the subframe when the operation mode is the second mode.

(25)

A readable recording medium having a program recorded thereon, the program causing a processor to execute:

acquiring information indicating a switch of an operation mode of an uplink band of FDD between a first mode in which the uplink band is used for uplink and a second mode in which the uplink band is used for both downlink and uplink in a time division manner;

performing a process for uplink transmission in the uplink band when the operation mode is the first mode, and performing a process for downlink reception and uplink transmission in the uplink band when the operation mode is the second mode;

acquiring information regarding a subframe, in which an ACK/NACK of downlink data is transmitted, when the operation mode is the second mode; and performing a process for transmitting the ACK/NACK of downlink data on the basis of the information regarding the subframe when the operation mode is the second mode.

REFERENCE SIGNS LIST 1 system
100 base station
151 switching unit
153 control unit
200 base station
241 information acquisition unit
243 control unit

The invention claimed is:

1. A device, comprising:
a processor configured to:
    switch an operation mode of an uplink band of frequency division duplex (FDD) between a first mode in which the uplink band is used for uplink and a second mode in which the uplink band is used for both downlink and the uplink in a time division manner; and
    give a first instruction on a first timing advance based on a downlink reception timing in a downlink band of the FDD corresponding to the uplink band and a second instruction on a second timing advance based on a downlink reception timing in the uplink band.

2. The device according to claim 1, wherein the processor is further configured to give the first instruction on the first timing advance and the second instruction on the second timing advance when the operation mode is the second mode.

3. The device according to claim 1, wherein the first instruction on the first timing advance and the second instruction on the second timing advance are instructions to a same terminal device that supports the second mode.

4. The device according to claim 3, wherein the processor is further configured to give the first instruction on the first timing advance and the second instruction on the second timing advance based on reporting of a timing advance command.

5. The device according to claim 4, wherein the timing advance command includes a first timing advance command for the first timing advance and a second timing advance command for the second timing advance.

6. The device according to claim 5, wherein
the first timing advance command for the first timing advance is a command for a first timing advance group, and the second timing advance command for the second timing advance is a command for a second timing advance group that is different from the first timing advance group.

7. The device according to claim 3, wherein the processor is further configured to:
give an instruction on one of the first timing advance or the second timing advance based on reporting of a timing advance command; and
give an instruction on the other of the first timing advance and the second timing advance based on reporting of information indicating an offset between the first timing advance and the second timing advance.

8. The device according to claim 1, wherein
the first instruction on the first timing advance is an instruction to a first terminal device that does not support the second mode, and
the second instruction on the second timing advance is an instruction to a second terminal device that supports the second mode.

9. The device according to claim 8, wherein
the first terminal device is configured to adjust an uplink transmission timing in the uplink band based on the downlink reception timing in the downlink band, and the second terminal device is configured to adjust the uplink transmission timing in the uplink band based on the downlink reception timing in the uplink band when the operation mode is the second mode.

10. The device according to claim 1, wherein the processor is further configured to transmit a synchronization signal in the uplink band when the operation mode is the second mode.

11. The device according to claim 10, wherein
in the second mode the uplink band is used for both the downlink and the uplink in the time division manner and the uplink band is used for the downlink with at least a determined subframe of a radio frame, and
the processor is further configured to transmit the synchronization signal in the uplink band when the operation mode is the second mode such that the synchronization signal is transmitted in the determined subframe of the radio frame.

12. The device according to claim 1, wherein the processor is further configured to report information indicating an uplink/downlink configuration for the uplink band to a terminal device.

* * * * *